US012454515B2

(12) United States Patent
Baggott

(10) Patent No.: US 12,454,515 B2
(45) Date of Patent: Oct. 28, 2025

(54) 2-AMINOINDANE COMPOUNDS FOR MENTAL DISORDERS OR ENHANCEMENT

(71) Applicant: Tactogen Inc, Palo Alto, CA (US)

(72) Inventor: Matthew Baggott, Redwood City, CA (US)

(73) Assignee: Tactogen Inc, Palo Alto, CA (US)

( * ) Notice: Subject to any disclaimer, the term of this patent is extended or adjusted under 35 U.S.C. 154(b) by 459 days.

(21) Appl. No.: 18/106,273

(22) Filed: Feb. 6, 2023

(65) Prior Publication Data
US 2023/0183199 A1  Jun. 15, 2023

Related U.S. Application Data

(63) Continuation of application No. PCT/US2021/045027, filed on Aug. 6, 2021.

(60) Provisional application No. 63/062,437, filed on Aug. 6, 2020.

(51) Int. Cl.
C07D 307/79 (2006.01)

(52) U.S. Cl.
CPC .................. C07D 307/79 (2013.01)

(58) Field of Classification Search
CPC .................................... C07D 307/79
See application file for complete search history.

(56) References Cited

U.S. PATENT DOCUMENTS

| | | | |
|---|---|---|---|
| 5,462,965 | A | 10/1995 | Roba et al. |
| 5,639,778 | A | 6/1997 | Anderson et al. |
| 5,708,018 | A | 1/1998 | Haadsma-Svensson et al. |
| 6,291,494 | B1 | 9/2001 | Wikstrom et al. |
| 6,423,870 | B1 | 7/2002 | Langlois et al. |
| 7,045,545 | B1 | 5/2006 | Briner et al. |
| 7,368,477 | B2 | 5/2008 | Gross et al. |
| 7,396,857 | B2 | 7/2008 | Jandura et al. |
| 10,137,096 | B2 | 11/2018 | Golan |
| 10,406,123 | B2 | 9/2019 | Golan |
| 11,767,305 | B2 | 9/2023 | Baggott |
| 2008/0200541 | A1 | 8/2008 | Gross et al. |
| 2019/0054042 | A1 | 2/2019 | Golan |
| 2020/0000747 | A1 | 1/2020 | Golan |
| 2022/0096429 | A1 | 3/2022 | Liechti |
| 2023/0159487 | A1 | 5/2023 | Baggott |
| 2023/0257347 | A1 | 8/2023 | Baggott |
| 2024/0083864 | A1 | 3/2024 | Baggott |

FOREIGN PATENT DOCUMENTS

| | | | | |
|---|---|---|---|---|
| FR | | 2717175 A1 * | 9/1995 | ............ A61P 43/00 |
| WO | WO 1994/021608 A1 | | 9/1994 | |
| WO | WO 2002/072549 A1 | | 9/2002 | |
| WO | WO-2008151170 A2 * | | 12/2008 | ........... C07D 307/93 |
| WO | WO 2009/117097 A1 | | 9/2009 | |
| WO | WO 2021/173273 A1 | | 1/2021 | |
| WO | WO 2021/257169 A1 | | 12/2021 | |
| WO | WO 2022/031566 A1 | | 2/2022 | |
| WO | WO 2022/106947 A1 | | 5/2022 | |
| WO | WO 2022/109050 A1 | | 5/2022 | |
| WO | WO 2022/120289 A1 | | 6/2022 | |
| WO | WO 2022/238507 A1 | | 11/2022 | |

OTHER PUBLICATIONS

U.S. Appl. No. 18/653,750, filed May 2, 2024, Baggott.
Baggott, Matthew J. et al. Effects of 3,4-methylenedioxymethamphetamine on socioemotional feelings, authenticity, and autobiographical disclosure in healthy volunteers in a controlled setting. J Psychopharmacol., 30(4):378-87, Feb. 15, 2016.
Barnett, Gene, et al. Quantitative structure activity relationships of analgesics, narcotic antagonists, and hallucinogens, National Institute on Drug Abuse, Research 22 Monograph Series, Apr. 20-22, 1978.
Brandt, Simon D et al. Chapter 11—Aminoindane Analogues. Novel Psychoactive Substances. Academic Press, pp. 261-283, Aug. 12, 2013.
Carleton, R. Nicholas et al. Brief Fear of Negative Evaluation Scale—Revised, Depression and Anxiety 23:297-303, May 10, 2006.
Clinicaltrials.gov. A Multi-Site Phase 3 Study of MDMA-assisted Psycholtherapy for PTSD (MAPP1)-NCT03537014. May 25, 2018.
De Brouwer, Geoffrey et al. A critical inquiry into marble-burying as a preclinical screening paradigm of relevance for anxiety and obsessive-compulsive disorder: Mapping the way forward, Cognitive, Affective, & Behavioral Neuroscience (2019) 19:1-39 (published Oct. 25, 2018).
Eshleman, A.J. et al. Structure-activity relationships of bath salt components: substituted cathinones and benzofurans at biogenic amine transporters. Psychopharmacology (Berl). Mar. 2019, 236(3):939-952. Published online: Nov. 5, 2018.
Feduccia, Allison A. et al. Breakthrough for Trauma Treatment: Safety and Efficacy of MDMA-Assisted Psychotherapy Compared to Paroxetine and Sertraline. Frontiers Psychiatry, 10:650, Sep. 12, 2019.
Fuwa, T. et al. Novel psychoactive benzofurans strongly increase extracellular serotonin level in mouse corpus striatum. J Toxicol Sci, 41(3):329-37. Published online: May 17, 2016.
Gallagher, C.T. et al. 5,6-Methylenedioxy-2-aminoindane: from laboratory curiosity to 'legal high'. Hum Psychopharmacol., 27(2):106-12, Mar. 5, 2012.
Halberstadt, A.L. et al. 2-Aminoindan and its ring-substituted derivatives interact with plasma membrane monoamine transporters and a2-adrenergic receptors. Psychopharmacology (Berl), 236(3):989-999, Mar. 23, 2019.

(Continued)

Primary Examiner — Andrew D Kosar
(74) Attorney, Agent, or Firm — Knowles Intellectual Property Strategies, LLC

(57) ABSTRACT

The present invention discloses 2-aminoindane Formulas I and II and their pharmaceutically acceptable salts, compositions and methods of use to modulate central nervous system activity, and to treat central nervous system disorders, such as post-traumatic stress, depression, anxiety, and adjustment disorders. In certain embodiments, the compounds of the present invention can be used for entactogenic therapy in counseling sessions, as needed periodically or consistently as necessary or desired.

33 Claims, 2 Drawing Sheets

(56) References Cited

OTHER PUBLICATIONS

Heifets, Boris D. et al. Distinct neural mechanisms for the prosocial and rewarding properties of MDMA, Science Translational Medicine, Research Article, Dec. 11, 2019.
Hysek, Cedric M. et al. MDMA enhances emotional empathy and prosocial behavior. Soc Cogn Affect Neurosci., Nov. 2014, 9(11):1645-52 (published Oct. 28, 2013).
Ilic, Marija et al. Cell-Based Radiotracer Binding and Uptake Inhibition Assays: A Comparison of In Vitro Methods to Assess the Potency of Drugs That Target Monoamine Transporters, Frontiers in Pharmacology, vol. 11, Article 673, May 19, 2020.
International Search Report and Written Opinion for PCT/US21/45027, 9 pages, dated Nov. 17, 2021.
Iovino, Michele et al. Vasopressin secretion control: central neural pathways, neurotransmitters and effects of drugs. Curr Pharm Des., 18(30):4714-24, Jan. 1, 2012.
Joyce, B. Matthew et al. Adderall produces increased striatal dopamine release and a prolonged time course compared to amphetamine isomers, Psychopharmacology, 2007, 191:669-677, (published online: Oct. 10, 2006).
Kim, M. et al. Effects of aromatic ring-substituted phenethylamines on the release of dopamine and serotonin. Forensic Toxicol., 37:104-112, Sep. 6, 2018.
Luethi D, Liechti ME. Monoamine Transporter and Receptor Interaction Profiles in Vitro Predict Reported Human Doses of Novel Psychoactive Stimulants and Psychedelics. Int J Neuropsychopharmacol. 21(10):926-93, Oct. 1, 2018.
Luethi D, Liechti ME. Designer drugs: mechanism of action and adverse effects. Arch Toxicol. Apr. 2020;94(4):1085-1133. Published online: Apr. 6, 2020.
Ly, Calvin et al. Psychedelics Promote Structural and Functional Neural Plasticity. Cell Reports, 23 (11): 3170-3182, Jun. 12, 2018.
Masand, P. et al. Selective serotonin-reuptake inhibitors: an update. Harv Rev Psychiatry., 7(2): 69-84, Jul.-Aug. 1999.
Nenajdenko, Valentine G. et al. A new convenient approach to chiral β-aryl) heteroaryl)alkylamines, Tetrahedron: Assymmetry 12; 2517-2527, Oct. 15, 2001.
Nichols, D.E. et al. Nonneurotoxic tetralin and indan analogues of 3,4-(methylenedioxy)amphetamine (MDA). J Med Chem., 33(2):703-710, Feb. 1, 1990.
Olson, David E. Psychoplastogens: A promising class of plasticity-promoting neurotherapeutics, Journal of Experimental Neuroscience vol. 12: 1-4, Sep. 19, 2018.
Pacifici, Roberta et al. Paroxetine inhibits acute effects of 3,4-methylenedioxymethamphetamine on the immune system in humans, The Journal of Pharmacology and Experimental Therapeutics, Apr. 2004, vol. 309, No. 1, 285-292, (published online Jan. 13, 2004).
Pitts, Elizabeth G. et al. (+)-MDMA and its enantiomers: potential therapeutic advantages of R(−)-MDMA. Psychopharmacology (Berl)., 235(2):377-392, Feb. 2018.
Pool, Eva et al. Measuring wanting and liking from animals to humans: A systematic review, Neuroscience and Biobehavioral Reviews, 124-142, Feb. 3, 2016.
Poos, George I. et al. Chapter 5, Anorexigenic Agents, Annual Reports in Medicinal Chemistry, Academic Press, 2:44-47, 1967.
Preller, K.H. et al. Modulation of Social Cognition via Hallucinogens and "Entactogens". Front Psychiatry, 10:881, Dec. 3, 2019.
Ramos, Linnet et al. Acute Prosocial Effects of Oxytocin and Vasopressin When Given Alone or in Combination with 3,4-Methylenedioxymethamphetamine in Rats: Involvement of the V1A Receptor, Neuropsychopharmacology 38, 2249-2259, May 16, 2013.
Ray, T.S., Psychedelics and the human receptorome. PLOS One, 5(2):e9019, Feb. 2, 2010.
Sahai, M.A. et al. Combined in vitro and in silico approaches to the assessment of stimulant properties of novel psychoactive substances—The case of the benzofuran 5-MAPB. Progress in Neuro psychopharmacology & Biological Psychiatry, 2017, 75:1-9. Published online: Nov. 24, 2016.
Sessa, Ben et al. A Review of 3,4-methylenedioxymethamphetamine (MDMA)-Assisted Psychotherapy. Front in Psychiatry; 10:138, Mar. 20, 2019.
Shimshoni, J.A. et al. Neurochemical binding profiles of novel indole and benzofuran MDMA analogues. Naunyn-Schmiedeberg's Arch Pharmacol 2017, 390, 15-24. Published: Sep. 20, 2016.
Spitzer, Manfred et al. Enantio-selective cognitive and brain activation effects of N-ethyl-3,4-methylenedioxyamphetamine in humans. Neuropharmacology. Aug. 2001; 41(2):263-71. Published online: Jul. 31, 2001.
Studerus, Erich et al. Prediction of psilocybin response in healthy volunteers, PLos One, vol. 7, Issue 2, Feb. 2012.
Studerus, Erich et al. Acute, subacute and long-term subjective effects of psilocybin in healthy humans: A pooled analysis of experimental studies, Journal of Psychopharmacology, Nov. 2011, vol. 25, Issue 11, 1434-1452. (published online Sep. 20, 2010).
Tatsumi, Masahiko et al. Pharmacological profile of neuroleptics at human monoamine transporters, European Journal of Pharmacology 368. 277-283, Mar. 5, 1999.
Vallejos, Gabriel, Heteroarylisopropylamines as MAO inhibitors, Bioorganic & Medicinal Chemistry, 4450-4457, Jul. 15, 2005.
Vollenweider, Franz X. et al. Psychological and cardiovascular effects and short-term sequelae of MDMA ("ecstasy") in MDMA-naïve healthy volunteers. Neuropsychopharmacology, 19(4):241-51, Oct. 1998.
Wee, Sunmee et al. Relationship between the serotonergic activity and reinforcing effects of a series of amphetamine analogs. J Pharmacol Exp Ther., 313(2):848-54. (published online: Jan. 26, 2005).

* cited by examiner

2-AMINOINDANE COMPOUNDS FOR MENTAL DISORDERS OR ENHANCEMENT

CROSS-REFERENCE TO RELATED APPLICATIONS

This application is a continuation of International Application No. PCT/US2021/045027, filed in the U.S. Receiving Office on Aug. 6, 2021, which claims the benefit of U.S. Provisional Application No. 63/062,437, filed Aug. 6, 2020. The entirety of each of these applications is hereby incorporated by reference herein for all purposes.

FIELD OF THE INVENTION

The present invention is in area of pharmaceutically active 2-aminoindane compounds and compositions for the treatment of mental disorders or for mental enhancement, including for entactogenic therapy. The present invention also includes 2-aminoindane compounds, compositions, and methods for modulating central nervous system activity and treating central nervous system disorders.

BACKGROUND

Mental disorders, including Post-Traumatic Stress Disorder (PTSD), are more common in society than most recognize, as they can be silent or hidden. The U.S. National Institute of Mental Health (NIMH) reports that 70% of all adults have experienced at least one traumatic event in their lives, and 20% of these people will develop PTSD. NIMH estimates that about 3.6% of U.S. adults have PTSD in a one-year period. PTSD can significantly impair a person's ability to function at work, at home, and socially. While many people associate PTSD with veterans and combat, in fact, it is prevalent in all aspects of society.

The World Health Organization reports that depression is a serious medical disorder affecting at least 264 million people globally of all ages. When long lasting and with even moderate intensity or severe intensity, depression can become a serious health condition. It is a leading cause of disability and if not treated can lead to suicidal thoughts and ideation which can progress to suicide as well as addiction. According to WHO, suicide is the second leading cause of death globally in 15-29 year olds.

Other mental disorders that can profoundly affect a person's ability to function normally in society include anxiety disorders such as generalized anxiety disorder, phobia, panic disorder, separation anxiety disorder, stress-related disorders, adjustment disorder, dissociative disorder, eating disorders (for example, bulimia, anorexia, etc.), attention deficit disorder, sleep disorders, disruptive disorders, neurocognitive disorders, obsessive compulsive disorders, and personality disorders, among others.

While medications are available or in clinical testing for a range of mental disorders, these disorders remain a large burden of disease globally and are insufficiently treated. Further, many of the medications have a long ramp-up time of weeks or more, during which period some patients needing therapy stop the medication out of impatience or the belief the medication does not work.

Many mental disorders are caused by, affected by, and/or may be treated by altered levels of neurotransmitters, which are chemicals that transmit a signal from a neuron across the synapse to another neuron. Brain neurotransmitter systems include the serotonin system, the noradrenaline (norepinephrine) system, the dopamine system and the cholinergic system. Dopamine, serotonin, and noradrenaline (norepinephrine) are classed as phenylethylamines, and noradrenaline is also a catecholamine. Drugs that prevent a neurotransmitter from binding to its receptor are called receptor antagonists. Drugs that bind to a receptor and mimic the normal neurotransmitter are receptor agonists. Other drugs interfere with the deactivation of a neurotransmitter after it has been released, which prolongs its action. This can be accomplished by blocking the re-uptake of the transmitter (reuptake inhibitor) or by inhibiting enzymes that degrade the transmitter. A direct agonist binds directly to its associated receptor site. An indirect agonist increases the binding of a neurotransmitter at the target receptor by stimulating the release or preventing the reuptake of the neurotransmitter.

Dopamine receptors are involved in many neurological processes such as motivation, pleasure, cognition, memory, learning, and fine motor control. It is the primary neurotransmitter involved in the reward pathway. Drugs that increase dopamine may produce euphoria. Some widely used drugs such as methamphetamines alter the functioning of the dopamine transporter (DAT), which is responsible for removing dopamine from the neural synapse.

Norepinephrine, also called noradrenaline, mobilizes the body for activity, and is at a high level during stress or danger. It focuses attention and increases arousal and alertness.

Serotonin (5-hydroxytryptamine or "5-HT") receptors influence various neurological functions such as aggression, anxiety, appetite, cognition, learning, memory, mood, and sleep. 5-HT receptors are the target of FDA approved drugs and unapproved drugs, including antidepressants, antipsychotics, hallucinogens (psychedelics), and entactogens (empathogens). There are seven families of 5-HT receptors, and each has subtypes, creating a highly complex signaling system. For example, when $5\text{-HT}_{2A}$ is agonized it often induces hallucinogenic effects (for example, perceptual distortions, delusions, depersonalization, derealization, and labile mood), whereas $5\text{-HT}_{2B}$, which is more predominantly in the periphery than in the brain, when chronically agonized, can cause toxicity such as valvulopathy. In contrast, $5\text{-HT}_{1B}$ when agonized regulates neurons in the ventral striatum and likely contributes to the social effects of entactogens.

Current treatments for a range of mental disorders typically involve the use of selective serotonin reuptake inhibitors (SSRIs), such as citalopram (Celexa), escitalopram (Lexapro), fluoxetine (Prozac), paroxetine (Paxil) and sertraline (Zoloft). SSRIs block the reabsorption (i.e., reuptake) of serotonin into neurons, thereby increasing levels of serotonin in the brain. However, SSRIs are generally slow to achieve clinically meaningful benefit, requiring weeks to produce therapeutic effects. Moreover, many patients are nonresponders and show no benefit at all (Masand et al., Harv. Rev. Psychiatry, 1999, 4: 69-84; Rosen et al., J. Clin. Psychopharmacol., 1999, 19: 67-85).

Bupropion (Wellbutrin), in contrast, is an anti-depressant that is a norepinephrine-dopamine reuptake inhibitor, which provides more stimulant effects, including weight loss.

Another class of drugs for treatment of CNS mental disorders is monoamine releasers. Monoamine releasers induce the release of one or more monoamine neurotransmitters (for example, dopamine, serotonin, or epinephrine) from neurons in the brain. Monoamine releasers rapidly modulate the brain systems that are more slowly affected by SSRIs. However, their stimulant and euphoric effects frequently lead them to have high abuse liability. Hence, although the monoamine releasers based on the phenethylamine structure, such as amphetamine (Benzedrine, Dexedrine) and methamphetamine (Obetrol, Pervitin), were widely employed as antidepressants in the mid-20th century, such agents are now used much more cautiously, and primarily treat attention deficit hyperactivity disorder (ADHD).

MDMA is currently in human clinical trials in the United States (clinicaltrials.gov; NCT03537014) and Europe for approval for use in psychotherapy sessions for severe PTSD and has been suggested as useful for aiding social cognition (Preller & Vollenweider, Frontiers in Psychiatry, 2019, 10; Hysek et al., Social cognitive and affective neuroscience, 2015, 9.11, 1645-52). The FDA granted breakthrough therapy designation for the program and has also agreed to an expanded access program, both indicative of promising results (Feduccia et al., Frontiers in Psychiatry, 2019, 10: 650; Sessa et al., Frontiers in Psychiatry, 2019, 10: 138). While MDMA has significant therapeutic potential, it has a number of features that potentially make it contraindicated for some patients. This includes its ability to produce acute euphoria, acute hypertensive effects, risk of hyponatremia, and oxidative and metabolic stress.

It is an object of the present invention to provide advantageous compositions and their use and manufacture for the treatment of mental disorders and enhancement. Additional objects are to provide drugs with a more rapid onset to be used in a clinical setting such as counseling or a home setting, which open the patient to empathy, sympathy and acceptance. A further object is to provide effective treatments for a range of CNS disorders.

SUMMARY OF THE INVENTION

The present invention provides 2-aminoindane compounds as described herein or a pharmaceutically acceptable salt and/or composition thereof that can interact with a serotonergic binding site and can exhibit entactogenic properties when administered in an effective amount to a host, including a human, in need thereof. These compounds or the pharmaceutically acceptable salts and/or pharmaceutical compositions thereof, can be used as a fast acting and effective agent for modulating CNS activity and treating CNS disorders described in the Background of the Invention or the Detailed Description of the Invention.

Specifically, the invention provides a compound of Formula I or Formula II:

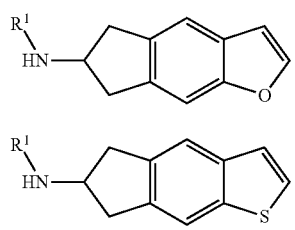

wherein:

$R^1$ is selected from hydrogen, methyl, —$CH_2F$, —$CF_2H$, —$CF_3$, ethyl, —$CH_2CH_2F$, —$CH_2CF_2H$, —$CHFCH_2F$, —$CF_2CF_2H$, —$CH_2CF_3$, and —$CF_2CF_3$, or a deuterated derivative thereof (as described below)

or a pharmaceutically acceptable salt thereof.

The carbon alpha to the amine in the 2-aminoindane motif is chiral. The invention includes a compound of either the R- or S-stereochemistry at this carbon. An isolated R- or S-enantiomeric compound of the present invention can be used as a pure enantiomer or combined with the other enantiomer in any ratio that produces the desired effects. This can be an equal ratio (racemic), or in which one enantiomer is present in a greater amount than the other, referred to herein as an enantiomerically enriched mixture. Notwithstanding, in the present application, the chiral carbon referred to in the term "enantiomerically enriched" is that carbon alpha to the amine in the fused cyclopentane ring in the provided structures.

For example, in embodiments of the invention, compounds of Formula I and Formula II are provided as a pure or enriched enantiomer, as described by Formula Ia, Ib, IIa, and IIb:

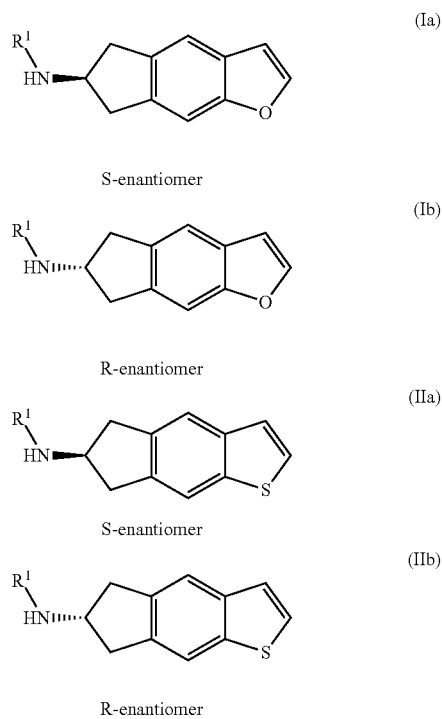

wherein $R^1$ is as defined above, or a pharmaceutically acceptable salt and/or composition thereof.

In certain illustrative embodiments, a compound of either Formula Ia or IIa or Formula IIa or IIb can be combined with its other enantiomer (or other compound) in any ratio that produces the desired effects. This can be an equal ratio (racemic), or in the form of an enantiomerically enriched mixture in which one enantiomer is present in a greater amount or alternatively in pure substantially pure form.

An enantiomerically enriched mixture as used herein is a mixture that contains one enantiomer in a greater amount than the other, and thus, unless otherwise stated, does not include either a racemic mixture or a 100% pure enantiomer. The term enantiomerically enriched mixture includes either the mixture enriched with the R-enantiomer or enriched with the S-enantiomer. An enantiomerically enriched mixture of an S-enantiomer contains at least 55% of the S-enantiomer, and, typically at least about 60%, 65%, 70%, 75%, 80%, 85%, 90%, 95% of the S-enantiomer. An enantiomerically enriched mixture of an R-enantiomer contains at least 55% of the R-enantiomer, and typically at least about 60%, 65%, 70%, 75%, 80%, 85%, 90%, 95% of the R-enantiomer. The specific ratio of S or R enantiomer can be selected for the need of the patient according to the health care specialist to balance the desired effect.

Therefore, in some embodiments an enantiomerically enriched mixture of a compound of Formula I or Formula II is carefully tuned to achieve desired results for the patient by altering the ratio of enantiomers to maximize serotonin-receptor-dependent therapeutic effects and minimize unwanted effects.

For example, 2-aminoindane compounds of structure below are provided:

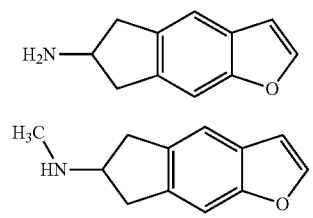

Structure I

Structure II or a pharmaceutically acceptable salt and/or a pharmaceutically acceptable composition thereof. Other Structures III-VI are drawn in Table 1, which include the sulfur-analogous structures The compounds of the present invention have an extended triple ring structure compared to 2-aminoindanes through the addition of a fused furan or thiophene ring. The fused furan or thiophene ring optionally along with a tuned ratio of enantiomers, can provide improved and advantageous properties by increasing the binding to the 5HT receptors that are most useful to imparting entactogenic properties (e.g., $5HT_{1B}$) and which can minimize dopaminergic type properties, which can be habit forming and would detract from CNS therapy. In addition, the triple ring structure in the compounds of the present invention are likely less susceptible to varying metabolism than the 1,3-dioxole ring present on MDMA and MDAI, which can improve predictability and consistency of therapeutic plasma concentrations (Pardo-Lozano et al. *PLoS ONE*, 2012, 7(10): e47599; Welter-Luedeke et al. *Ther. Drug Monit.* 2016, 38(1), 4-11).

The compounds described herein can be administered in an effective amount to treat any of the mental disorders described herein or to provide mental enhancement to a human patient in need of thereof. In certain embodiments a compound described herein can be used to treat a host such as a human in need thereof as a milder therapeutic than MDMA and which is faster acting than typical SSRIs. This enhances the patient experience and encourages the needed medical therapy. In certain embodiments a compound described herein increases empathy, sympathy, openness and/or acceptance of oneself and others. This compound can be taken, if necessary, as part of one or more therapeutic counseling sessions, or when necessary, episodically, or even consistently, as prescribed by a healthcare provider. In some embodiments, a compound of the present invention acts within a reasonable waiting time in a clinic and lasts for one, two, or several hours or otherwise in a time sufficient to complete the therapy session and then diminishes in effect sufficiently for the patient to leave the clinic and resume normal activities. In a different embodiment, the compound of the present invention is administered in a periodic or consistent dosage, including a daily dosage in a similar manner to an anti-depressant drug, to enhance self-acceptance, acceptance of others and a general feeling of peace and comfort with surroundings and events.

The present invention includes in certain embodiments a compound with beneficial selectivity profiles for neurotransmitter transporters. In certain embodiments, a compound of the present invention provides a dopamine transporter (DAT) to serotonin transporter (SERT) ratio of less than one.

The present invention includes in certain embodiments a compound with beneficial metabolic profile for therapeutic use. In certain embodiments, a compound of the present invention at its $T_{max}$ has more than about two times, three time, four times or five times the plasma concentration of the parent compound than any metabolite.

In some embodiments, the 2-aminoindane compound of the current invention, as a racemic mixture, enantiomerically enriched mixture or pure enantiomer is a direct $5\text{-HT}_{1B}$ agonist. In yet further embodiments, a 2-aminoindane compound of the current invention is also a 5-HT releaser. Only a few substances are known that are $5\text{-HT}_{1B}$ agonists and also 5-HT releasers and these have significant toxicities. For example, meta-chlorophenylpiperazine (mCPP) is one example of a drug that displays both properties but is anxiogenic and induces headaches, limiting any clinical use. In certain aspects of the present invention, the described 2-aminoindane compound releases 5-HT and is a $5\text{-HT}_{1B}$ agonist without displaying unacceptable or discomforting toxicities.

In typical embodiments, pharmaceutical compositions are disclosed which comprise a compound of any of Structures I through VI, either racemic, as pure enantiomers, or in an enantiomerically enriched mixture, and which may be in association with another active agent, as well as with a pharmaceutically acceptable carrier, diluent, or excipient.

In some embodiments, an enantiomerically enriched mixture of the S-enantiomer or pure enantiomer of Formula I or enantiomerically enriched mixture of the S-enantiomer or pure enantiomer of Formula II increases the serotonin-receptor-dependent actions that contribute to therapeutic effects and minimizes adverse nicotinic effects or dopaminergic effects that can contribute to unwanted properties like addictive liability when administered to a host in need thereof, for example a mammal, including a human, relative to the racemic form.

In some embodiments, an enantiomerically enriched mixture of the R-enantiomer or pure enantiomer of Formula I or enantiomerically enriched mixture of the R-enantiomer or pure enantiomer of Formula II increases the serotonin-receptor-dependent actions that contribute to therapeutic effects and minimizes adverse nicotinic effects or dopaminergic effects that can contribute to unwanted properties like addictive liability when administered to a host in need thereof, for example a mammal, including a human, relative to the racemic form.

In further embodiments, pharmaceutical compositions are disclosed which comprise a compound of Formula I or II, either racemic, as pure enantiomers, or in an enantiomerically enriched mixture, and which may be in association with another active agent, in a pharmaceutically acceptable composition that has a carrier, diluent, or excipient. The pharmaceutical compositions of the present invention may in certain embodiments include a salt mixture, wherein a salt mixture may comprise 1, 2 or more different pharmaceutically acceptable salts together to form a single composition. In some embodiments, enantiomers are mixed that each has a different salt or wherein there is a ratio of salts, as in Adderall, for example, which is a mixture of a racemate of amphetamine as an aspartate salt, racemate of amphetamine as a sulfate salt, and D-amphetamine as a saccharate salt and D-amphetamine as a sulfate salt. These kinds of mixtures of racemic, enantiomerically enriched and pure compounds of Formulas I and II can provide advantageous results.

The invention includes methods for modulating the activity of the CNS of a host in need thereof, such as a human, by administering an effective amount of a compound or composition of the invention. Examples are methods for treating a variety of CNS disorders, as generally listed herein, that have been linked to inadequate functioning of serotonergic neurotransmission in mammals, using a compound or composition of the invention. The invention also includes methods of improving CNS functioning such as reducing neuroticism or psychological defensiveness or increasing creativity, decision-making ability, or openness to experience in a human by administering an effective amount of a compound or composition of the invention.

Specifically, the invention includes methods to treat a neurological or psychiatric central nervous system disorder as further described herein, including a mental disorder, or to provide a mental enhancement, with a compound of Structures I-VI, Formula I, or Formula II or a pharmaceutically acceptable salt or salt mixture thereof.

These and other objects, features, and advantages of the present invention may be more clearly understood and appreciated from a review of the following detailed description of the disclosed embodiments and examples, and by reference to the appended claims.

The present invention thus includes at least the following aspects:
(i) A compound of Structures I-VI, Formula I, or Formula II, or a pharmaceutically acceptable salt or salt mixture, isotopic derivative, or prodrug thereof;
(ii) An enantiomerically enriched or pure compound of Structures I-VI, Formula I, or Formula II, or a pharmaceutically acceptable salt, or salt mixture, an isotopic derivative, or prodrug thereof;
(iii) An enantiomerically enriched mixture of Structures I-VI, Formula I, or Formula II, or a pharmaceutically acceptable salt, or salt mixture, an isotopic derivative, or prodrug thereof;
(iv) A pharmaceutical composition comprising an effective patient-treating amount of a compound of (i), (ii) or (iii) in a pharmaceutically acceptable carrier or diluent for any of the uses described herein;
(v) The pharmaceutically acceptable composition of (iv) in a solid or liquid, systemic, oral, topical or parenteral dosage form;
(vi) A method for treating a patient with any neurological or psychological CNS disorder as described herein that includes administering an effective amount of a compound of (i), (ii) or (iii) to a patient such as a human in need thereof;
(vii) A method for treating any neurological or psychological CNS disorder comprising administering an effective amount of a compound of (i), (ii) or (iii) or a pharmaceutically acceptable salt, isotopic derivative, or prodrug thereof, as described herein, to a patient, typically a human, in need thereof;
(viii) A compound of (i), (ii) or (iii) or a pharmaceutically acceptable salt, salt mixture, isotopic derivative, or prodrug thereof, for use to treat any disorder as described herein in an effective amount as further described herein;
(ix) A compound of (i), (ii) or (iii) for use in the manufacture of a medicament for the treatment of any of the disorders described herein;
(x) Use of a compound of (i), (ii) or (iii) or a pharmaceutically acceptable salt, salt mixture, isotopic derivative, or prodrug thereof, to treat any disorder as described herein in an effective amount as further described herein;
(xi) Processes for the preparation of therapeutic products that contain an effective amount of a compound of (i), (ii) or (iii) or a pharmaceutically acceptable salt or salt mixtures, isotopic derivatives, or prodrugs or compositions thereof, as described herein.

DETAILED DESCRIPTION OF THE INVENTION

Figure 1:
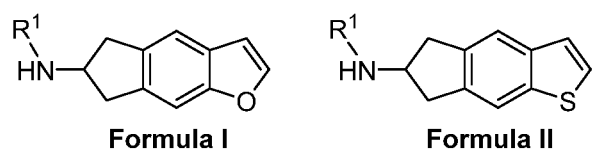
FIG. 1 provides Formula I and Formula II of the present invention.

The present invention includes 2-aminoindanes of Structures I-VI, Formula I, or Formula II, or a pharmaceutically acceptable salt or salt mixture, isotopic derivative, or prodrug or pharmaceutically acceptable composition thereof, as well as methods for modulation of CNS activity, and for treatment of CNS disorders, including but not limited to post-traumatic stress, depression, adjustment disorders, addiction, a substance use disorder, anxiety and other mental disorders as described herein to a host such as a human in need thereof. The 2-aminoindanes of the present invention provide advantageous pharmacological properties that are desirable as therapeutics for the treatment of mental disorders, particularly as psychotherapeutics and neurotherapeutics.

In certain embodiments a compound described herein is a milder therapeutic than the entactogen MDMA, and is faster acting than common SSRIs. In addition, the 2-aminoindanes of Structures I-VI, Formula I, or Formula II may induce fewer unwanted side effects caused by dopaminergic or adrenaline agonism which decreases the patient experience, are counterproductive to the therapy, and/or are undesirably toxic. In certain embodiments a compound described herein increases empathy, sympathy, openness and/or acceptance of oneself and others. This compound can be taken, if necessary, as part of therapeutic counseling sessions, or when necessary, episodically, or even consistently, as prescribed by a healthcare provider.

Several groups have explored the pharmacology of molecules including a 2-aminoindane (2-AI) structure (Brandt et al. 2013. Aminoindane analogues. In Novel Psychoactive Substances (pp. 261-283). Academic Press). It has been reported that 5,6-methylenedioxy-2-aminoindane (MDAI) has entactogen effects (Gallagher et al. 2012. Human Psychopharmacology: Clinical and Experimental, 27(2), 106-112; Nichols et al. 1990. Journal of medicinal chemistry, 33(2), 703-710). In addition, 2-AI itself has been reported to have mild stimulant properties, and 5-methoxy-2-aminoindane has been marketed as an alcohol substitute. U.S. Pat. Nos. 10,406,123, 10,137,096, and U.S. Pub. No. 2020/0000747A1 disclose 5-methoxy-2-aminoindane and other 2-aminoindane derivatives for use as regulators of binge behavior. U.S. Pat. No. 5,708,018 discloses some 2-aminoindanes as selective dopamine $D_3$ receptor ligands. These molecules can be viewed as rigid amphetamine analogues, with different ring substitutions producing different tendencies to release serotonin, dopamine, and norepinephrine in different and unpredictable proportions. The pharmacology of several 2-aminoindanes was recently reviewed and further characterized by Halberstadt and colleagues (Halberstadt et al. 2019. Psychopharmacology, 236(3), 989-999).

Similarly, the neurochemical effects of some benzofuran molecules have been documented. For example, U.S. Pat. No. 7,045,545 discloses certain aminoalkylbenzofurans as agonists of serotonin 5-$HT_{2C}$ receptors. Aminoalkyldihydrobenzofurans with aryl substituents on the phenol ring have been disclosed for the treatment of depression and related disorders in U.S. Pat. No. 7,396,857, and for the treatment of schizophrenia and related disorders in U.S. Pat. No. 7,368,477 and U.S. Pub. No. 2008/0200541A1. Racemic 1-(1-benzofuran-5-yl)-N-methylpropan-2-amine and 1-(1-benzofuran-6-yl)-N-methylpropan-2-amine have received some attention from researchers, are reported to share some effects with entactogens, and have undergone preliminary pharmacological profiling (Eshleman et al., Psychopharmacology, 2019, 236(3), 939-952; Shimshoni et al., Naunyn-Schmiedeberg's Archives Pharmacol., 2017, 390(1), 15-24; Sahai et al., Progress in Neuropsychopharmacology & Biological Psychiatry, 2017, 75(1-9); Fuwa et al., The Journal of toxicological sciences, 2016, 41(3), 329-337; Kim et al., Forensic Toxicology, 2019, 37(1), 104-112).

Definitions

When introducing elements of the present invention or the typical embodiments thereof, the articles "a," "an," "the," and "said" are intended to mean that there are one or more of the elements. The terms "comprising," "including," and "having" are intended to be inclusive and not exclusive (i.e., there may be other elements in addition to the recited elements). Thus, the terms "including," "may include," and "include," as used herein mean, and are used interchangeably with, the phrase "including but not limited to."

Where a range of values is provided, it is understood that the upper and lower limit, and each intervening value between the upper and lower limit of the range is encompassed within the embodiments.

Unless defined otherwise, all technical and scientific terms herein have the meaning as commonly understood by one of ordinary skill in the art to which this invention belongs. In the event there is a plurality of definitions for a term herein, those in this section prevail unless stated otherwise. Further definitions that may assist the reader to understand the disclosed embodiments are as follows, and such definitions may be used to interpret the defined terms, when those terms are used herein. However, the examples given in the definitions are generally non-exhaustive and must not be construed as limiting the invention. It also will be understood that a substituent should comply with chemical bonding rules and steric compatibility constraints in relation to the particular molecule to which it is attached.

A compound of the invention may contain one or more chiral centers and/or double bonds and therefore, may exist as stereoisomers, such as double-bond isomers (i.e., geometric isomers), enantiomers, or diastereomers. Accordingly, the chemical structures depicted herein independently encompass all possible enantiomers and stereoisomers of the illustrated compounds including the stereoisomerically pure form (for example, geometrically pure, enantiomerically pure, or diastereomerically pure) and enantiomeric and stereoisomeric mixtures. Enantiomeric and stereoisomeric mixtures can be resolved into their component enantiomers or stereoisomers using separation techniques or chiral synthesis techniques well known to the skilled artisan.

An enantiomerically enriched mixture is a mixture that contains one enantiomer in a greater amount than the other. An enantiomerically enriched mixture of an S-enantiomer contains at least 55% of the S-enantiomer, and, typically at least about 60%, 65%, 70%, 75%, 80%, 85%, 90%, or 95% or more of the S-enantiomer. An enantiomerically enriched mixture of an R-enantiomer contains at least 55% of the R-enantiomer, and typically at least about 60%, 65%, 70%, 75%, 80%, 85%, 90% or 95% of the R-enantiomer. The specific ratio of S or R enantiomer can be selected for the need of the patient according to the health care specialist to balance the desired effect. In certain embodiments, as indicated by context, the term enantiomerically enriched does not include a pure enantiomer.

The term enantiomerically enriched mixture as used in this application does not include a racemic mixture and does not include a pure isomer. Notwithstanding, it should be understood that any compound described herein in enantiomerically enriched form can be used as a pure isomer if it achieves the goal of any of the specifically itemized methods of treatment described herein, including but not limited Structures I-VI, or a compound of Formula I or Formula II.

The term "CNS disorder" as used herein refers to either a neurological condition (one that is typically treated by a neurologist) or a psychiatric condition (one that is typically treated by a psychiatrist). Neurological disorders are typically those affecting the structure, biochemistry or normal electrical functioning of the brain, spinal cord or other nerves. Psychiatric conditions are more typically thought of as mental disorders, which are primarily abnormalities of thought, feeling or behavior that cause significant distress or impairment of personal functioning. Thus, a disclosed compound can be used in an effective amount to improve neurological or psychiatric functioning in a patient in need thereof. Neurological indications include, but are not limited to improved neuroplasticity, including treatment of stroke, brain trauma, dementia, and neurodegenerative diseases. A compound of the current invention can be considered a psychoplastogen, that is, a small molecule that is able to induce rapid neuroplasticity. For example, in certain embodiments, the disclosed compound or composition can be used to improve stuttering and other dyspraxias or to treat Parkinson's disease or schizophrenia.

The term "improving psychiatric function" is intended to include mental health and life conditions that are not traditionally treated by neurologists but sometimes treated by psychiatrists and can also be treated by psychotherapists, life coaches, personal fitness trainers, meditation teachers, counselors, and the like. For example, it is contemplated that a disclosed compound will allow individuals to effectively contemplate actual or possible experiences that would normally be upsetting or even overwhelming. This includes individuals with fatal illness planning their last days and the disposition of their estate. This also includes couples discussing difficulties in their relationship and how to address them. This also includes individuals who wish to more effectively plan their career.

The term "inadequate functioning of neurotransmission" is used synonymously with a CNS disorder that adversely affects normal healthy neurotransmission.

Examples of isotopes that can be incorporated into a compound of the invention include isotopes of hydrogen, carbon, nitrogen, oxygen, fluorine and chlorine such as $^2H$, $^3$H, $^{11}$C, $^{13}$C, $^{14}$C, $^{13}$N, $^{15}$N, $^{17}$O, $^{18}$O, $^{18}$F, $^{36}$Cl, and respectively. In some non-limiting embodiments, an isotopically labelled compound can be used in metabolic studies (with $^{14}$C), reaction kinetic studies (with, for example $^2$H or $^3$H), detection or imaging techniques, such as positron emission tomography (PET) or single-photon emission computed tomography (SPECT) including drug or substrate tissue distribution assays, or in radioactive treatment of patients. In particular, an $^{18}$F labeled compound may be particularly desirable for PET or SPECT studies. An isotopically labeled compound of this invention and a prodrug thereof can generally be prepared by carrying out the procedures disclosed in the schemes or in the examples and preparations described below by substituting a readily available isotopically labeled reagent for a non-isotopically labeled reagent.

By way of general example and without limitation, isotopes of hydrogen, for example, deuterium ($^2$H) and tritium ($^3$H) may be used anywhere in described structures that achieves the desired result. Alternatively, or in addition, isotopes of carbon, for example, $^{13}$C and $^{14}$C, may be used.

Isotopic substitutions, for example deuterium substitutions, can be partial or complete. Partial deuterium substitution means that at least one hydrogen is substituted with deuterium. In certain embodiments, the isotope is at least 60, 70, 80, 90, 95 or 99% or more enriched in an isotope at any location of interest. In some non-limiting embodiments, deuterium is at least 80, 90, 95 or 99% enriched at a desired location. Unless indicated to the contrary, the deuteration is at least 80% at the selected location. Deuteration can occur at any replaceable hydrogen that provides the desired results.

In some non-limiting embodiments, the substitution of a hydrogen atom for a deuterium atom can be provided in a compound or composition described herein. In some non-limiting embodiments, the substitution of a hydrogen atom for a deuterium atom occurs within a group from $R^1$. For example, when any of the groups are, or contain for example through substitution, methyl, ethyl, or methoxy, the alkyl residue may be deuterated (in non-limiting embodiments, $CDH_2$, $CD_2H$, $CD_3$, $CH_2CD_3$, $CD_2CD_3$, $CHDCH_2D$, $CH_2CD_3$, $CHDCHD_2$, $OCDH_2$, $OCD_2H$, or $OCD_3$ etc.). A compound of the invention also includes an isotopically labeled compound where one or more atoms have an atomic mass different from the atomic mass conventionally found in nature. Examples of isotopes that may be incorporated into a compound of the invention include $^2$H, $^3$H, $^{13}$C, $^{14}$C, $^{13}$N, $^{15}$N, $^{18}$O, $^{17}$O, $^{31}$P, $^{32}$P, $^{35}$S, $^{18}$F, and $^{36}$Cl.

The methyl group on the nitrogen of Structure II of the invention is subject to enzymatic removal, which produces Structure I. Structure II may be prepared with a deuterated reagent that replaces one, two, or all three of the hydrogens on the N-methyl group, which creates a higher activation energy for bond cleavage and a slower formation of the desmethyl metabolite. Analogously, the two hydrogens on the furan or thiophene ring of any one of Structures I-VI may be replaced with one or two deuteriums to decrease enzymatic opening of the ring and formation of hydroxyl-substituted metabolites. In general, when deuterium is substituted for a hydrogen at a location of metabolism in the compound, a more stable compound will result.

The alkyl group optionally present on the nitrogen of a compound of Formula I or II of the invention is likewise subject to enzymatic removal, which produces Structure I or Structure IV. A compound of Formula I or II may also be prepared with deuterium replacing from one to all of the hydrogens on the N-alkyl group, which creates a higher activation energy for bond cleavage and a slower formation of the desmethyl metabolite. Analogously, the two hydrogens on the furan or thiophene ring of Formulas I and II may be replaced with one or two deuteriums to decrease enzymatic opening of the furan or thiophene ring and formation of hydroxyl-substituted metabolites.

Any one of Structures I-VI or a compound of Formula I or II of the invention has a chiral center and thus exists as enantiomers that may be more appropriate for some applications. Accordingly, the present disclosure also includes stereoisomers of a compound described herein, where applicable, either individually or admixed in any proportions. Stereoisomers may include enantiomers, diastereomers, racemic mixtures, and combinations thereof.

"Stereoisomers" includes enantiomers, diastereomers, the components of racemic mixtures, and combinations thereof. Stereoisomers can be prepared or separated as described herein or by using other methods.

Such stereoisomers can be prepared and separated using conventional techniques, either by reacting enantiomeric starting materials, or by separating isomers of a compound disclosed herein.

"Agonist" refers to a modulator that binds to a receptor or enzyme and activates the receptor to produce a biological response. In some embodiments, "agonist" includes full agonists or partial agonists.

"Antagonism" refers to the inactivation of a receptor or enzyme by a modulator, or antagonist. Antagonism of a receptor, for example, is when a molecule binds to the receptor and does not allow activity to occur.

"$IC_{50}$" refers to the concentration of a substance (for example, a compound or a drug) that is required for 50% inhibition of a biological process. For example, $IC_{50}$ refers to the half maximal (50%) inhibitory concentration (IC) of a substance as determined in a suitable assay. Similarly, $EC_{50}$ refers to the concentration of a substance that provokes a response halfway between the baseline activity and maximum response. In some instances, an $IC_{50}$ or $EC_{50}$ is determined in an in vitro assay system. In some embodiments as used herein, $IC_{50}$ (or $EC_{50}$) refers to the concentration of a modulator that is required for 50% inhibition (or excitation) of a receptor, for example, $5HT_{1B}$.

"Modulate" or "modulating" or "modulation" refers to an increase or decrease in the amount, quality, or effect of a particular activity, function or molecule. By way of illustration and not limitation, agonists, partial agonists, antagonists, and allosteric modulators (for example, positive allosteric modulator) of a G protein-coupled receptor (for example, 5-$HT_{1B}$) are modulators of the receptor.

"Neuroplasticity" refers to the ability of the brain to change its structure and/or function throughout a subject's life. Examples of the changes to the brain include, but are not limited to, the ability to adapt or respond to internal and/or external stimuli, such as due to an injury, and the ability to produce new neurites, dendritic spines, and synapses.

"Treating" or "treatment" of a disease, as used in context, includes (i) inhibiting the disease, i.e., arresting or reducing the development or progression of the disease or its clinical symptoms; or (ii) relieving the disease, i.e., causing regression of the disease or its clinical symptoms. Inhibiting the disease, for example, would include prophylaxis. Hence, one of skill in the art will understand that a therapeutic amount necessary to effect treatment for purposes of this invention will, for example, be an amount that provides for objective indicia of improvement in patients having clinically diagnosable symptoms. Other such measurements, benefits, and surrogate or clinical endpoints, whether alone or in combination, would be understood to those of ordinary skill.

"Therapeutic effect" means the responses(s) in a host after treatment that is judged to be desirable or beneficial. Hence, depending on the CNS disorder to be treated, or improvement in CNS functioning sought, those responses shall differ, but would be readily understood by those of ordinary skill.

2—Aminoindanes of the Present Invention

The invention provides a compound, pure enantiomer, enantiomerically enriched mixture, or a pharmaceutically acceptable salt or salt mixture thereof of Formula I and Formula II:

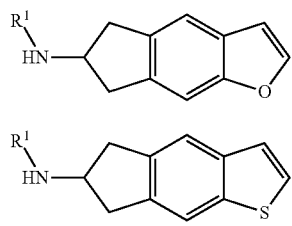

wherein:
$R^1$ is selected from hydrogen, methyl, —$CH_2F$, —$CF_2H$, —$CF_3$, ethyl, —$CH_2CH_2F$, —$CH_2CF_2H$, —$CH_2CF_3$, and —$CF_2CF_3$, or a pharmaceutically acceptable salt or salt mixture thereof.

The carbon alpha to the amine in the aminoindane motif is chiral. The invention includes a compound of either the R- or S-stereochemistry at this carbon. An isolated R- or S-enantiomeric compound of the present invention can be used as a pure enantiomer or combined with the other enantiomer in any ratio that produces the desired effects. This can be an equal ratio (racemic), or in which one enantiomer is present in a greater amount than the other, referred to herein as an enantiomerically enriched mixture. Notwithstanding, in the present application, the primary chiral carbon referred to in the term "enantiomerically enriched" is that carbon alpha to the amine in the provided structures.

In additional embodiments of the invention, a compound of Formula I and Formula II is described as an enantiomer (which may be enantiomerically enriched or pure), as described by Formula Ia, Ib, IIa, and IIb:

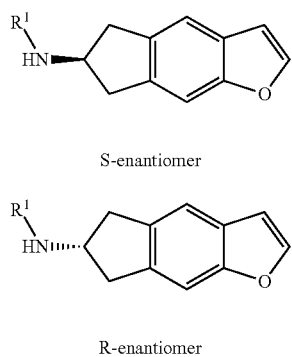

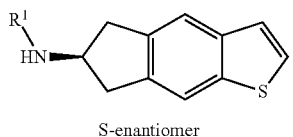

S-enantiomer

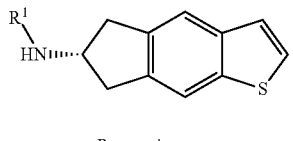

R-enantiomer wherein $R^1$ is as defined herein, or a pharmaceutically acceptable salt or salt mixture thereof.

In some embodiments of the invention, a compound of either Formula Ia and IIa or Formula IIa and IIb can be combined with the other enantiomer in any ratio that produces the desired effects. This can be an equal ratio (racemic), or in the form of an enantiomerically enriched mixture in which one enantiomer is present in a greater amount than the other.

In certain embodiments, isolated enantiomers of a compound of the present invention show improved binding at the desired receptors and transporters relevant to the goal of treatment for the mental disorder or for mental enhancement.

In certain embodiments, a mixture of enantiomers of a compound of the present invention provide improved pharmacological effects and reduces unwanted effects relevant to the goal of treatment for the mental disorder or for mental enhancement.

An enantiomerically enriched mixture is a mixture that contains one enantiomer in a greater amount than the other. An enantiomerically enriched mixture of an S-enantiomer contains at least 55% of the S-enantiomer, and, typically at least about 60%, 65%, 70%, 75%, 80%, 85%, 90%, or 95% or more of the S-enantiomer. An enantiomerically enriched mixture of an R-enantiomer contains at least 55% of the R-enantiomer, and typically at least about 60%, 65%, 70%, 75%, 80%, 85%, 90% or 95% of the R-enantiomer. The specific ratio of S or R enantiomer can be selected for the need of the patient according to the health care specialist to balance the desired effect Non-limiting examples of unwanted effects that can be minimized by carefully selecting the balance of enantiomers include hallucinogenic effects (for example, perceptual distortions, delusions, depersonalization, derealization, and labile mood), psychoactive effects (including excess stimulation or sedation), physiological effects (including transient hypertension or appetite suppression), toxic effects (including to the brain or liver), effects contributing to abuse liability (including euphoria or dopamine release), and/or other side effects.

The present invention includes compounds having a structure depicted below:

Structure I

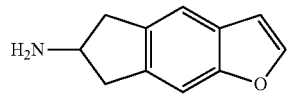

-continued

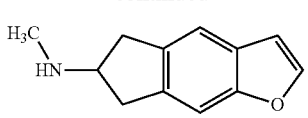
Structure II or a pharmaceutically acceptable salt or salt mixture thereof. Structures III-VI are provided in Table 1 below, which can also be used as a pharmaceutically acceptable salt or salt mixture, optionally in a pharmaceutically acceptable composition.

These structures are effective for modulating serotonergic activity and producing rapid anti-neurotic effects for the treatment of CNS disorders and mental enhancement.

In certain embodiments, an enantiomerically enriched mixture of the S-enantiomer or pure enantiomer of any one of Structures I-VI balances therapeutic effects (such as emotional openness and perceptible mood effects) while having lesser effects associated with abuse liability (such as perceptible 'good drug effects' or desire for more drug, which can lead to abuse; Pool et al. 2016. Neuroscience & Biobehavioral Reviews, 63, pp. 124-142) when administered to a host in need thereof, for example a mammal, including a human. The enantiomerically enriched mixture or pure enantiomer achieves a predetermined combination of emotional therapeutic effects and perceptible mood effects. The effect can be modulated as desired for optimal therapeutic effect.

In further embodiments, a 2-aminoindane compound of the current invention is a direct 5-HT$_{1B}$ agonist. In yet further embodiments, a 2-aminoindane compound of the current invention is a 5-HT releaser. Very few substances are known that are 5-HT$_{1B}$ agonists and also 5-HT releasers and these have significant toxicities. For example, meta-chlorophenylpiperazine (mCPP) is one example but is anxiogenic and induces headaches, limiting any clinical use. In some aspects of the present invention, a 2-aminoindane compound releases 5-HT and is a 5-HT$_{1B}$ agonist without displaying significant toxicities.

In other embodiments, an enantiomerically enriched mixture of the R-enantiomer or pure enantiomer of Formula I or an enantiomerically enriched mixture of the R-enantiomer or pure enantiomer of Formula II balances therapeutic effects (such as emotional openness and perceptible mood effects) while having lesser effects associated with abuse liability (such as perceptible 'good drug effects' or desire for more drug, which can lead to abuse; Pool et al. 2016. Neuroscience & Biobehavioral Reviews, 63, pp. 124-142) when administered to a host in need thereof, for example a mammal, including a human. The enantiomerically enriched mixture or pure enantiomer achieves a predetermined combination of emotional therapeutic effects and perceptible mood effects. The effect can be modulated as desired for optimal therapeutic effect.

In further embodiments, an enantiomerically enriched mixture of the S-enantiomer or pure enantiomer of Formula I or an enantiomerically enriched mixture of the S-enantiomer or pure enantiomer of Formula II balances therapeutic effects (such as emotional openness and perceptible mood effects) while having lesser effects associated with abuse liability (such as perceptible 'good drug effects' or desire for more drug, which can lead to abuse; Pool et al. 2016. Neuroscience & Biobehavioral Reviews, 63, pp. 124-142) when administered to a host in need thereof, for example a mammal, including a human. The enantiomerically enriched mixture or pure enantiomer achieves a predetermined combination of emotional therapeutic effects and perceptible mood effects. The effect can be modulated as desired for optimal therapeutic effect.

The present invention also provides new medical uses for the described compounds, including but not limited to, administration in an effective amount to a host in need thereof such as a human for post-traumatic stress disorder, depression, dysthymia, anxiety, generalized anxiety, social anxiety, panic, adjustment disorder, feeding and eating disorders, binge behaviors, body dysmorphic syndromes, addiction, a substance use disorder, drug abuse or dependence disorders, substance use disorders, disruptive behavior disorders, impulse control disorders, gaming disorders, gambling disorders, memory loss, dementia of aging, attention deficit hyperactivity disorder, personality disorders, attachment disorders, autism or dissociative disorders or any other disorder described herein, including in the Background. One particular treatment is for adjustment disorder, which is highly prevalent in society and currently insufficiently addressed. In nonlimiting aspects, the compound used in the treatment includes, for example, a racemic compound, pure enantiomer, or enantiomerically enriched composition of R- or S-enantiomer of Formula I, Formula II, Structures I-VI, or a combination thereof. In nonlimiting aspects, the compound used in the treatment includes, for example, a compound of Formula I or Formula II.

A disclosed compound can be used in an effective amount to improve neurological or psychiatric functioning in a patient in need thereof. Neurological indications include, but are not limited to, improved neuroplasticity, including treatment of stroke, brain trauma, dementia, and neurodegenerative diseases. MDMA has an EC$_{50}$ of 7.41 nM for promoting neuritogenesis and an Emax approximately twice that of ketamine, which has fast acting psychiatric benefits that are thought to be mediated by its ability to promote neuroplasticity, including the growth of dendritic spines, increased synthesis of synaptic proteins, and strengthening synaptic responses (Ly et al. Cell reports 23, no. 11 (2018): 3170-3182; Figure S3). A compound of the current invention can similarly be considered a psychoplastogen, that is, small molecules that are able to induce rapid neuroplasticity (Olson, 2018, Journal of experimental neuroscience, 12, 1179069518800508). For example, in certain embodiments, a disclosed compound or composition can be used to improve stuttering and other dyspraxias or to treat Parkinson's disease or schizophrenia.

The furan and thiophene rings present in the 2-aminoindanes of the present invention are less susceptible to metabolism than the 1,3-dioxole ring present on MDMA and MDAI, improving predictability and consistency of therapeutic plasma concentrations. In certain embodiments a compound of the present invention displays a beneficial metabolic profile for therapeutic use. In certain embodiments, a compound of the present invention at its T$_{max}$ has more than about two times, three time, four times or five times the plasma concentration of the parent compound than any metabolite.

In certain embodiments, a compound of Formula I includes:

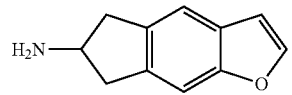

-continued

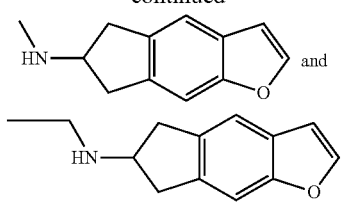

or a pharmaceutically acceptable salt or salt mixture thereof.

In certain embodiments, a compound of Formula Ia includes:

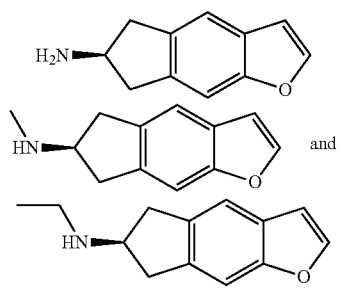

or a pharmaceutically acceptable salt or salt mixture thereof.

In certain embodiments, a compound of Formula Ib includes:

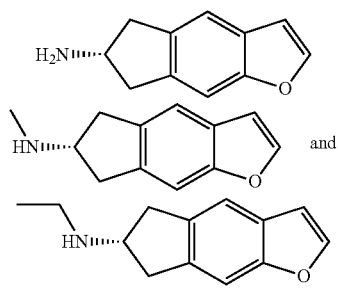

or a pharmaceutically acceptable salt or salt mixture thereof.

In certain embodiments, a compound of Formula II includes:

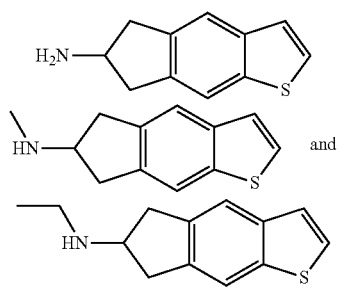

or a pharmaceutically acceptable salt or salt mixture thereof.

In certain embodiments, a compound of Formula IIa includes:

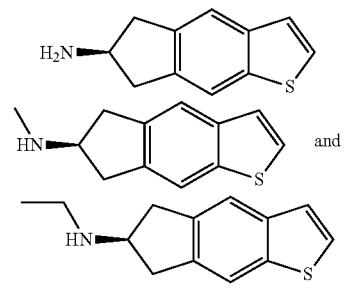

or a pharmaceutically acceptable salt or salt mixture thereof.

In certain embodiments, a compound of Formula IIb includes:

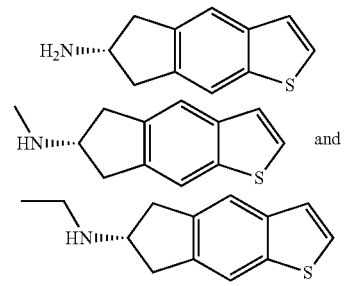

or a pharmaceutically acceptable salt or salt mixture thereof.

In certain embodiments, the compound of the present invention is selected from Table 1. A compound in Table 1 is also considered optionally as a pharmaceutically acceptable salt or salt mixture thereof.

TABLE 1

Exemplary Compound of the Present Invention

| Compound Structure | Compound Name |
|---|---|
| ![] | Structure I |
| ![] | Structure I-S |
| ![] | Structure I-R |
| ![] | Structure II |
| ![] | Structure II-S |
| ![] | Structure II-R |

TABLE 1-continued

Exemplary Compound of the Present Invention

| Compound Structure | Compound Name |
|---|---|
| (structure) | Structure III |
| (structure) | Structure III-S |
| (structure) | Structure III-R |
| (structure) | Structure IV |
| (structure) | Structure IV-S |
| (structure) | Structure IV-R |
| (structure) | Structure V |
| (structure) | Structure V-S |
| (structure) | Structure V-R |
| (structure) | Structure VI |
| (structure) | Structure VI-S |
| (structure) | Structure VI-R |

Preparation of Enantiomeric Compounds

Various methods are known in the art for preparing optically active forms and determining activity. Such methods include standard tests described herein and other similar tests which are well known in the art. Examples of methods that can be used to obtain optical isomers of a compound according to the present disclosure include the following:

i) physical separation of crystals whereby macroscopic crystals of the individual enantiomers are manually separated. This technique may particularly be used if crystals of the separate enantiomers exist (i.e., the material is a conglomerate), and the crystals are visually distinct;

ii) simultaneous crystallization whereby the individual enantiomers are separately crystallized from a solution of the racemate, possible only if the latter is a conglomerate in the solid state;

iii) enzymatic resolutions whereby partial or complete separation of a racemate by virtue of differing rates of reaction for the enantiomers with an enzyme;

iv) enzymatic asymmetric synthesis, a synthetic technique whereby at least one step of the synthesis uses an enzymatic reaction to obtain an enantiomerically pure or enriched synthetic precursor of the desired enantiomer;

v) chemical asymmetric synthesis whereby the desired enantiomer is synthesized from an achiral precursor under conditions that produce asymmetry (i.e., chirality) in the product, which may be achieved using chiral catalysts or chiral auxiliaries;

vi) diastereomer separations whereby a racemic compound is reacted with an enantiomerically pure reagent (the chiral auxiliary) that converts the individual enantiomers to diastereomers. The resulting diastereomers are then separated by chromatography or crystallization by virtue of their now more distinct structural differences and the chiral auxiliary later removed to obtain the desired enantiomer;

vii) first- and second-order asymmetric transformations whereby diastereomers from the racemate equilibrate to yield a preponderance in solution of the diastereomer from the desired enantiomer or where preferential crystallization of the diastereomer from the desired enantiomer perturbs the equilibrium such that eventually in principle all the material is converted to the crystalline diastereomer from the desired enantiomer. The desired enantiomer is then released from the diastereomers;

viii) kinetic resolutions comprising partial or complete resolution of a racemate (or of a further resolution of a partially resolved compound) by virtue of unequal reaction rates of the enantiomers with a chiral, non-racemic reagent or catalyst under kinetic conditions;

ix) enantiospecific synthesis from non-racemic precursors whereby the desired enantiomer is obtained from non-chiral starting materials and where the stereochemical integrity is not or is only minimally compromised over the course of the synthesis;

x) chiral liquid chromatography whereby the enantiomers of a racemate are separated in a liquid mobile phase by virtue of their differing interactions with a stationary phase. The stationary phase can be made of chiral material or the mobile phase can contain an additional chiral material to provoke the differing interactions;

xi) chiral gas chromatography whereby the racemate is volatilized and enantiomers are separated by virtue of their differing interactions in the gaseous mobile phase with a column containing a fixed non-racemic chiral adsorbent phase;

xii) extraction with chiral solvents whereby the enantiomers are separated by virtue of preferential dissolution of one enantiomer into a particular chiral solvent; and xiii) transport across chiral membranes whereby a racemate is placed in contact with a thin membrane barrier.

The barrier typically separates two miscible fluids, one containing the racemate, and a driving force such as concentration or pressure differential causes preferential transport across the membrane barrier. Separation occurs as a result of the non-racemic chiral nature of the membrane, which allows only one enantiomer of the racemate to pass through.

Enantiomerically Enriched Pharmaceutical Compositions

A chiral compound of the invention may be prepared by chiral chromatography from the racemic or enantiomerically enriched free amine. Pharmaceutically acceptable salts of a chiral compound may be prepared from fractional crystallization of salts from a racemic or an enantiomerically enriched free amine and a chiral acid. Alternatively, the free amine may be reacted with a chiral auxiliary and the enantiomers separated by chromatography followed by removal of the chiral auxiliary to regenerate the free amine. Furthermore, separation of enantiomers may be performed at any convenient point in the synthesis of a compound of the invention. A compound of the invention may also be prepared using a chiral synthesis.

An enantiomerically enriched mixture is a mixture that contains one enantiomer in a greater amount than the other. An enantiomerically enriched mixture of an S-enantiomer contains at least 55% of the S-enantiomer, and more typically at least about 60%, 65%, 70%, 75%, 80%, 85%, 90%, 95% of the S-enantiomer. An enantiomerically enriched mixture of an R-enantiomer contains at least 55% of the R-enantiomer, more typically at least about 55%, 60%, 65%, 70%, 75%, 80%, 85%, 90%, 95% of the R-enantiomer.

Any one of Structures I-VI or a compound of Formula I and II optionally may be provided in a composition that is enantiomerically enriched, such as a mixture of enantiomers in which one enantiomer is present in excess, in particular to the extent of 60% or more, 70% or more, 75% or more, 80% or more, 90% or more, 95% or more, or 98% or more, including 100%.

The Present Invention is Described According to the Embodiments:

1. A compound of formula:

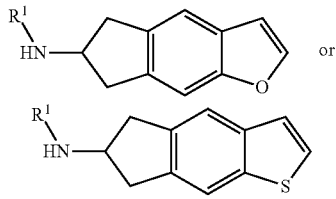

wherein:
R$^1$ is selected from hydrogen, methyl, —CH$_2$F, —CF$_2$H, —CF$_3$, ethyl, —CH$_2$CH$_2$F, —CH$_2$CF$_2$H, —CH$_2$CF$_3$, and —CF$_2$CF$_3$, or a pharmaceutically acceptable salt or salt mixture thereof.

2. The compound of embodiment 1 wherein the compound is of formula:

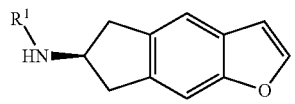

or a pharmaceutically acceptable salt or salt mixture thereof.

3. The compound of embodiment 1 wherein the compound is of formula:

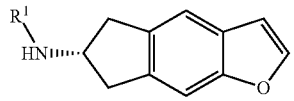

or a pharmaceutically acceptable salt or salt mixture thereof.

4. The compound of embodiment 1 wherein the compound is of formula:

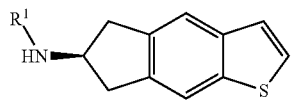

or a pharmaceutically acceptable salt or salt mixture thereof.

5. The compound of embodiment 1 wherein the compound is of formula:

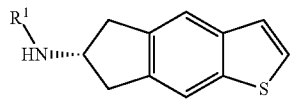

or a pharmaceutically acceptable salt or salt mixture thereof.

6. The compound of embodiment 1 wherein the compound is selected from:

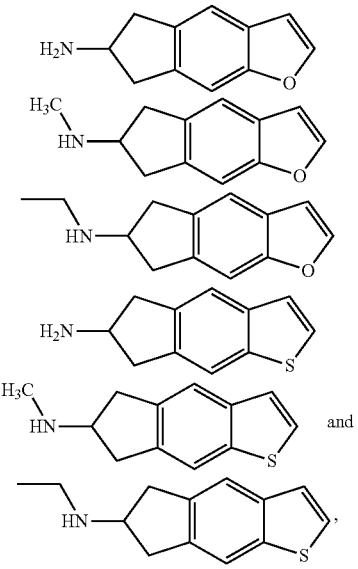

or a pharmaceutically acceptable salt or salt mixture thereof.

7. The compound of embodiment 1 or 6 wherein the compound is selected from:

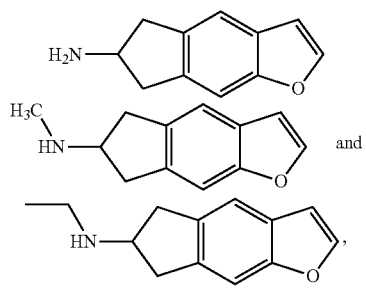

or a pharmaceutically acceptable salt or salt mixture thereof.

8. The compound of any one of embodiments 1, 6, or 7 selected from:

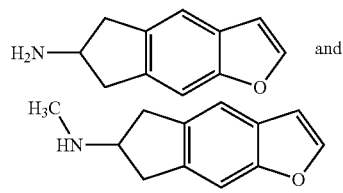

or a pharmaceutically acceptable salt or salt mixture thereof.

9. The compound of embodiment 1 or 6 wherein the compound is selected from:

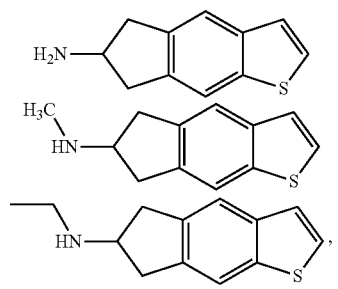

or a pharmaceutically acceptable salt or salt mixture thereof.

10. The compound of embodiment 1 wherein the compound is selected from:

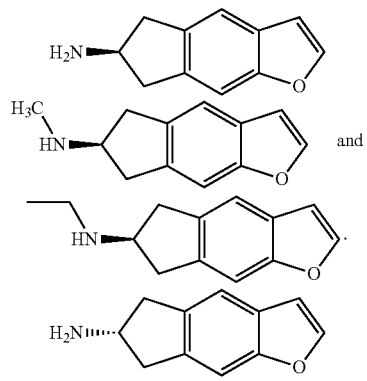

-continued

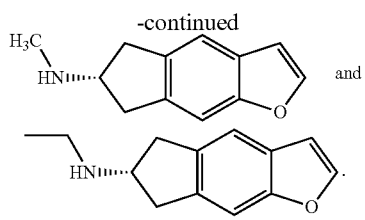

or a pharmaceutically acceptable salt or salt mixture thereof.

11. The compound of embodiment 1 wherein the compound is selected from:

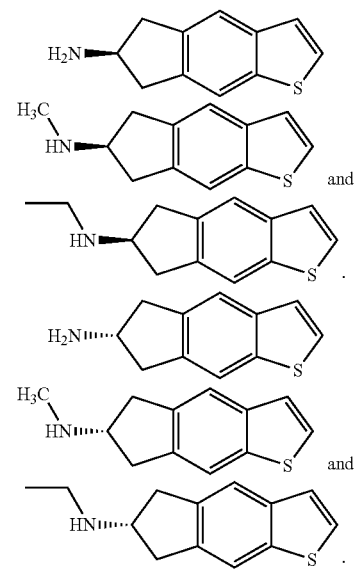

or a pharmaceutically acceptable salt or salt mixture thereof.

12. The compound of any one of embodiments 1 or 6-8 of structure:

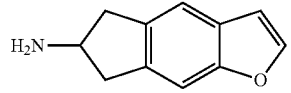

or a pharmaceutically acceptable salt or salt mixture thereof.

13. The compound of any one of embodiments 1 or 6-8 of structure:

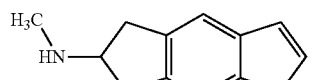

or a pharmaceutically acceptable salt or salt mixture thereof.

14. The compound of any one of embodiments 1, 6, or 7 wherein the compound is:

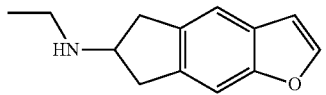

or a pharmaceutically acceptable salt or salt mixture thereof.

15. The compound of any one of embodiments 1, 2, or 10 wherein the compound is:

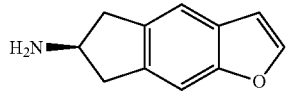

or a pharmaceutically acceptable salt or salt mixture thereof.

16. The compound of any one of embodiments 1, 2, or 10 wherein the compound is:

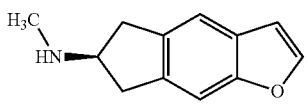

or a pharmaceutically acceptable salt or salt mixture thereof.

17. The compound of any one of embodiments 1, 2, or 10 wherein the compound is:

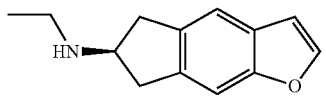

or a pharmaceutically acceptable salt or salt mixture thereof.

18. The compound of any one of embodiments 1, 3, or 10 wherein the compound is:

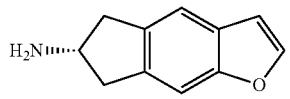 [SMILES: N[C@@H]1Cc2cc3ccsc3cc2C1]

or a pharmaceutically acceptable salt or salt mixture thereof.

19. The compound of any one of embodiments 1, 3, or 10 wherein the compound is:

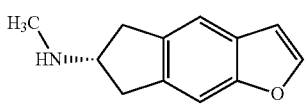

or a pharmaceutically acceptable salt or salt mixture thereof.

20. The compound of any one of embodiments 1, 3, or 10 wherein the compound is:

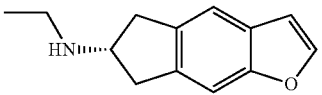

or a pharmaceutically acceptable salt or salt mixture thereof.

21. The compound of any one of embodiments 1, 6, or 9 wherein the compound is:

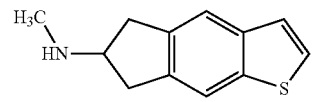

or a pharmaceutically acceptable salt or salt mixture thereof.

22. The compound of any one of embodiments 1, 6, or 9 wherein the compound is:

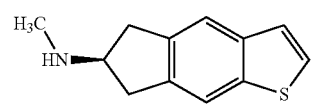

or a pharmaceutically acceptable salt or salt mixture thereof.

23. The compound of any one of embodiments 1, 6, or 9 wherein the compound is:

or a pharmaceutically acceptable salt or salt mixture thereof.

24. The compound of any one of embodiments 1, 4, or 11 wherein the compound is:

or a pharmaceutically acceptable salt or salt mixture thereof.

25. The compound of any one of embodiments 1, 4, or 11 wherein the compound is:

or a pharmaceutically acceptable salt or salt mixture thereof.

26. The compound of any one of embodiments 1, 4, or 11 wherein the compound is:

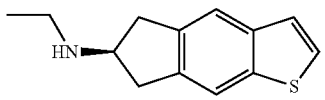

or a pharmaceutically acceptable salt or salt mixture thereof.

27. The compound of any one of embodiments 1, 5, or 11 wherein the compound is:

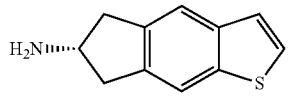

or a pharmaceutically acceptable salt or salt mixture thereof.

28. The compound of any one of embodiments 1, 5, or 11 wherein the compound is:

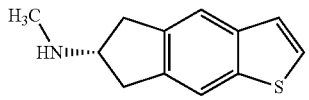

or a pharmaceutically acceptable salt or salt mixture thereof.

29. The compound of any one of embodiments 1, 5, or 11 wherein the compound is:

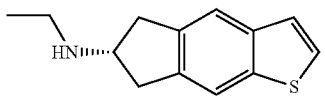

or a pharmaceutically acceptable salt or salt mixture thereof.

30. The compound of any of embodiments 1-29, wherein the compound has entactogenic properties.

31. The compound of any of embodiments 1-29, wherein the compound has serotonin-receptor-dependent properties.

32. The compound of any of embodiments 1-29, with decreased hallucinogenic effects relative to MDMA.

33. The compound of any of embodiments 1-29, with decreased unwanted psychoactive effects relative to MDMA.

34. The compound of any of embodiments 1-29, with decreased physiological effect relative to MDMA.

35. The compound of any of embodiments 1-29, with decreased abuse potential relative to MDMA.

36. The compound of any of embodiments 1-35 that shows the therapeutic effect of emotional openness.

37. The compound of any of embodiments 1-36 wherein the pharmaceutically acceptable salt(s) is selected from HCl, sulfate, aspartate, saccharate, phosphate, oxalate, acetate, amino acid anion, gluconate, maleate, malate, citrate, mesylate, nitrate or tartrate, or a mixture thereof.

38. The compound of embodiment 37 that is also a serotonin reuptake inhibitor.

39. The compound of any one of embodiments 1-38 that has minimal or no direct agonism of 5-$HT_{2A}$.

40. The compound of any of embodiments 1-29, wherein the compound is an enantiomerically enriched mixture or pure enantiomer.

41. The enantiomerically enriched mixture or pure enantiomer of embodiment 40, wherein the compound has entactogenic properties.

42. The enantiomerically enriched mixture or pure enantiomer of embodiment 40, wherein the compound has serotonin-receptor-dependent properties.

43. The enantiomerically enriched mixture or pure enantiomer of embodiment 40, with decreased hallucinogenic effects relative to MDMA.

44. The enantiomerically enriched mixture or pure enantiomer of embodiment 40, with decreased unwanted psychoactive effects relative to MDMA.

45. The enantiomerically enriched mixture or pure enantiomer of embodiment 40, with decreased physiological effect relative to MDMA.

46. The enantiomerically enriched mixture or pure enantiomer of embodiment 40, with decreased abuse potential relative to MDMA.

47. The enantiomerically enriched mixture or pure enantiomer of any of embodiments 40-46 that shows the therapeutic effect of emotional openness.

48. The enantiomerically enriched mixture or pure enantiomer of any of embodiments 40-47 wherein the pharmaceutically acceptable salt(s) is selected from HCl, sulfate, aspartate, saccharate, phosphate, oxalate, acetate, amino acid anion, gluconate, maleate, malate, citrate, mesylate, nitrate or tartrate, or a mixture thereof.

49. The enantiomerically enriched mixture or pure enantiomer of any one of embodiments 40-48 that is also a serotonin reuptake inhibitor.

50. The enantiomerically enriched mixture or pure enantiomer of any one of embodiments 40-49 that has minimal or no direct agonism of 5-$HT_{2A}$.

51. The enantiomerically enriched mixture or pure enantiomer of embodiment 40 wherein the enantiomerically enriched mixture or pure enantiomer is an enantiomerically enriched mixture.

52. The enantiomerically enriched mixture of embodiment 51, wherein the compound has entactogenic properties.

53. The enantiomerically enriched mixture of embodiment 51, wherein the compound has serotonin-receptor-dependent properties.

54. The enantiomerically enriched mixture of embodiment 51, with decreased hallucinogenic effects relative to MDMA.

55. The enantiomerically enriched mixture of embodiment 51, with decreased unwanted psychoactive effects relative to MDMA.

56. The enantiomerically enriched mixture of embodiment 51, with decreased physiological effect relative to MDMA.

57. The enantiomerically enriched mixture of embodiment 51, with decreased abuse potential relative to MDMA.

58. The enantiomerically enriched mixture of any of embodiments 51-57 that shows the therapeutic effect of emotional openness.

59. The enantiomerically enriched mixture of any of embodiments 51-58 wherein the pharmaceutically acceptable salt(s) is selected from HCl, sulfate, aspartate, saccharate, phosphate, oxalate, acetate, amino acid anion, gluconate, maleate, malate, citrate, mesylate, nitrate or tartrate, or a mixture thereof.

60. The enantiomerically enriched mixture of embodiment 51-59 that is also a serotonin reuptake inhibitor.

61. The enantiomerically enriched mixture of any one of embodiments 51-59 that has minimal or no direct agonism of 5-$HT_{2A}$.

62. A method for treating a central nervous system disorder comprising administering an effective amount of a compound, pure enantiomer, or enantiomerically enriched mixture of any one of embodiments 1-61 to a host in need thereof.

63. The method of embodiment 62 wherein the administered compound is a compound of formula:

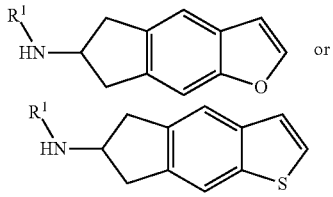

wherein:

$R^1$ is selected from hydrogen, methyl, —$CH_2F$, —$CF_2H$, —$CF_3$, ethyl, —$CH_2CH_2F$, —$CH_2CF_2H$, —$CH_2CF_3$, and —$CF_2CF_3$, or a pharmaceutically acceptable salt or salt mixture thereof.

64. The method of embodiment 62 or 63 wherein the compound, pure enantiomer, or enantiomerically enriched mixture is of formula:

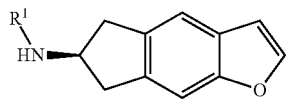

or a pharmaceutically acceptable salt or salt mixture thereof.

65. The method of embodiment 62 or 63 wherein the compound, pure enantiomer, or enantiomerically enriched mixture is of formula:

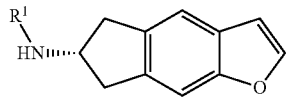

or a pharmaceutically acceptable salt or salt mixture thereof.

66. The method of embodiment 62 or 63 wherein the compound, pure enantiomer, or enantiomerically enriched mixture is of formula:

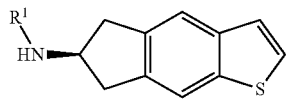

or a pharmaceutically acceptable salt or salt mixture thereof.

67. The method of embodiment 62 or 63 wherein the compound, pure enantiomer, or enantiomerically enriched mixture is of formula:

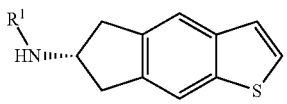

or a pharmaceutically acceptable salt or salt mixture thereof.

68. The method of embodiment 62 or 63 wherein the compound, pure enantiomer, or enantiomerically enriched mixture is selected from:

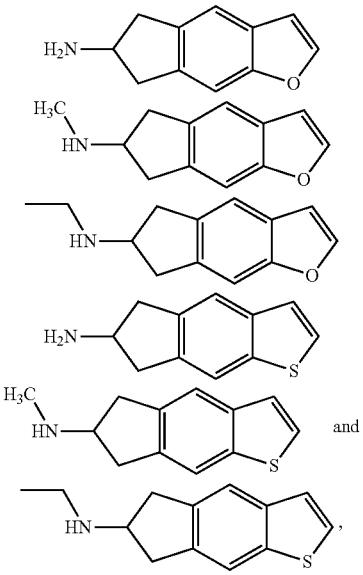

or a pharmaceutically acceptable salt or salt mixture thereof.

69. The method of any one of embodiments 62, 63, or 68 wherein the compound, pure enantiomer, or enantiomerically enriched mixture is selected from:

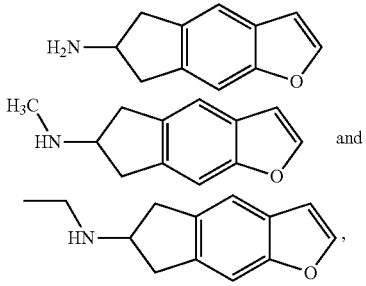

or a pharmaceutically acceptable salt or salt mixture thereof.

70. The method of any one of embodiments 62, 63, 68, or 69 wherein the compound, pure enantiomer, or enantiomerically enriched mixture is selected from:

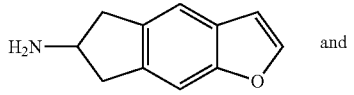

-continued

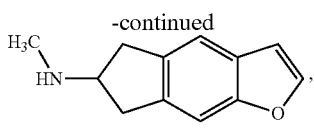

or a pharmaceutically acceptable salt or salt mixture thereof.
71. The method of any one of embodiments 62, 63, or 68 wherein the compound, pure enantiomer, or enantiomerically enriched mixture is selected from:

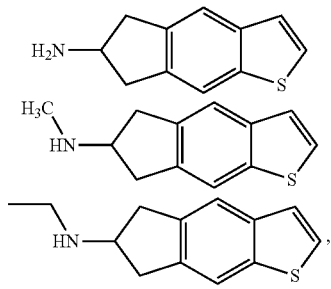

or a pharmaceutically acceptable salt or salt mixture thereof.
72. The method of embodiment 62 or 63 wherein the compound, pure enantiomer, or enantiomerically enriched mixture is selected from:

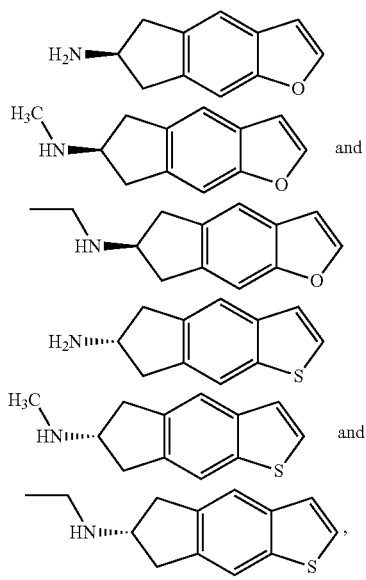

or a pharmaceutically acceptable salt or salt mixture thereof.
73. The method of embodiment 62 or 63 wherein the compound, pure enantiomer, or enantiomerically enriched mixture is selected from:

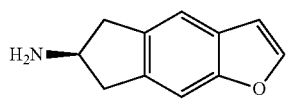

-continued

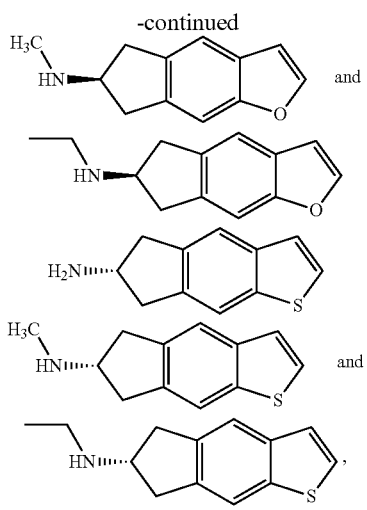

or a pharmaceutically acceptable salt or salt mixture thereof.
74. The method of any one of embodiments 62-73 wherein the central nervous system disorder is selected from: post-traumatic stress disorder, depression, dysthymia, anxiety, generalized anxiety, social anxiety, panic, adjustment disorder, feeding and eating disorders, binge behaviors, body dysmorphic syndromes, addiction, a substance use disorder, drug abuse or dependence disorders, substance use disorders, disruptive behavior disorders, impulse control disorders, gaming disorders, gambling disorders, memory loss, dementia of aging, attention deficit hyperactivity disorder, personality disorders, attachment disorders, autism and dissociative disorders.
75. The method of any one of embodiments 62-74 wherein the host is a human.
76. The method of any one of embodiments 62-75 wherein the central nervous system disorder is post-traumatic stress disorder.
77. The method of any one of embodiments 62-75 wherein the central nervous system disorder is adjustment disorder.
78. The method of any one of embodiments 62-75 wherein the central nervous system disorder is generalized anxiety.
79. The method of any one of embodiments 62-75 wherein the central nervous system disorder is social anxiety.
80. The method of any one of embodiments 62-75 wherein the central nervous system disorder is depression.
81. The method of any one of embodiments 62-75 wherein the central nervous system disorder is a substance use disorder.
82. The method of any one of embodiments 62-75 wherein the central nervous system disorder is addiction.
83. The method of any one of embodiments 62-75 wherein the central nervous system disorder is an attachment disorder.
84. The method of any one of embodiments 62-75 wherein the central nervous system disorder is schizophrenia.
85. The method of any one of embodiments 62-75 wherein the central nervous system disorder is an eating disorder.
86. The method of embodiment 85 wherein the eating disorder is bulimia.
87. The method of embodiment 85 wherein the eating disorder is binge eating.
88. The method of embodiment 85 wherein the eating disorder is anorexia.

89. The method of any one of embodiments 62-88 wherein the compound, pure enantiomer, or enantiomerically enriched mixture is administered in a clinical setting.

90. The method of any one of embodiments 62-88 wherein the compound, pure enantiomer, or enantiomerically enriched mixture is administered in an at-home setting.

91. The method of any one of embodiments 62-88 wherein the compound, pure enantiomer, or enantiomerically enriched mixture is administered during a psychotherapy session.

92. The method of any one of embodiments 62-88 wherein the compound, pure enantiomer, or enantiomerically enriched mixture is administered during a counseling session.

93. A pharmaceutical composition comprising an effective patient-treating amount of a compound, pure enantiomer, or enantiomerically enriched mixture of any one of embodiments 1-61 and a pharmaceutically acceptable carrier or excipient.

94. The pharmaceutical composition of embodiment 93 wherein the composition is administered systemically.

95. The pharmaceutical composition of embodiment 93 wherein the composition is administered orally.

96. The pharmaceutical composition of any one of embodiments 93 wherein the composition is administered to mucosal tissue.

97. The pharmaceutical composition of embodiment 93 wherein the composition is administered rectally.

98. The pharmaceutical composition of embodiment 93 wherein the composition is administered topically.

99. The pharmaceutical composition of embodiment 93 wherein the composition is administered subcutaneously.

100. The pharmaceutical composition of embodiment 93 wherein the composition is administered intravenously.

101. The pharmaceutical composition of embodiment 93 wherein the composition is administered intramuscularly.

102. The pharmaceutical composition of embodiment 93 wherein the composition is administered via inhalation.

103. The pharmaceutical composition of embodiment 95 wherein the composition is administered as a tablet.

104. The pharmaceutical composition of embodiment 95 wherein the composition is administered as a gelcap.

105. The pharmaceutical composition of embodiment 95 wherein the composition is administered as a capsule.

106. The pharmaceutical composition of embodiment 95 wherein the composition is administered as an aqueous emulsion.

107. The pharmaceutical composition of embodiment 95 wherein the composition is administered as an aqueous solution.

108. The pharmaceutical composition of embodiment 95 wherein the composition is administered as a pill.

109. The pharmaceutical composition of embodiment 95 wherein the composition is administered as a buccal tablet.

110. The pharmaceutical composition of embodiment 95 wherein the composition is administered as a sublingual tablet.

111. The pharmaceutical composition of embodiment 95 wherein the composition is administered as a sublingual strip.

112. The pharmaceutical composition of embodiment 96 wherein the composition is administered as a sublingual liquid.

113. The pharmaceutical composition of embodiment 96 wherein the composition is administered as a sublingual spray.

114. The pharmaceutical composition of embodiment 96 wherein the composition is administered as a sublingual gel.

115. The pharmaceutical composition of embodiment 98 wherein the composition is administered as a cream.

116. The pharmaceutical composition of embodiment 98 wherein the composition is administered as a topical solution.

117. The pharmaceutical composition of embodiment 100 wherein the composition is administered as an aqueous solution.

118. The pharmaceutical composition of embodiment 102 wherein the composition is administered as a powder.

119. The pharmaceutical composition of embodiment 102 wherein the composition is administered as an aerosol.

120. A compound, pure enantiomer, or enantiomerically enriched mixture or pharmaceutical composition thereof according to any one of embodiments 1-61 or 93-119 for use in the treatment of a central nervous system disorder in a host.

121. The compound, pure enantiomer, enantiomerically enriched mixture, pharmaceutically acceptable salt, or pharmaceutical composition of embodiment 120 for use in the treatment of a central nervous system disorder selected from: post-traumatic stress disorder, depression, dysthymia, anxiety, generalized anxiety, social anxiety, panic, adjustment disorder, feeding and eating disorders, binge behaviors, body dysmorphic syndromes, addiction, a substance use disorder, drug abuse or dependence disorders, substance use disorders, disruptive behavior disorders, impulse control disorders, gaming disorders, gambling disorders, memory loss, dementia of aging, attention deficit hyperactivity disorder, personality disorders, attachment disorders, autism and a dissociative disorder in a host in need thereof.

122. The compound, pure enantiomer, or enantiomerically enriched mixture of any one of embodiments 120-121 wherein the host is a human.

123. The compound, pure enantiomer, or enantiomerically enriched mixture of any one of embodiments 120-121 wherein the central nervous system disorder is an anxiety disorder.

124. The compound, pure enantiomer, or enantiomerically enriched mixture of embodiment 123 wherein the anxiety disorder is generalized anxiety.

125. The compound, pure enantiomer, or enantiomerically enriched mixture of embodiment 123 wherein the anxiety disorder is social anxiety.

126. The compound, pure enantiomer, or enantiomerically enriched mixture of any one of embodiments 120-121 wherein the central nervous system disorder is depression.

127. The compound, pure enantiomer, or enantiomerically enriched mixture of any one of embodiments 120-121 wherein the central nervous system disorder is post-traumatic stress disorder.

128. The compound, pure enantiomer, or enantiomerically enriched mixture of any one of embodiments 120-121 wherein the central nervous system disorder is adjustment disorder.

129. The compound, pure enantiomer, or enantiomerically enriched mixture of any one of embodiments 120-121 wherein the central nervous system disorder is addiction.

130. The compound, pure enantiomer, or enantiomerically enriched mixture of any one of embodiments 120-121 wherein the central nervous system disorder is a substance use disorder.

131. The compound, pure enantiomer, or enantiomerically enriched mixture of any one of embodiments 120-121 wherein the central nervous system disorder is an attachment disorder.

132. The compound, pure enantiomer, or enantiomerically enriched mixture of any one of embodiments 120-121 wherein the central nervous system disorder is schizophrenia.

133. The compound, pure enantiomer, or enantiomerically enriched mixture of any one of embodiments 120-121 wherein the central nervous system disorder is an eating disorder.

134. The compound, pure enantiomer, or enantiomerically enriched mixture of embodiment 133 wherein the eating disorder is bulimia.

135. The compound, pure enantiomer, or enantiomerically enriched mixture of embodiment 133 wherein the eating disorder is binge eating.

136. The compound, pure enantiomer, or enantiomerically enriched mixture of embodiment 133 wherein the eating disorder is anorexia.

137. The compound, pure enantiomer, or enantiomerically enriched mixture of any one of embodiments 120-136 wherein the compound or enantiomerically enriched mixture is administered in a clinical setting.

138. The compound, pure enantiomer, or enantiomerically enriched mixture of any one of embodiments 120-136 wherein the compound or enantiomerically enriched mixture is administered in an at-home setting.

139. The compound, pure enantiomer, or enantiomerically enriched mixture of any one of embodiments 120-136 wherein the compound or enantiomerically enriched mixture is administered during a psychotherapy session.

140. The compound, pure enantiomer, or enantiomerically enriched mixture of any one of embodiments 120-136 wherein the compound or enantiomerically enriched mixture is administered during a counseling session.

141. Use of a compound, pure enantiomer, or enantiomerically enriched mixture or pharmaceutical composition thereof according to any one of embodiments 1-61 or 93-119 in the treatment of a central nervous system disorder in a host.

142. The use of embodiment 141 wherein the central nervous system disorder is selected from: post-traumatic stress disorder, depression, dysthymia, anxiety, generalized anxiety, social anxiety, panic, adjustment disorder, feeding and eating disorders, binge behaviors, body dysmorphic syndromes, addiction, drug abuse or dependence disorders, substance use disorders, disruptive behavior disorders impulse control disorders, gaming disorders, gambling disorders, memory loss, dementia of aging, attention deficit hyperactivity disorder, personality disorders, attachment disorders, autism and a dissociative disorder.

143. Use of a compound, pure enantiomer, or enantiomerically enriched mixture or pharmaceutical composition thereof according to any one of embodiments 1-61 or 93-119 in the manufacture of a medicament for the treatment of a central nervous system disorder in a host.

144. The use of any one of embodiments 141-143 wherein the central nervous system disorder is selected from: post-traumatic stress disorder, depression, dysthymia, anxiety, generalized anxiety, social anxiety, panic, adjustment disorder, feeding and eating disorders, binge behaviors, body dysmorphic syndromes, addiction, a substance use disorder, drug abuse or dependence disorders, substance use disorders, disruptive behavior disorders, impulse control disorders, gaming disorders, gambling disorders, memory loss, dementia of aging, attention deficit hyperactivity disorder, personality disorders, attachment disorders, autism and a dissociative disorder.

145. The use of any one of embodiments 141-144 wherein the host is a human.

146. The use of any one of embodiments 141-145 wherein the central nervous system disorder is an anxiety disorder.

147. The use of embodiment 146 wherein the anxiety disorder is generalized anxiety.

148. The use of embodiment 146 wherein the anxiety disorder is social anxiety.

149. The use of any one of embodiments 141-145 wherein the central nervous system disorder is depression.

150. The use of any one of embodiments 141-145 wherein the central nervous system disorder is post-traumatic stress disorder.

151. The use of any one of embodiments 141-145 wherein the central nervous system disorder is adjustment disorder.

152. The use of any one of embodiments 141-145 wherein the central nervous system disorder is addiction.

153. The use of any one of embodiments 141-145 wherein the central nervous system disorder is a substance use disorder.

154. The use of any one of embodiments 141-145 wherein the central nervous system disorder is an eating disorder.

155. The compound, pure enantiomer, or enantiomerically enriched mixture of any one of embodiments 1-61 wherein the compound has both serotonin-receptor dependent and dopamine-receptor-dependent activity.

Methods to Treat CNS Disorders including Mental Disorders and for Mental Enhancement The present invention also provides methods for modulating the CNS in mammals by administering a pharmaceutically effective amount of the compound(s) of Structures I or II including a human.

The present invention additionally provides methods for modulating the CNS in mammals by administering a pharmaceutically effective amount of the compound(s) of Formulas I or II including a human.

Structures I-VI and a compound of Formula I and II disclosed herein are useful in methods for treating a variety of diseases or disorders linked to inadequate functioning of neurotransmission in the CNS of mammals. Included among such disorders are depression, dysthymia, anxiety and phobia disorders (including generalized anxiety, social anxiety, panic, post-traumatic stress and adjustment disorders), feeding and eating disorders (including binge eating, bulimia, and anorexia nervosa), other binge behaviors, body dysmorphic syndromes, alcoholism, tobacco abuse, drug abuse or dependence disorders, disruptive behavior disorders, impulse control disorders, gaming disorders, gambling disorders, memory loss, dementia of aging, attention deficit hyperactivity disorder, personality disorders (including antisocial, avoidant, borderline, histrionic, narcissistic, obsessive compulsive, paranoid, schizoid and schizotypal personality disorders), attachment disorders, autism, and dissociative disorders.

In addition to treating various diseases and disorders, the employed methods of modulating activity of the serotonergic system in particular can be used to improve CNS functioning in non-disease states, such as reducing neuroticism and psychological defensiveness, increasing openness to experience, increasing creativity, and aiding decision-making. Any of these methods can employ a compound of Formula I or II or any one of Structures I-VI, either as a racemate, an individual enantiomer, an enantiomerically enriched mixture, or with deuterium-substitution, or more than one of these in combination. When referring to Structures herein, the terms accordingly should be understood to refer not only to the racemates of those structures, but also to single enantiomers, enantiomerically enriched mixtures, and structures with deuterium-substitution(s) or other modifications, as the context indicates and supports.

This invention also provides the use of a compound of Formula I, Formula II, or any of Structures I-VI for the manufacture of a medicament for the treatment of maladaptive response to perceived psychological threats. Additionally, this invention provides a pharmaceutical formulation adapted for the treatment of maladaptive response to perceived psychological threats containing a compound of Formula I, Formula II, or any one of Structures I-VI. Furthermore, this invention includes a method for the treatment of maladaptive response to perceived psychological threats that comprises administering an effective amount of a compound of Formula I, Formula II, or any one of Structures I-VI, given either in the context of psychotherapy or as a stand-alone treatment.

Non-Limiting Examples of Pharmacotherapeutic Counseling Use

Psychotherapy, cognitive enhancement, or life coaching conducted with a compound or pharmaceutically acceptable salt as described herein employed as an adjunct (hereafter, "pharmacotherapy" or "pharmacotherapy counseling") is typically conducted in widely spaced sessions with one, two, or rarely three or more administrations of an entactogen per session. These sessions can be as frequent as weekly but are more often approximately monthly or even less frequently. In most cases, a small number of pharmacotherapy counseling sessions, on the order of one to three, is needed for the patient to experience significant clinical progress, as indicated, for example, by a reduction in signs and symptoms of mental distress, by improvement in functioning in some domain of life, by arrival at a satisfactory solution to some problem, or by increased feelings of closeness to and understanding of some other person. In some embodiments, the psychotherapy, cognitive enhancement, or life coaching is conducted with an effective amount of enantiomerically enriched compound of Formula I, Formula II, or any one of Structures I-VI or a pharmaceutically acceptable salt thereof.

The following sections provide detailed examples of pharmacotherapy. While common procedures are described, these are intended as illustrative, non-restrictive examples. It is anticipated that the prescribing physician and therapy team may wish to specify different procedures than those described here based on their clinical judgment concerning the needs of the patient.

The example methods of treatment can also be modified with very minor changes to treat multiple patients at once, including couples or families. Hence, "patient" should be understood to mean one or more individuals.

Use of a Compound or Composition of the Present Invention in Conjunction with Conventional Psychotherapy or Coaching In certain embodiments, the use of a described aminoindane compound or composition of the present invention as pharmacotherapy is integrated into the patient's ongoing psychotherapy or coaching (hereafter abbreviated as "psychotherapy"). If a patient in need of the pharmacotherapy is not in ongoing psychotherapy, then psychotherapy may be initiated and the pharmacotherapy counseling added later, after the prescribing physician and treating psychotherapist, physician, coach, member of the clergy, or other similar professional or someone acting under the supervision of such a professional (hereafter, "therapist") agree that the pharmacotherapy counseling is indicated and that there have been sufficient meetings between the patient and therapist to establish an effective therapeutic alliance.

If the patient is not experienced with the pharmacotherapy, a conversation typically occurs in which the therapist or other members of the therapy team addresses the patient's questions and concerns about the medicine and familiarizes the patient with the logistics of pharmacotherapy-assisted session. The therapist describes the kinds of experience that can be expected during the pharmacotherapy session. Optionally, parts of this conversation employ written, recorded, or interactive digital explanations, as might be used in the informed consent process in a clinical trial. The therapist may additionally make commitments to support the participant's healthcare and wellness process. In turn, the patient may be asked to make commitments of their own (such as not to hurt themselves or others and to abstain from contra-indicated medicines or drugs for an adequate period before and after the pharmacotherapy).

A compound or composition of the invention (or alternately herein for convenience, the "medicine") is administered shortly before or during a scheduled psychotherapy session, with timing optionally selected so that therapeutic effects begin by the time the psychotherapy session begins. It is to be understood that references to administering the medicine "during" a psychotherapeutic or other session are intended to refer to timing the administration of the medicine such that the therapeutic effects of the medicine at least partly temporally overlap with the therapeutic effects of the session. Either shortly before or after administration of the medicine, it is common for the therapist to provide some reminder of their mutual commitments and expected events during the session.

The psychotherapy session is carried out by the therapist, who, optionally, may be remote and in communication with the patient using a communication means suitable for telehealth or telemedicine, such as a phone, video, or other remote two-way communication method. Optionally, video or other monitoring of the patient's response or behavior is used to document or measure the session. The therapist uses their clinical judgment and available data to adjust the session to the needs of the patient. Many therapists view their responsibility as being to facilitate rather than direct the patient's experience. This may sometimes involve silent empathic listening, while other times it may include more active support to help the patient arrive at new perspectives on their life.

It is anticipated that the therapeutic effects of the medicine will allow the patient to make more rapid therapeutic progress than would normally be possible. These effects include decreased neuroticism and increased feelings of authenticity. Patients are often able to calmly contemplate actual or possible experiences that would normally be upsetting or even overwhelming. This can facilitate decision making and creativity in addition to mental wellness.

Optionally, the prescribing physician may allow a second or even third administration of the medicine or another psychotherapeutic agent in order to extend the therapeutic effects. Optionally, a pharmaceutical preparation with modified release is employed to make this unnecessary.

Because the duration of the scheduled psychotherapy session may be shorter than the therapeutic effects of the medicine, the therapist may suggest to the patient activities to support further psychotherapeutic progress after the psychotherapy session has ended. Alternatively, the therapist may continue to work with the patient until the therapeutic effects of the medicine have become clinically minimal.

In a subsequent non-pharmacological psychotherapy session, the therapist and patient will typically discuss the patient's experiences from the pharmacotherapy session and the therapist will often aid the patient in recalling the therapeutic effects and help them to incorporate the experiences into their everyday lives.

Pharmacotherapy sessions may be repeated as needed, based on the judgment of the treating physician and therapy team regarding the needs of the patient.

Use of a Compound or Composition of the Present Invention Outside of Conventional Psychotherapy In certain embodiments, a compound or composition of the present invention is administered outside of a conventional psychotherapy. This method is a broader, more flexible approach to pharmacotherapy that is not centered on supervision by a therapist. These pharmacotherapy sessions can take place in many different quiet and safe settings, including the patient's home. The setting is typically chosen to offer a quiet setting, with minimal disruptions, where the patient feels psychologically safe and emotionally relaxed. The setting may be the patient's home but may alternatively be a clinic, retreat center, or hotel room.

Optionally, a checklist may be followed to prepare the immediate environment to minimize distractions and maximize therapeutic or decision-making benefits. This checklist can include items such as silencing phones and other communications devices, cleaning and tidying the environment, preparing light refreshments, preparing playlists of appropriate music, and pre-arranging end-of-session transportation if the patient is not undergoing pharmacotherapy at home.

Before the pharmacotherapy session, there may be an initial determination of the therapeutic or other life-related goals (for example, decision-making, increasing creativity, or simply appreciation of life) that will be a focus of the session. These goals can optionally be determined in advance with support from a therapist.

Optionally, the therapist may help the patient select stimuli, such as photographs, videos, augmented or virtual reality scenes, or small objects such as personal possessions, that will help focus the patient's attention on the goals of the session or on the patient's broader life journey. As examples that are intended to be illustrative and not restrictive, these stimuli can include photographs of the patient from when they were young, which can increase self-compassion, or can include stimuli relating to traumatic events or phobias experienced by the patient, which can help the patient reevaluate and change their response to such stimuli. Optionally, the patient selects these stimuli without assistance (for example, without the involvement of the therapist) or does not employ any stimuli. Optionally, stimuli are selected in real time by the therapist or an algorithm based on the events of the session with the goal of maximizing benefits to the patient.

If the patient is not experienced with the pharmacotherapy, a conversation occurs in which the therapist addresses the patient's questions and concerns about the medicine and familiarizes the patient with the logistics of a pharmacotherapy-assisted session. The therapist describes the kinds of experience that can be expected during the pharmacotherapy-assisted session. Optionally, parts of this conversation employ written, recorded, or interactive digital explanations, as might be used in the informed consent process in a clinical trial. The therapist may additionally make commitments to support the participant's healthcare and wellness process. In turn, the patient may be asked to make commitments of their own (such as not to hurt themselves or others and to abstain from contraindicated medicines or drugs for an adequate period before and after the pharmacotherapy).

Selected session goals and any commitments or other agreements regarding conduct between the patient and therapy team are reviewed immediately before administration of the medicine. Depending on the pharmaceutical preparation and route of administration, the therapeutic effects of the medicine usually begin within one hour. Typical therapeutic effects include decreased neuroticism and increased feelings of authenticity. Patients are often able to calmly contemplate experiences or possible experiences that would normally be upsetting or even overwhelming. This can facilitate decision making and creativity in addition to mental wellness.

Optionally, sleep shades and earphones with music or soothing noise may be used to reduce distractions from the environment. Optionally, a virtual reality or immersive reality system may be used to provide stimuli that support the therapeutic process. Optionally, these stimuli are preselected; optionally, they are selected in real time by a person, or an algorithm based on events in the session with the goal of maximizing benefits to the patient. Optionally, a therapist or other person well-known to the patient is present or available nearby or via phone, video, or other communication method in case the patient wishes to talk, however the patient may optionally undergo a session without the assistance of a therapist. Optionally, the patient may write or create artwork relevant to the selected session goals. Optionally, the patient may practice stretches or other beneficial body movements, such as yoga ("movement activity").

Optionally, in other embodiments the patient may practice movement activity that includes more vigorous body movements, such as dance or other aerobic activity. Movement activity also may make use of exercise equipment such as a treadmill or bicycle.

In some additional embodiments, the patient may be presented with music, video, auditory messages, or other perceptual stimuli. Optionally, these stimuli may be adjusted based on the movements or other measurable aspects of the patient. Such adjustment may be done by the therapist with or without the aid of a computer, or by a computer alone in response to the patient aspects, including by an algorithm or artificial intelligence, and "computer" broadly meaning any electronic tool suitable for such purposes, whether worn or attached to a patient (for example, watches, fitness trackers, "wearables," and other personal devices; biosensors or medical sensors; medical devices), whether directly coupled or wired to a patient or wirelessly connected (and including desktop, laptop, and notebook computers; tablets, smartphones, and other mobile devices; and the like), and whether within the therapy room or remote (for example, cloud-based systems).

For example, measurable aspects of a patient (for example, facial expression, eye movements, respiration rate, pulse rate, skin color change, patient voice quality or content, patient responses to questions) from these tools may be individually transformed into scores on standardized scales by subtracting a typical value and then multiplying by a constant and these scores may be further multiplied by constants and added together to create an overall score that can optionally be transformed by multiplication with a link function, such as the logit function, to create an overall score. This score may be used to select or adjust stimuli such as selecting music with higher or lower beats-per-minute or with faster or slower notes, selecting images, audio, or videos with different emotionality or autobiographical meaning, or selecting activities for the patient to engage in (such as specific movements, journaling prompts, or meditation mantras).

It should be readily appreciated that a patient can participate in numerous therapeutically beneficial activities, where such participation follows or is in conjunction with the administration of a compound or composition of the invention, including writing about a preselected topic, engaging in yoga or other movement activity, meditating, creating art, viewing of photographs or videos or emotionally evocative objects, using a virtual reality or augmented reality system, talking with a person, and thinking about a preselected problem or topic, and it should be understood that such participation can occur with or without the participation or guidance of a therapist.

Optionally, the prescribing physician may allow a second or even third administration of the medicine or another psychotherapeutic agent in order to extend the therapeutic effects. Optionally, a pharmaceutical preparation with modified release is employed to make this unnecessary.

The patient typically remains in the immediate environment until the acute therapeutic effects of the medicine are clinically minimal, usually within eight hours. After this point, the session is considered finished.

The treatment plan will often include a follow-up session with a therapist. This follow-up session occurs after the pharmacotherapy counseling session has ended, often the next day but sometimes several days later. In this session, the patient discusses their experiences from the pharmacotherapy counseling session with the therapist, who can aid them in recalling the therapeutic effects and help them to incorporate the experiences into their everyday lives.

Pharmacotherapy counseling sessions may be repeated as needed, based on the judgment of the treating physician and therapy team regarding the needs of the patient.

Pharmaceutical Compositions and Salts

While it is possible to administer a compound employed in the methods of this invention directly without any formulation, a compound is usually administered in the form of pharmaceutical compositions comprising a pharmaceutically acceptable carrier, diluent, or excipient, and at least one active ingredient. "Pharmaceutically acceptable" as used in connection with an excipient, carrier, or diluent means an excipient, carrier, or diluent that is useful in preparing a pharmaceutical composition that is generally safe, non-toxic, and neither biologically nor otherwise undesirable for veterinary use and/or human pharmaceutical use. These compositions can be administered by a variety of routes including systemic, topical, parenteral, oral, mucosal (for example, buccal, sublingual), rectal, transdermal, subcutaneous, intravenous, intramuscular, inhaled, and intranasal. Such compositions are prepared in a manner well known in the pharmaceutical art and comprise at least one active compound. (See, for example, Remington, 2005, Remington: The science and practice of pharmacy, 21st ed., Lippincott Williams & Wilkins.)

The pharmaceutical composition may be formulated as any pharmaceutically useful form, for example, a solid dosage form, a liquid, an aerosol, a cream, a gel, a pill, an injection or infusion solution, a capsule, a tablet, a syrup, a transdermal patch, a subcutaneous patch, a dry powder, an inhalation formulation, a suppository, a buccal or sublingual formulation, a parenteral formulation, an ophthalmic solution, or in a medical device. Some dosage forms, such as tablets and capsules, are subdivided into suitably sized unit doses containing appropriate quantities of the active components, for example, an effective amount to achieve the desired purpose.

A "pharmaceutically acceptable composition" thus refers to at least one compound (which may be a mixture of enantiomers or diastereomers, as fully described herein) of the invention and a pharmaceutically acceptable vehicle, excipient, diluent or other carrier in an effective amount to treat a host, typically a human, who may be a patient.

In certain nonlimiting embodiments the pharmaceutical composition is a dosage form that contains from about 0.1 mg to about 1500 mg, from about 10 mg to about 1000 mg, from about 100 mg to about 800 mg, or from about 200 mg to about 600 mg of the active compound and optionally from about 0.1 mg to about 1500 mg, from about 10 mg to about 1000 mg, from about 100 mg to about 800 mg, or from about 200 mg to about 600 mg of an additional active agent in a unit dosage form. Examples are dosage forms with at least 0.1, 1, 5, 10, 20, 25, 40, 50, 100, 125, 150, 200, 250, 300, 400, 500, 600, 700, or 750 mg of active compound, or its salt or salt mixture.

The pharmaceutical compositions described herein can be formulated into any suitable dosage form, including aqueous oral dispersions, aqueous oral suspensions, solid dosage forms including oral solid dosage forms, aerosols, controlled release formulations, fast melt formulations, effervescent formulations, self-emulsifying dispersions, solid solutions, liposomal dispersions, lyophilized formulations, tablets, capsules, pills, powders, delayed-release formulations, immediate-release formulations, modified release formulations, extended-release formulations, pulsatile release formulations, multi particulate formulations, and mixed immediate release and controlled release formulations. Generally speaking, one will desire to administer an amount of the active agents of the present invention that is effective to achieve a plasma level commensurate with the concentrations found to be effective in vivo for a period of time effective to elicit a desired therapeutic effect without abuse liability.

In making the compositions employed in the present invention the active ingredient is usually mixed with an excipient, diluted by an excipient, or enclosed within such a carrier which can be in the form of a capsule, sachet, paper or other container. When the excipient serves as a diluent, it can be a solid, semi-solid, or liquid material, which acts as a vehicle, carrier, or medium for the active ingredient. Thus, the compositions can be in the form of tablets (including orally disintegrating, swallowable, sublingual, buccal, and chewable tablets), pills, powders, lozenges, troches, oral films, thin strips, sachets, cachets, elixirs, suspensions, emulsions, solutions, slurries, syrups, aerosols (as a solid or in a liquid medium), ointments containing for example up to 10% by weight of the active compound, soft and hard gelatin capsules, suppositories, dry powders for inhalation, liquid preparations for vaporization and inhalation, topical preparations, transdermal patches, sterile injectable solutions, and sterile packaged powders. Compositions may be formulated as immediate release, controlled release, sustained (extended) release or modified release formulations.

Other embodiments of the invention include multiple routes of administration, which may differ in different patients according to their preference, co-morbidities, side effect profile, and other factors (IV, PO, transdermal, etc.). Other embodiments of the invention include the presence of other substances with the active drugs, known to those skilled in the art, such as fillers, carriers, gels, skin patches, lozenges, or other modifications in the preparation to facilitate absorption through various routes (such as gastrointestinal, transdermal, etc.) and/or to extend the effect of the drugs, and/or to attain higher or more stable serum levels or to enhance the therapeutic effect of the active drugs in the combination.

In preparing a formulation, it may be necessary to mill the active compound to provide the appropriate particle size prior to combining with the other ingredients. If the active compound is substantially insoluble, it ordinarily is milled to a particle size of less than 200 mesh. If the active compound is substantially water soluble, the particle size is normally adjusted by milling to provide a substantially uniform distribution in the formulation, for example, about 40 mesh.

Some examples of suitable excipients include lactose, dextrose, sucrose, sorbitol, mannitol, starches, gum acacia, calcium phosphate, alginates, tragacanth, gelatin, calcium silicate, microcrystalline cellulose, polyvinylpyrrolidone, cellulose, water, syrup, and methyl cellulose. The formulations can additionally include: lubricating agents such as talc, magnesium stearate, and mineral oil; wetting agents; emulsifying and suspending agents; preserving agents such as methyl- and propylhydroxybenzoates; sweetening agents; and flavoring agents. The compositions of the invention can be formulated so as to provide quick, sustained or delayed release of the active ingredient after administration to the patient by employing procedures known in the art.

The compositions are typically formulated in a unit dosage form, each dosage containing from about 0.05 to about 350 mg, more typically about 5.0 to about 180 mg, of the active ingredients. The term "unit dosage form" refers to physically discrete units suitable as unitary dosages for human subjects and other mammals, each unit containing a predetermined quantity of active material calculated to produce the desired therapeutic effect, in association with a suitable pharmaceutical carrier, diluent, or excipient.

For example, some dosages fall within the range of at least about 0.01 to about 4 mg/kg or less. In the treatment of adult humans, the range of at least about 0.2 to about 3 mg/kg or less, in single dose may be useful.

It will be understood that the amount of the compound actually administered will be determined by a physician, in light of the relevant circumstances, including the condition to be treated, the chosen route of administration, the actual compound or compounds administered, the age, weight, and response of the individual patient, and the severity of the patient's symptoms, and therefore the above dosage ranges are not intended to limit the scope of the invention in any way.

In some instances, dosage levels below the lower limit of the aforesaid range may be more than adequate, while in other cases still larger doses may be employed without causing any harmful side effects, provided for instance that such larger doses may be first divided into several smaller doses for administration.

Generally, the pharmaceutical compositions of the invention may be administered and dosed in accordance with good medical practice, taking into account the method and scheduling of administration, prior and concomitant medications and medical supplements, the clinical condition of the individual patient and the severity of the underlying disease, the patient's age, sex, body weight, and other such factors relevant to medical practitioners, and knowledge of the particular compound(s) used. Starting and maintenance dosage levels thus may differ from patient to patient, for individual patients across time, and for different pharmaceutical compositions, but shall be able to be determined with ordinary skill.

In other embodiments, a powder comprising the active agents of the present invention formulations described herein may be formulated to comprise one or more pharmaceutical excipients and flavors. Such a powder may be prepared, for example, by mixing the active agents of the present invention formulation and optional pharmaceutical excipients to form a bulk blend composition. Additional embodiments also comprise a suspending agent and/or a wetting agent. This bulk blend is uniformly subdivided into unit dosage packaging or multi-dosage packaging units. The term "uniform" means the homogeneity of the bulk blend is substantially maintained during the packaging process.

Oral Formulations

In certain embodiments, a compound of Formula I, Formula II, or any one of Structures I-VI may be formulated in a pharmaceutically acceptable oral dosage form. Oral dosage forms may include but are not limited to, oral solid dosage forms and oral liquid dosage forms. Oral solid dosage forms may include but are not limited to, tablets, capsules, caplets, powders, pellets, multiparticulates, beads, spheres and/or any combinations thereof. These oral solid dosage forms may be formulated as immediate release, controlled release, sustained (extended) release or modified release formulations.

The oral solid dosage forms of the present invention may also contain pharmaceutically acceptable excipients such as fillers, diluents, lubricants, surfactants, glidants, binders, dispersing agents, suspending agents, disintegrants, viscosity-increasing agents, film-forming agents, granulation aid, flavoring agents, sweetener, coating agents, solubilizing agents, and combinations thereof.

In some embodiments, the solid dosage forms of the present invention may be in the form of a tablet (including a suspension tablet, a fast-melt tablet, a bite-disintegration tablet, a rapid-disintegration tablet, an effervescent tablet, or a caplet), a pill, a powder (including a sterile packaged powder, a dispensable powder, or an effervescent powder), a capsule (including both soft or hard capsules, for example, capsules made from animal-derived gelatin or plant-derived HPMC, or "sprinkle capsules"), solid dispersion, solid solution, bioerodible dosage form, controlled release formulations, pulsatile release dosage forms, multiparticulate dosage forms, pellets, granules, or an aerosol. In other embodiments, the pharmaceutical formulation is in the form of a powder. In still other embodiments, the pharmaceutical formulation is in the form of a tablet, including a fast-melt tablet. Additionally, pharmaceutical formulations of the present invention may be administered as a single capsule or in multiple capsule dosage form. In some embodiments, the pharmaceutical formulation is administered in two, or three, or four, capsules or tablets.

The pharmaceutical solid dosage forms described herein can comprise the active agents of the present invention compositions described herein and one or more pharmaceutically acceptable additives such as a compatible carrier, binder, complexing agent, ionic dispersion modulator, filling agent, suspending agent, flavoring agent, sweetening agent, disintegrating agent, dispersing agent, surfactant, lubricant, colorant, diluent, solubilizer, moistening agent, plasticizer, stabilizer, penetration enhancer, wetting agent, anti-foaming agent, antioxidant, preservative, or one or more combination thereof.

In still other aspects, using standard coating procedures, such as those described in Remington's Pharmaceutical Sciences, 20th Edition (2000), a film coating is provided around the active agent of the present invention formulation. In certain embodiments, some or all of the active agent of the present invention particles are coated. In another embodiment, some or all of the active agent of the present invention particles are microencapsulated. In yet another embodiment, some or all of the active agent of the present invention is amorphous material coated and/or microencapsulated with inert excipients. In still another embodiment, the active agent of the present invention particles are not microencapsulated and are uncoated.

Suitable carriers for use in the solid dosage forms described herein include acacia, gelatin, colloidal silicon dioxide, calcium glycerophosphate, calcium lactate, maltodextrin, glycerin, magnesium silicate, sodium caseinate, soy lecithin, sodium chloride, tricalcium phosphate, dipotassium phosphate, sodium stearoyl lactylate, carrageenan, monoglyceride, diglyceride, pregelatinized starch, hydroxypropylmethylcellulose, hydroxypropylmethylcellulose acetate stearate, sucrose, microcrystalline cellulose, lactose, mannitol and the like.

Suitable filling agents for use in the solid dosage forms described herein include lactose, calcium carbonate, calcium phosphate, dibasic calcium phosphate, calcium sulfate, microcrystalline cellulose (for example, Avicel®, Avicel® PH101, Avicel® PH102, Avicel® PH105, etc.), cellulose powder, dextrose, dextrates, dextrose, dextran, starches, pregelatinized starch, hydroxypropylmethylcellulose (HPMC), hydroxypropylmethylcellulose phthalate, hydroxypropylmethylcellulose acetate stearate (HPMCAS), sucrose, xylitol, lactitol, mannitol, sorbitol, sodium chloride, polyethylene glycol, and the like.

If needed, suitable disintegrants for use in the solid dosage forms described herein include natural starch such as corn starch or potato starch, a pregelatinized starch such as National 1551 or Amijel®, or a sodium starch glycolate such as Promogel® or Explotab®, a cellulose such as a wood product, microcrystalline cellulose, for example, Avicel®, Avicel® PH101, Avicel® PH102, Avicel® PH105, Elcema® P100, Emcocel®, Vivacel®, Ming Tia®, and Solka-Floc®, Ac-Di-Sol, methylcellulose, croscarmellose, or a cross-linked cellulose, such as cross-linked sodium carboxymethylcellulose (Ac-Di-Sol®), cross-linked carboxymethylcellulose, or cross-linked croscarmellose, a cross-linked starch such as sodium starch glycolate, a cross-linked polymer such as crosspovidone, a cross-linked polyvinylpyrrolidone, alginate such as alginic acid or a salt of alginic acid such as sodium alginate, a clay such as Veegum® HV (magnesium aluminum silicate), a gum such as agar, guar, locust bean, Karaya, pectin, or tragacanth, sodium starch glycolate, bentonite, a natural sponge, a surfactant, a resin such as a cation-exchange resin, citrus pulp, sodium lauryl sulfate, sodium lauryl sulfate in combination starch, and the like.

Binders impart cohesiveness to solid oral dosage form formulations: for powder-filled capsule formulation, they aid in plug formation that can be filled into soft- or hard-shell capsules and in tablet formulation, binders ensure that the tablet remains intact after compression and help assure blend uniformity prior to a compression or fill step. Materials suitable for use as binders in the solid dosage forms described herein include carboxymethylcellulose, methylcellulose (for example, Methocel®), hydroxypropylmethylcellulose (for example, Hypromellose USP Pharmacoat-603, hydroxypropylmethylcellulose acetate stearate (Aqoate HS-LF and HS), hydroxyethyl cellulose, hydroxypropylcellulose (for example, Klucel®), ethylcellulose (for example, Ethocel®), and microcrystalline cellulose (for example, Avicel®), microcrystalline dextrose, amylose, magnesium aluminum silicate, polysaccharide acids, bentonites, gelatin, polyvinylpyrrolidone/vinyl acetate copolymer, crosspovidone, povidone, starch, pregelatinized starch, tragacanth, dextrin, a sugar, such as sucrose (for example, Dipac®), glucose, dextrose, molasses, mannitol, sorbitol, xylitol (for example, Xylitab®), lactose, a natural or synthetic gum such as acacia, tragacanth, ghatti gum, mucilage of isapol husks, starch, polyvinylpyrrolidone (for example, Povidone® CL, Kollidon® CL, Polyplasdone® XL-10, and Povidone® K-12), larch arabogalactan, Veegum®, polyethylene glycol, waxes, sodium alginate, and the like. In general, binder levels of 20-70% are typically used in powder-filled gelatin capsule formulations. Binder usage level in tablet formulations is a function of whether direct compression, wet granulation, roller compaction, or usage of other excipients such as fillers which itself can act as moderate binders are used. Formulators skilled in the art can determine the binder level for the formulations, but binder usage level of up to 70% in tablet formulations is common.

Suitable lubricants or glidants for use in the solid dosage forms described herein include stearic acid, calcium hydroxide, talc, corn starch, sodium stearyl fumarate, alkali-metal and alkaline earth metal salts, such as aluminum, calcium, magnesium, zinc, stearic acid, sodium stearates, magnesium stearate, zinc stearate, waxes, Stearowet®, boric acid, sodium benzoate, sodium acetate, sodium chloride, leucine, a polyethylene glycol or a methoxypolyethylene glycol such as Carbowax™, PEG 4000, PEG 5000, PEG 6000, propylene glycol, sodium oleate, glyceryl behenate, glyceryl palmitostearate, glyceryl benzoate, magnesium or sodium lauryl sulfate, and the like.

Suitable diluents for use in the solid dosage forms described herein include sugars (including lactose, sucrose, and dextrose), polysaccharides (including dextrates and maltodextrin), polyols (including mannitol, xylitol, and sorbitol), cyclodextrins and the like.

Non-water-soluble diluents are compounds typically used in the formulation of pharmaceuticals, such as calcium phosphate, calcium sulfate, starches, modified starches and microcrystalline cellulose, and micro cellulose (for example, having a density of about 0.45 g/cm3, for example Avicel®, powdered cellulose), and talc.

Suitable wetting agents for use in the solid dosage forms described herein include oleic acid, glyceryl monostearate, sorbitan monooleate, sorbitan monolaurate, triethanolamine oleate, polyoxyethylene sorbitan monooleate, polyoxyethylene sorbitan monolaurate, quaternary ammonium compounds (for example, Polyquat 10®), sodium oleate, sodium lauryl sulfate, magnesium stearate, sodium docusate, triacetin, vitamin E TPGS and the like. Wetting agents include surfactants.

Suitable surfactants for use in the solid dosage forms described herein include docusate and its pharmaceutically acceptable salts, sodium lauryl sulfate, sorbitan monooleate, polyoxyethylene sorbitan monooleate, polysorbates, poloxamers, bile salts, glyceryl monostearate, copolymers of ethylene oxide and propylene oxide, for example, Pluronic® (BASF), and the like.

Suitable suspending agents for use in the solid dosage forms described here include polyvinylpyrrolidone, for example, polyvinylpyrrolidone K12, polyvinylpyrrolidone K17, polyvinylpyrrolidone K25, or polyvinylpyrrolidone K30, polyethylene glycol, for example, the polyethylene glycol can have a molecular weight of about 300 to about 6000, or about 3350 to about 4000, or about 7000 to about 18000, vinylpyrrolidone/vinyl acetate copolymer (S630), sodium alginate, gums, such as, for example, gum tragacanth and gum acacia, guar gum, xanthans, including xanthan gum, sugars, cellulosic, such as, for example, sodium carboxymethylcellulose, methylcellulose, sodium carboxymethylcellulose, hydroxypropylmethylcellulose, hydroxyethyl cellulose, polysorbate-80, polyethoxylated sorbitan monolaurate, polyethoxylated sorbitan monolaurate, povidone and the like.

Suitable antioxidants for use in the solid dosage forms described herein include, for example, butylated hydroxytoluene (BHT), butyl hydroxyanisole (BHA), sodium ascorbate, Vitamin E TPGS, ascorbic acid, sorbic acid and tocopherol.

Immediate-release formulations may be prepared by combining superdisintegrants such as Croscarmellose sodium and different grades of microcrystalline cellulose in different ratios. To aid disintegration, sodium starch glycolate will be added.

The above-listed additives should be taken as merely examples and not limiting, of the types of additives that can be included in solid dosage forms of the present invention. The amounts of such additives can be readily determined by one skilled in the art, according to the particular properties desired.

Oral liquid dosage forms include solutions, emulsions, suspensions, and syrups. These oral liquid dosage forms may be formulated with any pharmaceutically acceptable excipient known to those of skill in the art for the preparation of liquid dosage forms. For example, water, glycerin, simple syrup, alcohol, and combinations thereof.

Liquid dosage forms for oral administration may be in the form of pharmaceutically acceptable emulsions, syrups, elixirs, suspensions, and solutions, which may contain an inactive diluent, such as water. Pharmaceutical formulations and medicaments may be prepared as liquid suspensions or solutions using a sterile liquid, such as but not limited to, an oil, water, an alcohol, and combinations of these pharmaceutically suitable surfactants, suspending agents, emulsifying agents, may be added for oral or parenteral administration. Suspensions may include oils. Such oils include peanut oil, sesame oil, cottonseed oil, corn oil, and olive oil. Suspension preparation may also contain esters of fatty acids such as ethyl oleate, isopropyl myristate, fatty acid glycerides, and acetylated fatty acid glycerides. Suspension formulations may include alcohols, such as ethanol, isopropyl alcohol, hexadecyl alcohol, glycerol, and propylene glycol. Ethers, such as poly(ethylene glycol), petroleum hydrocarbons such as mineral oil and petrolatum, and water may also be used in suspension formulations.

In some embodiments, formulations are provided comprising particles of a compound of Formula I, Formula II, or any one of Structures I-VI and at least one dispersing agent or suspending agent for oral administration to a subject. The formulation may be a powder and/or granules for suspension, and upon admixture with water, a substantially uniform suspension is obtained. As described herein, the aqueous dispersion can comprise amorphous and non-amorphous particles consisting of multiple effective particle sizes such that the drug is absorbed in a controlled manner over time. In certain embodiments, the aqueous dispersion or suspension is an immediate-release formulation. In another embodiment, an aqueous dispersion comprising amorphous particles is formulated such that a portion of the particles of the present invention are absorbed within, for example, about 0.75 hours after administration and the remaining particles are absorbed 2 to 4 hours after absorption of the earlier particles.

In other embodiments, addition of a complexing agent to the aqueous dispersion results in a larger span of the particles to extend the drug absorption phase of the active agents such that 50-80% of the particles are absorbed in the first hour and about 90% are absorbed by about 4 hours. Dosage forms for oral administration can be aqueous suspensions selected from the group including pharmaceutically acceptable aqueous oral dispersions, emulsions, solutions, and syrups. See, for example, Singh et al., Encyclopedia of Pharm. Tech., 2nd Ed., 754-757 (2002). In addition to the active agents of the present invention particles, the liquid dosage forms may comprise additives, such as (a) disintegrating agents; (b) dispersing agents; (c) wetting agents; (d) at least one preservative; (e) viscosity enhancing agents; (f) at least one sweetening agent; and (g) at least one flavoring agent.

Examples of disintegrating agents for use in the aqueous suspensions and dispersions include a starch, for example, a natural starch such as corn starch or potato starch, a pregelatinized starch such as National 1551 or Amijel®, or sodium starch glycolate such as Promogel® or Explotab®; a cellulose such as a wood product, microcrystalline cellulose, for example, Avicel®, Avicel® PH101, Avicel® PH102, Avicel® PH105, Elcema® P100, Emcocel®, Vivacel®, Ming Tia®, and Solka-Floc®, methylcellulose, croscarmellose, or a cross-linked cellulose, such as cross-linked sodium carboxymethylcellulose (Ac-Di-Sol®), cross-linked carboxymethylcellulose, or cross-linked croscarmellose; a cross-linked starch such as sodium starch glycolate; a cross-linked polymer such as crosspovidone; a cross-linked polyvinylpyrrolidone; alginate such as alginic acid or a salt of alginic acid such as sodium alginate; a clay such as Veegum® HV (magnesium aluminum silicate); a gum such as agar, guar, locust bean, Karaya, pectin, or tragacanth; sodium starch glycolate; bentonite; a natural sponge; a surfactant; a resin such as a cation-exchange resin; citrus pulp; sodium lauryl sulfate; sodium lauryl sulfate in combination starch; and the like.

In some embodiments, the dispersing agents suitable for the aqueous suspensions and dispersions described herein are known in the art and include hydrophilic polymers, electrolytes, Tween® 60 or 80, PEG, polyvinylpyrrolidone (PVP; commercially known as Plasdone®), and the carbohydrate-based dispersing agents such as, for example, hydroxypropylcellulose and hydroxypropylcellulose ethers (for example, HPC, HPC-SL, and HPC-L), hydroxypropylmethylcellulose and hydroxypropylmethylcellulose ethers (for example, HPMC K100, HPMC K4M, HPMC K15M, and HPMC K100M), carboxymethylcellulose sodium, methylcellulose, hydroxyethylcellulose, hydroxypropylmethylcellulose phthalate, hydroxypropylmethylcellulose acetate stearate, noncrystalline cellulose, magnesium aluminum silicate, triethanolamine, polyvinyl alcohol (PVA), polyvinylpyrrolidone/vinyl acetate copolymer (Plasdone®, for example, S-630), 4-(1,1,3,3-tetramethylbutyl)-phenol polymer with ethylene oxide and formaldehyde (also known as tyloxapol), poloxamers (for example, Pluronics F68®, F88®, and F108®, which are block copolymers of ethylene oxide and propylene oxide); and poloxamines (for example, Tetronic 908®, also known as Poloxamine 908®, which is a tetrafunctional block copolymer derived from sequential addition of propylene oxide and ethylene oxide to ethylenediamine (BASF Corp., Parsippany, N.J.)).

In other embodiments, the dispersing agent is selected from a group not comprising one of the following agents: hydrophilic polymers; electrolytes; Tween® 60 or 80; PEG; polyvinylpyrrolidone (PVP); hydroxypropyl cellulose and hydroxypropyl cellulose ethers (for example, HPC, HPC-SL, and HPC-L); hydroxypropyl methylcellulose and hydroxypropyl methylcellulose ethers (for example, HPMC K100, HPMC K4M, HPMC K15M, HPMC K100M, and Pharmacoat® USP 2910 (Shin-Etsu)); carboxymethylcellulose sodium; methylcellulose; hydroxyethyl cellulose; hydroxypropylmethylcellulose phthalate; hydroxypropylmethylcellulose acetate stearate; non-crystalline cellulose; magnesium aluminum silicate; triethanolamine; polyvinyl alcohol (PVA); 4-(1,1,3,3-tetramethyl butyl)-phenol polymer with ethylene oxide and formaldehyde; poloxamers (for example, Pluronics F68®, F88®, and F108®, which are block copolymers of ethylene oxide and propylene oxide); or poloxamines (for example, Tetronic 908® or Poloxamine 908®).

Wetting agents (including surfactants) suitable for the aqueous suspensions and dispersions described herein are known in the art and include acetyl alcohol, glycerol monostearate, polyoxyethylene sorbitan fatty acid esters (for example, the commercially available Tweens® such as for example, Tween 20® and Tween 80® (ICI Specialty Chemicals)), and polyethylene glycols (for example, Carbowaxs 3350® and 1450®, and Carpool 934® (Union Carbide)), oleic acid, glyceryl monostearate, sorbitan monooleate, sorbitan monolaurate, triethanolamine oleate, polyoxyethylene sorbitan monooleate, polyoxyethylene sorbitan monolaurate, sodium oleate, sodium lauryl sulfate, sodium docusate, triacetin, vitamin E TPGS, sodium taurocholate, simethicone, phosphatidylcholine and the like.

Suitable preservatives for the aqueous suspensions or dispersions described herein include potassium sorbate, parabens (for example, methylparaben and propylparaben) and their salts, benzoic acid and its salts, other esters of para hydroxybenzoic acid such as butylparaben, alcohols such as ethyl alcohol or benzyl alcohol, phenolic compounds such as phenol, or quaternary compounds such as benzalkonium chloride. Preservatives, as used herein, are incorporated into the dosage form at a concentration sufficient to inhibit microbial growth.

In some embodiments, the aqueous liquid dispersion can comprise methylparaben and propylparaben in a concentration ranging from about 0.01% to about 0.3% methylparaben by weight to the weight of the aqueous dispersion and about 0.005% to about 0.03% propylparaben by weight to the total aqueous dispersion weight. In yet another embodiment, the aqueous liquid dispersion can comprise methylparaben from about 0.05 to about 0.1 weight % and propylparaben from about 0.01 to about 0.02 weight % of the aqueous dispersion.

Suitable viscosity enhancing agents for the aqueous suspensions or dispersions described herein include methyl cellulose, xanthan gum, carboxymethylcellulose, hydroxypropyl cellulose, hydroxypropylmethyl cellulose, Plasdone® S-630, carbomer, polyvinyl alcohol, alginates, acacia, chitosans and combinations thereof. The concentration of the viscosity-enhancing agent will depend upon the agent selected and the viscosity desired.

In addition to the additives listed above, the liquid active agents of the present invention formulations can also comprise inert diluents commonly used in the art, such as water or other solvents, solubilizing agents, emulsifiers, and/or sweeteners.

In still other embodiments, effervescent powders containing a compound of Formula I, Formula II, or any one of Structures I-VI. Effervescent salts have been used to disperse medicines in water for oral administration. Effervescent salts are granules or coarse powders containing a medicinal agent in a dry mixture, usually composed of sodium bicarbonate, citric acid and/or tartaric acid. When salts of the present invention are added to water, the acids and the base react to liberate carbon dioxide gas, thereby causing "effervescence." Examples of effervescent salts include sodium bicarbonate or a mixture of sodium bicarbonate and sodium carbonate, citric acid and/or tartaric acid. Any acid-base combination that results in the liberation of carbon dioxide can be used in place of the combination of sodium bicarbonate and citric and tartaric acids, as long as the ingredients were suitable for pharmaceutical use and result in a pH of about 6.0 or higher.

Tablets of the invention described here can be prepared by methods well known in the art. Various methods for the preparation of the immediate release, modified release, controlled release, and extended-release dosage forms (for example, as matrix tablets, tablets having one or more modified, controlled, or extended-release layers, etc.) and the vehicles therein are well known in the art. Generally recognized compendia of methods include: Remington: The Science and Practice of Pharmacy, Alfonso R. Gennaro, Editor, 20th Edition, Lippincott Williams & Wilkins, Philadelphia, PA; and Sheth et al. (1980), Compressed tablets, in Pharmaceutical dosage forms, Vol. 1, edited by Lieberman and Lachtman, Dekker, NY.

In certain embodiments, solid dosage forms, for example, tablets, effervescent tablets, and capsules, are prepared by mixing the active agents of the present invention particles with one or more pharmaceutical excipients to form a bulk blend composition. When referring to these bulk blend compositions as homogeneous, it is meant that the active agents of the present invention particles are dispersed evenly throughout the composition so that the composition may be readily subdivided into equally effective unit dosage forms, such as tablets, pills, and capsules. The individual unit dosages may also comprise film coatings, which disintegrate upon oral ingestion or upon contact with diluents. These the active agents of the present invention formulations can be manufactured by conventional pharmaceutical techniques.

Conventional pharmaceutical techniques for preparation of solid dosage forms include, for example, one or a combination of methods: (1) dry mixing, (2) direct compression, (3) milling, (4) dry or non-aqueous granulation, (5) wet granulation, or (6) fusion. See, for example, Lachman et al., Theory and Practice of Industrial Pharmacy (1986). Other methods include, for example, spray drying, pan coating, melt granulation, granulation, fluidized bed spray drying or coating (for example, Wurster coating), tangential coating, top spraying, tableting, extruding and the like.

Compressed tablets are solid dosage forms prepared by compacting the bulk blend the active agents of the present invention formulations described above. In various embodiments, compressed tablets which are designed to dissolve in the mouth will comprise one or more flavoring agents. In other embodiments, the compressed tablets will comprise a film surrounding a final compressed tablet. In some embodiments, the film coating can provide a delayed release of the active agents of the present invention formulation. In other embodiments, the film coating aids in patient compliance (for example, Opadry® coatings or sugar coating). Film coatings comprising Opadry® typically range from about 1% to about 3% of the tablet weight. Film coatings for delayed-release usually comprise 2-6% of a tablet weight or 7-15% of a spray-layered bead weight. In other embodiments, the compressed tablets comprise one or more excipients.

A capsule may be prepared, for example, by placing the bulk blend the active agents of the present invention formulation, described above, inside of a capsule. In some embodiments, the active agents of the present invention formulations (non-aqueous suspensions and solutions) are placed in a soft gelatin capsule. In other embodiments, the active agents of the present invention formulations are placed in standard gelatin capsules or non-gelatin capsules such as capsules comprising HPMC. In other embodiments, the active agents of the present invention formulations are placed in a sprinkle capsule, wherein the capsule may be swallowed whole or the capsule may be opened and the contents sprinkled on food prior to eating. In some embodiments of the present invention, the therapeutic dose is split into multiple (for example, two, three, or four) capsules. In some embodiments, the entire dose of the active agents of the present invention formulation is delivered in a capsule form.

In certain embodiments, ingredients (including or not including the active agents) of the invention are wet granulated. The individual steps in the wet granulation process of tablet preparation include milling and sieving of the ingredients, dry powder mixing, wet massing, granulation, drying, and final grinding. In various embodiments, the active agents of the present invention composition are added to the other excipients of the pharmaceutical formulation after they have been wet granulated. Alternatively, the ingredients may be subjected to dry granulation, for example, via compressing a powder mixture into a rough tablet or "slug" on a heavy-duty rotary tablet press. The slugs are then broken up into granular particles by a grinding operation, usually by passage through an oscillation granulator. The individual steps include mixing of the powders, compressing (slugging) and grinding (slug reduction or granulation). No wet binder or moisture is involved in any of the steps.

In some embodiments, the active agents of the present invention formulation are dry granulated with other excipients in the pharmaceutical formulation. In other embodiments, the active agents of the present invention formulation are added to other excipients of the pharmaceutical formulation after they have been dry granulated.

In other embodiments, the formulation of the present invention formulations described herein is a solid dispersion. Methods of producing such solid dispersions are known in the art and include U.S. Pat. Nos. 4,343,789, 5,340,591, 5,456,923, 5,700,485, 5,723,269, and U.S. Pub. No. 2004/0013734. In some embodiments, the solid dispersions of the invention comprise both amorphous and non-amorphous active agents of the present invention and can have enhanced bioavailability as compared to conventional active agents of the present invention formulations. In still other embodiments, the active agents of the present invention formulations described herein are solid solutions. Solid solutions incorporate a substance together with the active agents and other excipients such that heating the mixture results in the dissolution of the drug and the resulting composition is then cooled to provide a solid blend that can be further formulated or directly added to a capsule or compressed into a tablet.

Non-Limiting Examples of Formulations for Oral Delivery

The examples below provide non-limiting embodiments of formulations for oral delivery, which can be used to deliver any of a compound described herein in enantiomerically enriched form, pure form or even a racemic mixture. Therefore, while the compounds below are specified, any desired purity form or compound can be used if it achieves the desired goal of treatment.

In one non-limiting embodiment, hard gelatin capsules comprising the following ingredients are prepared by mixing the ingredients and filling into hard gelatin capsules in 340 mg quantities.

Hard gelatin capsules containing the following ingredients are prepared:

| Ingredient | Quantity (mg/capsule) |
| --- | --- |
| Structure II (R-enantiomer or S-enantiomer) | 30.0 |
| Starch | 205.0 |
| Alpha lipoic acid | 100.0 |
| Magnesium stearate | 5.0 |

The above ingredients are mixed and filled into hard gelatin capsules in 340 mg quantities.

A tablet formula is prepared using the ingredients below:

| Ingredient | Quantity (mg/tablet) |
| --- | --- |
| Structure II (70% R-enantiomer, 30% S-enantiomer; or 70% S-enantiomer, 30% R enantiomer) | 25.0 |
| Cellulose, microcrystalline | 200.0 |
| Colloidal silicon dioxide | 10.0 |
| Stearic acid | 5.0 |

The components are blended and compressed to form tablets, each weighing 240 mg.

Tablets, each containing 30 mg of active ingredient, are prepared as follows:

| Ingredient | Quantity (mg/tablet) |
| --- | --- |
| Structure I (R-enantiomer or S-enantiomer) | 20.0 |
| Structure II (Racemic) | 10.0 |
| Starch | 45.0 |
| Microcrystalline cellulose | 35.0 |
| Polyvinylpyrrolidone (as 10% solution in water) | 4.0 |
| Sodium carboxymethyl starch | 4.5 |
| Magnesium stearate | 0.5 |
| Talc | 1.0 |

The active ingredients, starch and cellulose are passed through a No. 20 mesh U.S. sieve and mixed thoroughly. The solution of polyvinylpyrrolidone is mixed with the resultant powders, which are then passed through a 16 mesh U.S. sieve. The granules so produced are dried at 50-60° C. and passed through a 16 mesh U.S. sieve. The sodium carboxymethyl starch, magnesium stearate, and talc, previously passed through a No. 30 mesh U.S. sieve, are then added to the granules which, after mixing, are compressed on a tablet machine to yield tablets each weighing 120 mg.

Capsules, each containing 40 mg of active ingredients are made as follows:

| Ingredient | Quantity (mg/capsule) |
| --- | --- |
| Structure I (racemic) | 10.0 |
| Structure II (R-enantiomer or S-enantiomer) | 30.0 |
| Starch | 109.0 |
| Magnesium stearate | 1.0 |

The active ingredients, cellulose, starch, and magnesium stearate are blended, passed through a No. 20 mesh U.S. sieve, and filled into hard gelatin capsules in 150 mg quantities.

Capsules, each containing 100 mg of active ingredient, are made as follows:

| Ingredient | Amount (mg/capsule) |
|---|---|
| Structure I (Racemic) | 100.0 |
| Starch | 407.0 |
| Magnesium stearate | 3.0 |

The active ingredient, cellulose, starch, and magnesium stearate are blended, passed through a No. 20 mesh U.S. sieve, and filled into hard gelatin capsules in 510 mg quantities.

Extended-Release Formulations

Depending on the desired release profile, the oral solid dosage forms of the present invention may contain a suitable amount of controlled-release agents, extended-release agents, and/or modified-release agents (for example, delayed-release agents). The pharmaceutical solid oral dosage forms comprising the active agents of the present invention described herein can be further formulated to provide a modified or controlled release of the active agents of the present invention. In some embodiments, the solid dosage forms described herein can be formulated as a delayed release dosage form such as an enteric-coated delayed release oral dosage forms, i.e., as an oral dosage form of a pharmaceutical composition as described herein which uses an enteric coating to affect release in the small intestine of the gastrointestinal tract. The enteric-coated dosage form may be a compressed or molded or extruded tablet/mold (coated or uncoated) containing granules, powder, pellets, beads or particles of the active ingredient and/or other composition components, which are themselves coated or uncoated. The enteric coated oral dosage form may also be a capsule (coated or uncoated) containing pellets, beads or granules of the solid carrier or the composition, which are themselves coated or uncoated. Enteric coatings may also be used to prepare other controlled release dosage forms including extended-release and pulsatile release dosage forms.

In other embodiments, the active agents of the formulations described herein are delivered using a pulsatile dosage form. Pulsatile dosage forms comprising the active agents of the present invention formulations described herein may be administered using a variety of formulations known in the art. For example, such formulations include those described in U.S. Pat. Nos. 5,011,692, 5,017,381, 5,229,135, and 5,840,329. Other dosage forms suitable for use with the active agents of the present invention formulations are described in, for example, U.S. Pat. Nos. 4,871,549, 5,260,068, 5,260,069, 5,508,040, 5,567,441 and 5,837,284.

In some embodiments, the controlled release dosage form is pulsatile release solid oral dosage form comprising at least two groups of particles, each containing active agents of the present invention as described herein. The first group of particles provides a substantially immediate dose of the active agents of the present invention upon ingestion by a subject. The first group of particles can be either uncoated or comprise a coating and/or sealant. The second group of particles comprises coated particles, which may comprise from about 2% to about 75%, typically from about 2.5% to about 70%, or from about 40% to about 70%, by weight of the total dose of the active agents of the present invention in the formulation, in admixture with one or more binders.

Coatings for providing a controlled, delayed, or extended-release may be applied to a compound of Formula I, Formula II, or any one of Structures I-VI or to a core containing a compound of Formula I, Formula II, or any one of Structures I-VI. The coating may comprise a pharmaceutically acceptable ingredient in an amount sufficient, for example, to provide an extended release from, for example, about 1 hours to about 7 hours following ingestion before release of a compound of Formula I, Formula II, or any one of Structures-VI. Suitable coatings include one or more differentially degradable coatings such as, by way of example only, pH-sensitive coatings (enteric coatings) such as acrylic resins (for example, Eudragit® EPO, Eudragit® L30D-55, Eudragit® FS 30D Eudragit® L100-55, Eudragit® L100, Eudragit® S100, Eudragit® RD100, Eudragit® E100, Eudragit® L12.5, Eudragit® S12.5, and Eudragit® NE30D, Eudragit® NE 40D®) either alone or blended with cellulose derivatives, for example, ethylcellulose, or non-enteric coatings having variable thickness to provide differential release of the active agents of the present invention formulation.

Many other types of controlled/delayed/extended-release systems known to those of ordinary skill in the art and are suitable for use with the active agents of the present invention formulations described herein. Examples of such delivery systems include polymer-based systems, such as polylactic and polyglycolic acid, polyanhydrides and polycaprolactone, cellulose derivatives (for example, ethylcellulose), porous matrices, nonpolymer-based systems that are lipids, including sterols, such as cholesterol, cholesterol esters and fatty acids, or neutral fats, such as mono-, di- and triglycerides; hydrogel release systems; silastic systems; peptide-based systems; wax coatings, bioerodible dosage forms, compressed tablets using conventional binders and the like. See, for example, Liberman et al., Pharmaceutical Dosage Forms, 2 Ed., Vol. 1, pp. 209-214 (1990); Singh et al., Encyclopedia of Pharmaceutical Technology, 2nd Ed., pp. 751-753 (2002); U.S. Pat. Nos. 4,327,725, 4,624,848, 4,968,509, 5,461,140, 5,456,923, 5,516,527, 5,622,721, 5,686,105, 5,700,410, 5,977,175, 6,465,014 and 6,932,983.

Systemic Formulations

The formulations of the present invention suitable for intramuscular, subcutaneous, or intravenous injection may comprise physiologically acceptable sterile aqueous or non-aqueous solutions, dispersions, suspensions or emulsions, and sterile powders for reconstitution into sterile injectable solutions or dispersions. Examples of suitable aqueous and non-aqueous carriers, diluents, solvents, or vehicles including water, ethanol, polyols (propylene glycol, polyethyleneglycol, glycerol, cremophor and the like), suitable mixtures thereof, vegetable oils (such as olive oil) and injectable organic esters such as ethyl oleate. Additionally, the active agents of the present invention can be dissolved at concentrations of >1 mg/ml using water-soluble beta cyclodextrins (for example, beta-sulfobutyl-cyclodextrin and 2-hydroxypropyl-betacyclodextrin. Proper fluidity can be maintained, for example, by the use of a coating such as a lecithin, by the maintenance of the required particle size in the case of dispersions, and by the use of surfactants.

The formulations of the present invention suitable for subcutaneous injection may also contain additives such as preserving, wetting, emulsifying, and dispensing agents. Prevention of the growth of microorganisms can be ensured by various antibacterial and antifungal agents, such as parabens, benzoic acid, benzyl alcohol, chlorobutanol, phenol, sorbic acid, and the like. It may also be desirable to include isotonic agents, such as sugars, sodium chloride, and the like. Prolonged drug absorption of the injectable pharmaceutical form can be brought about by the use of agents delaying absorption, such as aluminum monostearate and gelatin. The active agents of the present invention in suspension formulations designed for extended-release via subcutaneous or intramuscular injection can avoid first-pass metabolism and lower dosages of the active agents of the present invention will be necessary to maintain plasma levels of about 50 ng/ml. In such formulations, the particle size of the active agents of the present invention particles and the range of the particle sizes of the active agents of the present invention particles can be used to control the release of the drug by controlling the rate of dissolution in fat or muscle.

In certain embodiments of the present invention, pharmaceutical compositions containing a compound of Formula I, Formula II, or any one of Structures I-VI may be formulated into a dosage form suitable for parenteral use. For example, the dosage form may be a lyophilized powder, a solution, suspension (for example, depot suspension).

In other embodiments, pharmaceutical compositions containing a compound of Formula I, Formula II, or any one of Structures I-VI may be formulated into a topical dosage form such as, but not limited to, a patch, a gel, a paste, a cream, an emulsion, liniment, balm, lotion, and ointment.

Another typical formulation employed in the methods of the present invention employs transdermal delivery devices ("patches"). Such transdermal patches may be used to provide continuous or discontinuous infusion of a compound of the present invention in controlled amounts. The construction and use of transdermal patches for the delivery of pharmaceutical agents is well known in the art. Such patches may be constructed for continuous, pulsatile, or on demand delivery of pharmaceutical agents.

Frequently, it will be desirable or necessary to introduce the pharmaceutical composition to the brain, either directly or indirectly. Direct techniques usually involve placement of a drug delivery catheter into the host's ventricular system to bypass the blood-brain barrier. Indirect techniques usually involve formulating the compositions to provide for drug latentiation by the conversion of hydrophilic drugs into lipid-soluble drugs or prodrugs. Latentiation is generally achieved through blocking of the hydroxy, carbonyl, sulfate, and primary amine groups present on the drug to render the drug more lipid soluble and amenable to transportation across the blood-brain barrier. Alternatively, the delivery of hydrophilic drugs may be enhanced by intra-arterial infusion of hypertonic solutions which can transiently open the blood-brain barrier.

Non-Limiting Examples of Formulations for Systemic Delivery

The examples below provide non-limiting embodiments of formulations, which can be used to deliver any of a compound described herein in enantiomerically enriched form, pure form or even a racemic mixture. Therefore, while the compounds below are specified, any desired purity form or compound can be used if it achieves the desired goal of treatment.

A dry powder inhaler formulation is prepared containing the following components:

| Ingredient | Weight % |
| --- | --- |
| Structure I (R-enantiomer or S-enantiomer) | 5 |
| Lactose | 95 |

The active mixture is mixed with the lactose and the mixture is added to a dry powder inhaling appliance.

Suppositories, each containing 25 mg of active ingredient are made as follows:

| Ingredient | Quantity (mg) |
| --- | --- |
| Structure I (R-enantiomer or S-enantiomer) | 25.0 |
| Saturated fatty acid glycerides | 2000.0 |

The active ingredient is passed through a No. 60 mesh U.S. sieve and suspended in the saturated fatty acid glycerides previously melted using the minimum heat necessary. The mixture is then poured into a suppository mold of nominal 2.0 g capacity and allowed to cool.

Suspensions, each containing 50 mg of active ingredient per 5.0 ml dose are made as follows:

| Ingredient | Amount |
| --- | --- |
| Structure I (R-enantiomer or S-enantiomer) | 50.0 mg |
| Xanthan gum | 4.0 mg |
| Sodium carboxymethyl cellulose (11%) | 50.0 mg |
| Microcrystalline cellulose (89%) | 50 mg |
| Sucrose | 1.75 g |
| Sodium benzoate | 10.0 mg |
| Flavor and Color | q.v. |
| Purified water | To 5.0 ml |

The active ingredient, sucrose and xanthan gum are blended, passed through a No. 10 mesh U.S. sieve, and then mixed with a previously made solution of the microcrystalline cellulose and sodium carboxymethyl cellulose in water. The sodium benzoate, flavor, and color are diluted with some of the water and added with stirring. Sufficient water is then added to produce the required volume.

An intravenous formulation may be prepared as follows:

| Ingredient | Amount |
| --- | --- |
| Structure II (Enantiomerically enriched S-enantiomer) | 250.0 mg |
| Isotonic saline | 1000 ml |

A topical formulation may be prepared as follows:

| Ingredient | Amount (g) |
| --- | --- |
| Structure II (Enantiomerically enriched R-enantiomer) | 10.0 |
| Emulsifying Wax | 30.0 |
| Liquid Paraffin | 20.0 |
| White Soft Paraffin | To 100 |

The white soft paraffin is heated until molten. The liquid paraffin and emulsifying wax are incorporated and stirred until dissolved. The active ingredient is added and stirring is continued until dispersed. The mixture is then cooled until solid.

Sublingual or buccal tablets, each containing 20 mg of active ingredient, may be prepared as follows:

| Ingredient | Amount (mg/tablet) |
| --- | --- |
| Structure I (Enantiomerically enriched R-enantiomer) | 20.0 |
| Glycerol | 210.5 |
| Water | 143.0 |

| Ingredient | Amount (mg/tablet) |
| --- | --- |
| Sodium Citrate | 4.5 |
| Polyvinyl Alcohol | 26.5 |
| Polyvinylpyrrolidone | 15.5 |

The glycerol, water, sodium citrate, polyvinyl alcohol, and polyvinylpyrrolidone are admixed together by continuous stirring and maintaining the temperature at about 90° C. When the polymers have gone into solution, the solution is cooled to about 50-55° C. and the medicament is slowly admixed. The homogenous mixture is poured into forms made of an inert material to produce a drug-containing diffusion matrix having a thickness of about 2-4 mm. This diffusion matrix is then cut to form individual tablets having the appropriate size.

A liquid formulation is prepared containing the following components:

| Ingredient | Quantity (units) |
| --- | --- |
| Structure I (Enantiomerically enriched-S-enantiomer) | 500 mg |
| Propylene Glycol | 2 ml |
| Glycerin | 2 ml |

The active mixture is mixed and added to a liquid vaporization appliance.

Pharmaceutically Acceptable Salts

A compound of the present invention is an amines and thus basic, and therefore, reacts with inorganic and organic acids to form pharmaceutically acceptable acid addition salts. In some embodiments, a compound of the present invention as free amines is oily and has decreased stability at room temperature. In this case it may be beneficial to convert the free amine to a pharmaceutically acceptable acid addition salt for ease of handling and administration because in some embodiments, the pharmaceutically acceptable salt is solid at room temperature.

A compound described herein, including an enantiomerically enriched mixture, can be administered if desired as a pharmaceutically acceptable salt or a salt mixture. A salt mixture may be useful to increase solubility of the active substances, to alter pharmacokinetics, or for controlled release or other objective. A salt mixture may comprise 2, 3, 4, 5, 6, or more pharmaceutically acceptable salts together to form a single composition.

Acids commonly employed to form such salts are inorganic acids such as hydrochloric acid, hydrobromic acid, hydroiodic acid, sulfuric acid, phosphoric acid, and the like, and organic acids, such as p-toluenesulfonic acid, methanesulfonic acid, oxalic acid, p-bromophenylsulfonic acid, carbonic acid, succinic acid, citric acid, benzoic acid, acetic acid and the like.

Exemplary salts include 2-hydroxyethanesulfonate, 2-naphthalenesulfonate, 2-napsylate, 3-hydroxy-2-naphthoate, 3-phenylpropionate, 4-acetamidobenzoate, acefyllinate, acetate, aceturate, adipate, alginate, aminosalicylate, ammonium, amsonate, ascorbate, aspartate, benzenesulfonate, benzoate, besylate, bicarbonate, bisulfate, bitartrate, borate, butyrate, calcium edetate, calcium, camphocarbonate, camphorate, camphorsulfonate, camsylate, carbonate, cholate, citrate, clavulariate, cyclopentanepropionate, cypionate, d-aspartate, d-camsylate, d-lactate, decanoate, dichloroacetate, digluconate, dodecylsulfate, edentate, edetate, edisylate, estolate, esylate, ethanesulfonate, ethyl sulfate, finnarate, fumarate, furate, fusidate, galactarate (mucate), galacturonate, gallate, gentisate, gluceptate, glucoheptanoate, gluconate, glucuronate, glutamate, glutarate, glycerophosphate, glycolate, glycollylarsanilate, hemisulfate, heptanoate (enanthate), heptanoate, hexafluorophosphate, hexanoate, hexylresorcinate, hippurate, hybenzate, hydrabamine, hydrobromide, hydrobromide/bromide, hydrochloride, hydroiodide, hydroxide, hydroxybenzoate, hydroxynaphthoate, iodide, isethionate, isothionate, 1-aspartate, 1-camsylate, 1-lactate, lactate, lactobionate, laurate, laurylsulphonate, lithium, magnesium, malate, maleate, malonate, mandelate, meso-tartrate, mesylate, methanesulfonate, methylbromide, methylnitrate, methylsulfate, mucate, myristate, N-methylglucamine ammonium salt, napadisilate, naphthylate, napsylate, nicotinate, nitrate, octanoate, oleate, orotate, oxalate, p-toluenesulfonate, palmitate, pamoate, pantothenate, pectinate, persulfate, phenylpropionate, phosphate, phosphateldiphosphate, picrate, pivalate, polygalacturonate, potassium, propionate, pyrophosphate, saccharate, salicylate, salicylsulfate, sodium, stearate, subacetate, succinate, sulfate, sulfosaliculate, sulfosalicylate, suramate, tannate, tartrate, teoclate, terephthalate, thiocyanate, thiosalicylate, tosylate, tribrophenate, triethiodide, undecanoate, undecylenate, valerate, valproate, xinafoate, zinc and the like. (See Berge et al. (1977) "Pharmaceutical Salts," J. Pharm. Sci. 66:1-19.) Most typical pharmaceutically acceptable salts are those employing a hydrochloride anion.

Prodrugs

One of ordinary skill would understand that a compound of the invention shall also include the prodrugs thereof. Prodrugs are compounds that are metabolized or otherwise transformed inside the body to the active pharmacologic agent(s) of interest. Thus, prodrug will contain the "active" component (for example, a compound of any one of Structures I-VI, Formula I, or Formula II Examples include N-alpha-acyloxyalkoxycarbonyl derivatives or addition of amino acids to the amine, which can be removed within the body by esterases or similar enzymes, but other prodrugs and precursors should be understood to be within the scope of the invention.

Combination Therapy

It should be apparent that the compositions of the invention are not limited to combinations of a single active compound (i.e., one of Structures I or II), and a single carrier, diluent, or excipient alone, but also include combinations of multiple such Structures, other active compounds, and/or multiple carriers, diluents, and excipients. Pharmaceutical compositions of this invention thus may comprise one or more Structures (or their derivatives and analogues) in combination, together with one or more pharmaceutically-acceptable carriers, diluents, and/or excipients, and additionally with one or more other active compounds.

Different embodiments of the invention include the following examples: Pharmaceutically acceptable complex derivatives of each drug in each group, including solvates, salts, esters, enantiomers, isomers (stereoisomers and/or constitutional, including ones based on substituting deuterium for hydrogen), derivatives or prodrugs of a compound of Formula I, Formula II, or any one of Structures I-VI. Other embodiments of the invention include multiple variations in the pharmaceutical dosages of each drug in the combination as further outlined below. Other embodiments of the invention include various forms of preparations including using solids, liquids, immediate or delayed or extended-release forms. Many types of variations are possible as known to those skilled in the art.

In some aspects, a compound of the present invention is formulated in a pharmaceutical preparation with other active compounds to increase therapeutic efficacy, decrease unwanted effects, increase stability/shelf-life, and/or alter pharmacokinetics. Such other active compounds include, but are not limited to antioxidants (such alpha-lipoate in acid or salt form, ascorbate in acid or salt form, selenium, or N-acetylcysteine); H2-receptor agonists or antagonists (such as famotidine); stimulants (such as dextroamphetamine, amphetamine, lisdexamphetamine, methylphenidate, or methamphetamine); entactogens (such as MDMA or 3,4-methylenedioxy-N-ethylamphetamine); anti-inflammatories (such as ibuprofen or ketoprofen); matrix metalloproteinase inhibitors (such as doxycycline); NOS inhibitors (such as S-methyl-L-thiocitrulline); proton pump inhibitors (such as omeprazole); phosphodiesterase 5 inhibitors (such as sildenafil); drugs with cardiovascular effects (beta antagonists such as propranolol, mixed alpha and beta antagonists such as carvedilol, alpha antagonists such as prazosin, imidazoline receptor agonists such as rilmenidine or moxonidine; serotonin antagonists such as ketanserin or lisuride); norepinephrine transporter blockers (such as reboxetine); acetylcholine nicotinic receptor modulators (such as bupropion, hydroxybupropion, methyllycaconitine, memantine, or mecamylamine); gastrointestinal acidifying agents (such as ascorbic acid or glutamic acid hydrochloride); alkalinizing agents (such as sodium bicarbonate), NMDA receptor antagonists (such as ketamine); TrkB agonists (such as 7,8-dihydroxyflavone, 7,8,3'-trihydroxyflavone, or N-acetylserotonin), or serotonin receptor agonists (such as 5-methoxy-N-methyl-N-isopropyltryptamine, N,N-Dimethyl-2-(2-methyl-1H-indol-1-yl)ethan-1-amine, psilocin, or psilocybin). The ingredients may be in ion, freebase, or salt form and may be isomers or prodrugs.

The pharmacological agents that make up the combination therapy disclosed herein may be a combined dosage form or in separate dosage forms intended for substantially simultaneous administration. The pharmacological agents that make up the combination therapy may also be administered sequentially, with either therapeutic compound being administered by a regimen calling for two-step administration. The two-step administration regimen may call for sequential administration of the active agents or spaced-apart administration of the separate active agents.

The time period between the multiple administration steps may range from, a few minutes to several hours, depending upon the properties of each pharmacological agent, such as potency, solubility, bioavailability, plasma half-life and kinetic profile of the pharmacological agent. Circadian variation of the target molecule concentration may also determine the optimal dose interval. For example, a compound of the present invention may be administered while the other pharmacological agent is being administered (concurrent administration) or may be administered before or after other pharmacological agent is administered (sequential administration).

In cases where the two (or more) drugs included in the fixed-dose combinations of the present invention are incompatible, cross-contamination can be avoided, for example, by incorporation of the drugs in different drug layers in the oral dosage form with the inclusion of a barrier layer(s) between the different drug layers, wherein the barrier layer(s) comprise one or more inert/non-functional materials.

In certain typical embodiments, the formulations of the present invention are fixed-dose combinations of any one of Structures I-VI and at least one other pharmacological agent. In certain typical embodiments, the formulations of the present invention are fixed-dose combinations of a compound of Formula I or II and at least one other pharmacological agent. Fixed-dose combination formulations may contain therapeutically efficacious fixed-dose combinations of formulations of a compound of Formula I, Formula II, or any one of Structures I-VI and other pharmacological agents in the form of single-layer monolithic tablet or multi-layered monolithic tablet or in the form of a core tablet-in-tablet or multi-layered multi-disk tablet or beads inside a capsule or tablets inside a capsule.

Pharmaceutical Combinations with Dextroamphetamine

In certain typical embodiments, a compound of Formula I, Formula II, or any one of Structures I-VI, either racemic, an enantiomer, or a mixture of enantiomers, and with zero to five hydrogens replaced with deuterium, is formulated in a pharmaceutical composition that contains a pharmaceutically acceptable salt of dextroamphetamine, for example, in the amount between about 2 mg to 25 mg, such as, 2 mg, 4 mg, 5 mg, 7 mg, 10 mg, 15 mg, 20 mg, or 25 mg. The required amount of dextroamphetamine will vary depending on the needs of the patient.

In another typical embodiment, a compound of Formula I, Formula II, or any one of Structures I-VI, either racemic, an enantiomer, or a mixture of enantiomers, and with zero to five hydrogens replaced with deuterium, are formulated in a pharmaceutical composition that contains a pharmaceutically acceptable salt of dextroamphetamine with dextroamphetamine, for example, in a ratio by weight of 1:2, 1:3, 1:4, 1:5, 1:6, 1:7, 1:8, 1:9 or 1:10 to the compound of Formula I, Formula II, or any one of Structures I-VI. The required amount of dextroamphetamine will vary depending on the needs of the patient.

Pharmaceutical Combinations with MDMA

In some typical embodiments, a compound of Formula I, Formula II, or any one of Structures I-VI, either racemic, an enantiomer, or a mixture of enantiomers, and with zero to five hydrogens replaced with deuterium, is formulated in a pharmaceutical composition that contains a pharmaceutically acceptable salt of MDMA, for example, in an amount between 5 and 180 mg, typically 15-60 mg. The required amount of MDMA will vary depending on the needs of the patient.

In some typical embodiments, a compound of Formula I, Formula II, or any one of Structures I-VI, either racemic, an enantiomer, or a mixture of enantiomers, and with zero to five hydrogens replaced with deuterium, is formulated in a pharmaceutical composition that contains a pharmaceutically acceptable salt of MDMA with MDMA, for example, in a ratio by weight of 1:2, 1:3, 1:4, 1:5, 1:6, 1:7, 1:8, 1:9 or 1:10 to the compound of Formula I, Formula II, or any one of Structures I-VI. The required amount of MDMA will vary depending on the needs of the patient.

Non-Limiting Examples of Combination Formulations

Capsules, each containing 40 mg of the current invention, are made as follows:

| Ingredient | Quantity (mg/capsule) |
| --- | --- |
| Structure I (R- or S-enantiomer, D3-N-Deuterated) | 10.0 |
| Structure II (R- or S-enantiomer, D3-N-Deuterated) | 30.0 |

| Ingredient | Quantity (mg/capsule) |
| --- | --- |
| Amphetamine sulfate | 5.0 |
| Starch | 109.0 |
| Magnesium stearate | 1.0 |

The active ingredients, cellulose, starch, and magnesium stearate are blended, passed through a No. 20 mesh U.S. sieve, and filled into hard gelatin capsules in 155 mg quantities.

Capsules, each containing 40 mg of the current invention, are made as follows:

| Ingredient | Quantity (mg/capsule) |
| --- | --- |
| Structure I (70% R- or S-enantiomer) | 30.0 |
| Structure II (70% S- or R-enantiomer) | 10.0 |
| Psilocybin hydrochloride | 2.0 |
| Alpha lipoic acid | 40.0 |
| Starch | 72.0 |
| Magnesium stearate | 1.0 |

The active ingredients, cellulose, starch, and magnesium stearate are blended, passed through a No. 20 mesh U.S. sieve, and filled into hard gelatin capsules in 155 mg quantities.

It should be readily appreciated that the formulation examples are illustrative only. Accordingly, it should be understood that reference to particular Structure(s) is likewise illustrative, and the Structure(s) in any of the non-limiting examples may be substituted by other Structure(s) of the invention. Likewise, any of the other active compounds (for example, amphetamine sulfate or psilocybin hydrochloride) may be substituted by a different other active compound, as may be the inactive compounds.

Moreover, for any active compound of the invention, for example Structure I or Structure II, substitution of the compound by its prodrug, free base, salt, or hydrochloride salt shall be understood to provide merely an alternative embodiment still within the scope of the invention. Further, compositions within the scope of the invention should be understood to be open-ended and may include additional active or inactive compounds and ingredients.

The type of formulation employed for the administration of a compound employed in the methods of the present invention generally may be dictated by the compound(s) employed, the type of pharmacokinetic profile desired from the route of administration and the compound(s), and the state of the patient.

Dosage Regimes

A compound or pharmaceutically acceptable formulation of the present invention can be administered to the host in any amount, and with any frequency, that achieves the goals of the invention as used by the healthcare provider, or otherwise by the host in need thereof, typically a human, as necessary or desired.

In certain embodiments, the composition as described herein is provided only in a controlled counseling session, and administered only once, or perhaps 2, 3, 4, or 5 or more times in repeated counseling sessions to address a mental disorder as described herein.

In other embodiments, the composition as described herein is provided outside of a controlled counseling session, and perhaps self-administered, as needed to perhaps 2, 3, 4, or 5 or more times in to address a mental disorder as described herein.

In other embodiments, the composition of the present invention may be administered on a routine basis for mental wellbeing or for entactogenic treatment.

A compound of the current invention can be administered in a variety of doses, routes of administration, and dosing regimens, based on the indication and needs of the patient. Non-limiting examples of therapeutic use include discrete psychotherapeutic sessions, ad libitum use for treatment of episodic disorders, and ongoing use for treatment of sub-chronic and chronic disorders.

Psychotherapeutic Sessions

For some indications, the selected 2-aminoindane medicine of the present invention is taken in discrete psychotherapy or other beneficial sessions. It is anticipated that these sessions will typically be separated by more than 5 half-lives of the medicine and, for most patients, will typically occur only 1 to 5 times each year.

For these sessions, it will typically be desirable to induce clearly perceptible entactogenic effects that will facilitate fast therapeutic progress. Non-exhaustive examples of oral doses of medicine that produce clearly perceptible entactogenic effects for exemplary purposes for any compound described herein includes (using compounds for illustrative purposes only): about 40 to about 120 mg of any one of non-racemic Structures I-VI, about 40 to about 120 mg of any one of Structures I-VI, about 50 to about 300 mg of any one of non-racemic Structures I-VI, about 50 to about 300 mg any one of Structures I-VI, about 75 to about 500 mg any one of non-racemic Structures I-VI, about 75 to about 500 mg of any one of Structures I-VI, about 75 to about 800 mg of any one of Structures I-VI, about 75 to about 800 mg any one of non-racemic Structures I-VI. Non-exhaustive examples of oral doses of medicine that produce clearly perceptible entactogenic effects for exemplary purposes for any compound described herein includes (using compounds for illustrative purposes only): about 40 to about 120 mg of non-racemic Formula I, about 40 to about 120 mg of non-racemic Formula II, about 50 to about 300 mg of Formula I, about 50 to about 300 mg of Formula II, about 75 to about 500 mg of Formula I, about 75 to about 500 mg of Formula II, about 75 to about 800 mg of Formula I, about 75 to about 800 mg of Formula II.

It is anticipated that the medicine would be taken once or, more rarely, two or three times in a single therapeutic session. In these cases, it is common for each subsequent dose to be half of the previous dose or lower. Multiple doses within a session typically occur because either the patient's sensitivity to the medicine was unknown and too low of an initial dose was employed or because the patient is experiencing a productive session and it is desirable to extend the duration of therapeutic effects. Controlled release preparations may be used to lengthen the duration of therapeutic effects from a single administration of the medicine. In cases where multiple administrations are used in a session, it is anticipated that individual doses will be lower so that plasma concentrations remain within a desired therapeutic range.

Non-limiting, non-exhaustive examples of indications that may benefit from psychotherapeutic sessions include post-traumatic stress disorder, depression, dysthymia, anxiety and phobia disorders, feeding, eating, and binge disorders, body dysmorphic syndromes, alcoholism, tobacco abuse, drug abuse or dependence disorders, disruptive behavior disorders, impulse control disorders, gaming disorders, gambling disorders, personality disorders, attachment disorders, autism, and dissociative disorders. Also included as exemplary situations where an individual would benefit from a psychotherapeutic session are situations from a reduction of neuroticism or psychological defensiveness, an increase in openness to experience, an increase in creativity, or an increase in decision-making ability.

Ad Libitum use for Treatment of Episodic Disorders

For some indications, such as social anxiety, where the patient has need for relief from episodic occurrence of a disorder, it is anticipated that the medicine would be taken as needed but that uses should be separated by more than 5 half-lives of the medicine to avoid bioaccumulation and formation of tolerance.

For treating episodic disorders, clearly perceptible entactogenic effects are often not desirable, as they can impair some aspects of functioning. Non-exhaustive examples of oral doses of medicine for any compound described herein includes (using compounds for illustrative purposes only) that produce subtle, barely perceptible therapeutic effects include: about 10 to about 60 mg of any one of non-racemic Structures I-VI, about 10 to about 60 mg of any one of Structures I-VI, about 10 to about 100 mg of any one of non-racemic Structures I-VI, about 10 to about 100 mg any one of Structures I-VI, about 20 to about 150 mg of any one of non-racemic Structures I-VI, about 20 to about 150 mg of any one of Structures I-VI, about 20 to about 200 mg of any one of non-racemic Structures I-VI, and about 20 to about 200 mg of any one of Structures I-VI. Non-exhaustive examples of oral doses of medicine for any compound described herein includes (using compounds for illustrative purposes only) that produce subtle, barely perceptible therapeutic effects include: about 10 to about 60 mg of non-racemic Formula I, about 10 to about 60 mg of non-racemic Formula II, about 10 to about 100 mg of Formula I, about 10 to about 100 mg of Formula II, about 20 to about 150 mg of Formula I, about 20 to about 150 mg of Formula II, about 20 to about 200 mg of Formula I, and about 20 to about 200 mg of Formula II.

Non-limiting, non-exhaustive examples of indications that may benefit from episodic treatment include post-traumatic stress disorder, depression, dysthymia, anxiety and phobia disorders, feeding, eating, and binge disorders, body dysmorphic syndromes, alcoholism, tobacco abuse, drug abuse or dependence disorders, disruptive behavior disorders, impulse control disorders, gaming disorders, gambling disorders, personality disorders, attachment disorders, autism, and dissociative disorders, provided that clinically significant signs and symptoms worsen episodically or in predictable contexts.

Ongoing use for Treatment of Subchronic and Chronic Disorders

For some indications, such as substance use disorders, inflammatory conditions, and neurological indications, including treatment of stroke, brain trauma, dementia, and neurodegenerative diseases, where the patient has need for ongoing treatment, it is anticipated that the medicine would be taken daily, twice daily, or three times per day. With some indications (subchronic disorders), such as treatment of stroke or traumatic brain injury, it is anticipated that treatment duration will be time-limited and dosing will be tapered when the patient has recovered. An example dose taper regimen is a reduction in dose of 10% of the original dose per week for nine weeks. With other, chronic disorders, such as dementia, it is anticipated that treatment will be continued as long as the patient continues to receive clinically significant benefits.

For treating subchronic and chronic disorders, clearly perceptible entactogenic effects are often not desirable. Non-exhaustive examples of oral doses of medicine for any compound described herein includes (using compounds for illustrative purposes only) that produce subtle, barely perceptible therapeutic effects with ongoing dosing include: about 5 to about 60 mg of any one of non-racemic Structures I-VI, about 5 to about 60 mg of any one of Structures I-VI, about 5 to about 100 mg of any one of Structures I-VI, about 5 to about 100 mg of any one of non-racemic Structures I-VI, about 10 to about 150 mg of any one of Structures I-VI, about 10 to about 150 mg of any one of non-racemic Structures I-VI, about 10 to about 200 mg of any one of Structures I-VI, and about 10 to about 200 mg of any one of non-racemic Structures I-VI. Non-exhaustive examples of oral doses of medicine for any compound described herein includes (using compounds for illustrative purposes only) that produce subtle, barely perceptible therapeutic effects with ongoing dosing include: about 5 to about 60 mg of non-racemic Formula I, about 5 to about 60 mg of non-racemic Formula II, about 5 to about 100 mg of Formula I, about 5 to about 100 mg of Formula II, about 10 to about 150 mg of Formula I, about 10 to about 150 mg of Formula II, about 10 to about 200 mg of Formula I, and about 10 to about 200 mg of Formula II.

Non-limiting, non-exhaustive examples of subchronic and chronic disorders that may benefit from regular treatment include migraine, headaches (for example, cluster headache), neurodegenerative disorders, Alzheimer's disease, Parkinson's disease, schizophrenia, stroke, traumatic brain injury, phantom limb syndrome, and other conditions where increasing neuronal plasticity is desirable.

Example 1

Synthesis of 6,7-dihydro-5H-indeno[5-b]furan-6-amine hydrochloride (Structure I)

Preparation of 2-(benzyloxy)-5-bromo-2,3-dihydro-1H-indene (1-2)

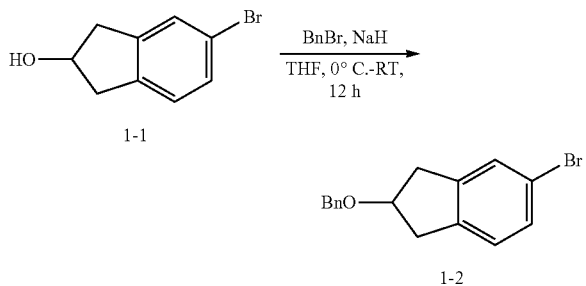

To a stirred solution of 5-bromo-2, 3-dihydro-1H-inden-2-ol (5 g, 23.69 mmol, 1 eq.) (1-1) in dry THF (50 mL), NaH (60%) (1.88 g, 47.39 mmol, 2 eq.) was added under $N_2$ atmosphere at 0° C. and the resulting reaction mixture was allowed to stir at 0° C. for 30 mins. Then benzyl bromide (4.19 ml, 35.54 mmol, 1.5 eq.) was added to the reaction mixture and the reaction mixture was stirred at room temperature for 12 h. Upon completion, monitored by TLC (5% EA in Hexane), the reaction mixture was quenched with saturated $NH_4Cl$ solution, extracted with ethyl acetate (2×100 ml), washed with water, and washed with brine solution. The combined organic layers were dried over anhydrous sodium sulphate, solvent was removed under vacuum, and crude material purified by silica gel column chromatography using ethyl acetate/hexane (10:90 v/v) as eluent to afford 2-(benzyloxy)-5-bromo-2,3-dihydro-1H-indene (1-2) as a light yellow gum (6.5 g, 90%). $^1$H-NMR (400 MHz, DMSO-$d_6$): δ 7.45-7.41 (m, 1H), 7.37-7.24 (m, 6H), 7.19 (d, J=8 Hz, 1H), 4.50 (s, 2H), 4.41-4.36 (m, 1H), 3.17-3.05 (m, 2H), 2.99-2.88 (m, 2H). GCMS observed at RT-8.22 min, Exact mass-303, observed 304.

Preparation of 2-(benzyloxy)-2,3-dihydro-1H-inden-5-ol (1-3)

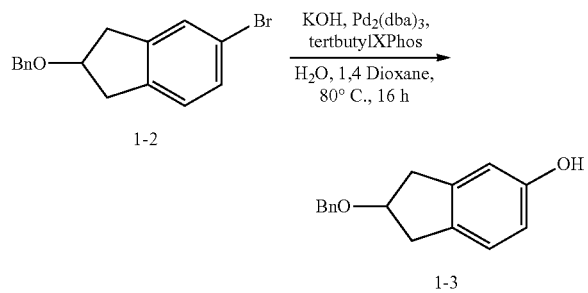

To a stirred solution of 2-(benzyloxy)-5-bromo-2,3-dihydro-1H-indene (1-2) (5 g, 16.50 mmol, 1 eq.) in 1,4 Dioxane (100 ml) was added KOH (3.60 g, 64.35 mmol, 3.9 eq.) (Dissolved in 40 mL water) and the reaction mixture was degassed under argon atmosphere for 10 min. Then Tris(dibenzylideneacetone)dipalladium(0) (1.05 g, 1.15 mmol, 0.07 eq.) and tBuXPhos (1.05 g, 2.47 mmol, 0.15 eq.) was added to the reaction mixture and the resulting reaction mixture was allowed to stir at 80° C. for 18 hrs. Upon completion, monitored by TLC (30% EA in Hexane) (KMnO4 active), the reaction mixture was acidified with 2(N) HCl down to pH 2, extracted with ethyl acetate (2×100 mL), and washed with water followed by brine solution. The combined organic layers were dried over anhydrous sodium sulphate, solvent was removed under vacuum and crude material purified by silica gel column chromatography using ethyl acetate/hexane (20:80 v/v) as eluent to afford 2-(benzyloxy)-2,3-dihydro-1H-inden-5-ol (1-3) as a colorless sticky gum (3.2 g, 80%). $^1$H-NMR (400 MHz, DMSO-$d_6$): δ 9.05 (s, 1H), 7.35-7.24 (m, 5H), 6.98 (d, J=8.08 Hz, 1H), 6.61 (s, 1H), 6.54 (d, J=8.04 Hz, 1H), 4.50 (s, 2H), 4.38-4.32 (m, 1H), 3.08-2.98 (m, 2H), 2.87-2.77 (m, 2H). GCMS observed at RT-12.15 min, exact mass-240 and observed 240.2.

Preparation of 2-(benzyloxy)-5-(2,2-diethoxyethoxy)-2,3-dihydro-1H-indene (1-4)

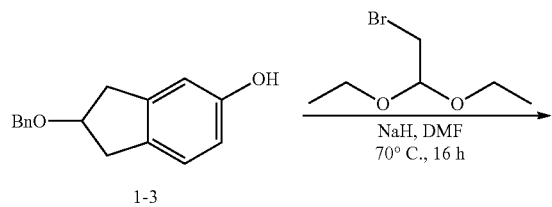

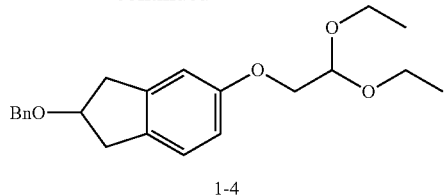

To a stirred solution of 2-(benzyloxy)-2,3-dihydro-1H-inden-5-ol (1-3) (5.7 g, 23.75 mmol, 1 eq.) in DMF (50 mL) was added NaH (60%) (2.36 g, 59.37 mmol, 2.5 eq.) at 0° C. and the resulting reaction mixture was allowed to stir at 0° C. for 30 min. Then 2-bromo-1,1-diethoxyethane (7.36 ml, 47.5 mmol, 2 eq.) was added to the reaction mixture at room temperature and the resulting reaction mixture was allowed to stir at 70° C. for 12 h. Upon completion, monitored by TLC (20% EA in Hexane), the reaction mixture was quenched with ice water, extracted with ethyl acetate (2×100 mL), and washed with ice water (twice), followed by brine solution. The combined organic layers were dried over anhydrous sodium sulphate, solvent was removed under vacuum and the crude material purified by silica gel column chromatography using ethyl acetate/hexane (15:85 v/v) as eluent to afford 2-(benzyloxy)-5-(2,2-diethoxyethoxy)-2,3-dihydro-1H-indene (1-4) as a light-yellow gum (5.1 g, 60%). $^1$H-NMR (400 MHz, DMSO-$d_6$): δ 7.35-7.25 (m, 5H), 7.10 (d, J=8.24 Hz, 1H), 6.82 (s, 1H), 6.72-6.70 (dd, J=1.96 Hz, 1.92 Hz, 1H), 4.76 (t, J=5.12 Hz, 1H), 4.51 (s, 2H), 4.38 (s, 1H), 3.90 (d, J=5.12 Hz, 2H), 3.67-3.53 (m, 4H), 3.08-3.03 (m, 2H), 2.92-2.87 (m, 2H), 1.15-1.11 (m, 6 Hz). GCMS observed at RT-9.56 min, exact mass-356, and observed 356.2.

Preparation of 6-(benzyloxy)-6,7-dihydro-5H-indeno[5,6-b]furan (1-5)

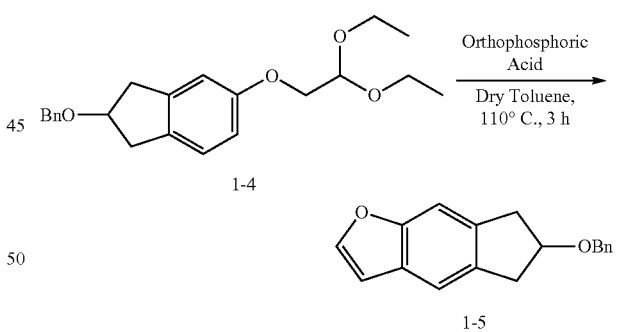

A stirred solution of orthophosphoric acid (2.2 g, 22.47 mmol, 4 eq.) in dry toluene (35 mL) was allowed to reflux at 110° C. for 30 min. Then 2-(benzyloxy)-5-(2,2-diethoxyethoxy)-2,3-dihydro-1H-indene (1-4) (2 g, 5.61 mmol, 1 eq.) (Dissolved in dry toluene, 10 mL) was added to the reaction mixture and the reaction mixture was allowed to stir at 110° C. for 3 h. Upon completion of reaction (monitored by TLC, 30% EA in Hexane), the reaction mixture was extracted with ethyl acetate (2×50 mL), washed with water and saturated NaHCO$_3$ solution, followed by brine solution. The organic layer was then dried over anhydrous sodium sulphate, solvent was removed under vacuum and the crude material purified by silica gel column chromatography using ethyl acetate/hexane (10:90 v/v) as eluent to afford 6-(benzyloxy)-6,7-dihydro-5H-indeno[5,6-b]furan (1-5) (600 mg, 40%) as yellow sticky gum. $^1$H-NMR (400 MHz, DMSO-$d_6$): δ 7.86 (d, J=2.12 Hz, 1H), 7.43 (d, J=9.68 Hz, 2H), 7.36-7.32 (m, 5H), 6.84 (d, J=1.56 Hz, 1H), 4.54 (s, 2H), 4.45-4.40 (m, 1H), 3.29-3.16 (m, 2H), 3.05-2.97 (m, 2H). GCMS observed at RT-11.80 min, exact mass-264, observed 264.2 & RT-11.87 min, observed 264.3. Two regioisomers observed in NMR and GCMS.

Preparation of 6,7-dihydro-5H-indeno[5,6-b]furan-6-ol (1-6)

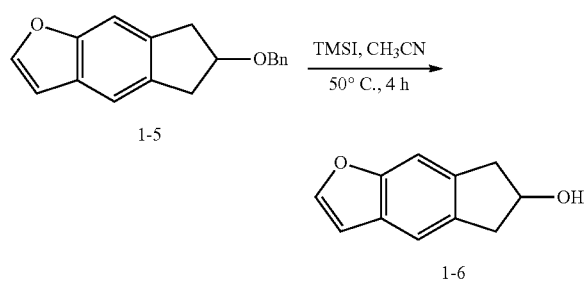

To a stirred solution of 6-(benzyloxy)-6, 7-dihydro-5H-indeno[5,6-b]furan (1-5) (1 g, 3.78 mmol, 1 eq.) in distilled acetonitrile (15 ml) was added TMSI (0.52 mL, 3.78 mmol, 1 eq.) (Dissolved in 2 ml acetonitrile) at room temperature and the reaction mixture was allowed to stir at 50° C. for 4 h. Upon completion of reaction (monitored by TLC, 30% EA in Hexane), the reaction mixture was extracted with ethyl acetate (2×50 mL), washed with saturated $Na_2S_2O_3$ solution, followed by brine solution. The organic layer was then dried over anhydrous sodium sulphate, solvent was removed under vacuum and crude material purified by silica gel column chromatography using ethyl acetate/hexane (20:80 v/v) as eluent to afford mixture of regioisomers. Regioisomers were separated by Prep-HPLC to afford pure (1-6) (400 mg, 60%) as a yellow sticky gum. NMR of mixture of regioisomers: $^1$H NMR (400 MHz, DMSO-$d_6$): δ 7.85 (d, J=1.92 Hz, 1H), 7.40 (d, J=9.64 Hz, 2H), 6.83 (d, J=1.76 Hz, 1H), 4.86 (d, J=3.96 Hz, 1H), 4.54-4.49 (m, 1H), 3.15-3.06 (m, 2H), 2.83-2.75 (m, 2H). GCMS observed at RT-9.96 min, exact mass-174, observed 174.1 & RT-10.01 min, observed 174.1.

The mixture of regioisomers with Int-6 were separated using the fooling Prep-HPLC conditions.
Prep-HPLC Purification Method:
Hydrosphere C-18 column
Run time: 25 min
Solvent Name A: ACN and B: 0.1% FA in $H_2O$
At a flow rate of 16 mL/min:
1. gradient 30% A/70% B to 40% A/60% B from 0-17 min.
2. gradient from 40% A/60% B to 30% A/70% B from 17-20.5 min.
3. hold 30% A/70% B from 20.5 min. to end of run
Desired peak: 14.48 min, undesired peak: 14.97 min
Pure 1-6 NMR: $^1$H NMR (400 MHz, DMSO-$d_6$): δ 7.85 (d, J=1.84 Hz, 1H), 7.40 (d, J=9.48 Hz, 2H), 6.83 (d, J=1.60 Hz, 1H), 4.87 (d, J=4 Hz, 1H), 4.54-4.50 (m, 1H), 3.15-3.06 (m, 2H), 2.83-2.75 (m, 2H).

Undesired Int-6 NMR: $^1$H NMR (400 MHz, DMSO-$d_6$): δ 7.93 (d, J=2.04 Hz, 1H), 7.35 (d, J=8.24 Hz, 1H), 7.14 (d, J=8.28 Hz, 1H), 6.86 (d, J=1.40 Hz, 1H), 4.91 (d, J=3.64 Hz, 1H), 4.61-4.60 (m, 1H), 3.24-3.11 (m, 2H), 2.91-2.78 (m, 2H). GCMS observed at RT-10.41 min, exact mass-174 and observed 174.1.

Preparation of 6-azido-6,7-dihydro-5H-indeno[5,6-b]furan (1-7)

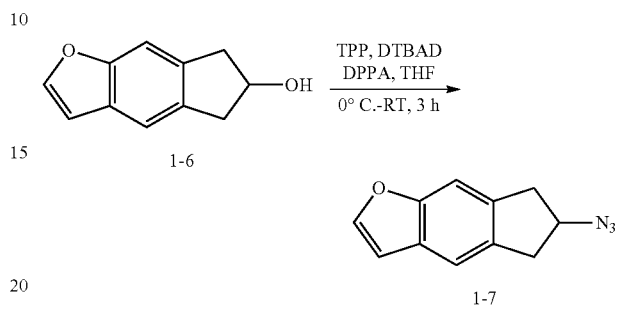

To a stirred solution of 6,7-dihydro-5H-indeno [5,6-b] furan-6-ol (1-6) (500 mg, 2.87 mmol, 1 eq.) in THF (10 mL) was added triphenylphosphine (978.73 mg, 3.73 mmol, 1.3 eq.) and the reaction mixture was cooled to 0° C. Then di-tert-butyl azodicarboxylate (991 mg, 3.73 mmol, 1.5 eq.) was added to the reaction mixture and the resulting reaction mixture was allowed to stir at 0° C. for 15 min. Then Diphenylphosphoryl azide (0.74 mL, 3.44 mmol, 1.2 eq.) was added to the reaction mixture and the resulting reaction mixture was allowed to stir at room temperature for 3 h. Upon completion of reaction (monitored by TLC, 30% EA in Hexane), the reaction mixture was quenched with water, extracted with ethyl acetate (2×50 mL), and washed with water followed by brine solution. The organic layer was then dried over anhydrous sodium sulphate and solvent was removed under vacuum to afford the crude 6-azido-6,7-dihydro-5H-indeno [5,6-b] furan (1-7) (570 mg, 99%) as yellow sticky gum, proceeded for next step without further purification.

Preparation of 6,7-dihydro-5H-indeno[5,6-b]furan-6-amine (1-8)

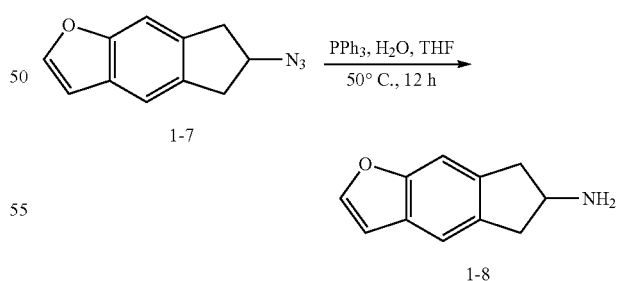

To a stirred solution of crude 6-azido-6,7-dihydro-5H-indeno [5,6-b] furan (1-7) (570 mg, 2.83 mmol, 1 eq.) in THF (15 mL) was added $H_2O$ (0.255 mL, 14.17 mmol, 5 eq.) and $PPh_3$ (1.85 g, 7.09 mmol, 2.5 eq.) (in 5 mL THF) was added drop wise to the reaction mixture at 0° C. and the resulting reaction mixture was allowed to stir at 50° C. for 12 h. Upon completion of reaction (monitored by TLC, 50% EA in Hexane), the reaction mixture was extracted with ethyl acetate, and washed with water, followed by brine. The resulting organic layers were dried over sodium sulphate and solvent was removed under vacuum to afford the crude 6,7-dihydro-5H-indeno [5,6-b] furan-6-amine (1-8) (490 mg, 99%) as a sicky yellow gum, carried forward to next step without further purification.

Preparation of tert-butyl(6,7-dihydro-5H-indeno[5,6-b]furan-6-yl)carbamate (1-9)

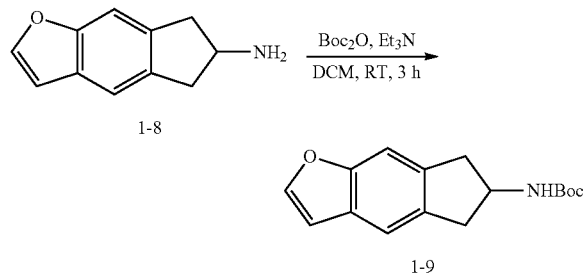

To a stirred solution of crude compound 6,7-dihydro-5H-indeno[5,6-b]furan-6-amine (1-8) (490 mg, 2.83 mmol, 1 eq.) in dry DCM (10 mL) was added triethylamine (0.81 mL, 5.66 mmol, 2 eq.) and Boc anhydride (1.3 mL, 5.66 mmol, 2 eq.) and the resulting reaction mixture was allowed to stir at room temperature for 3 h. Upon completion (monitored by TLC, 20% EA in Hexane), the reaction mixture was extracted with DCM (2×50 mL) and washed with water, followed by brine solution. Then the organic layers were dried over anhydrous sodium sulphate, solvent was evaporated under vacuum, and crude material purified by silica gel column chromatography using ethyl acetate/hexane (10:90 v/v) as eluent to afford tert-butyl (6,7-dihydro-5H-indeno[5,6-b]furan-6-yl) carbamate (1-9) (250 mg, 32%) as an off-white solid. $^1$H-NMR (400 MHz, DMSO-$d_6$): δ 7.86 (s, 1H), 7.40 (d, J=9.76 Hz, 2H), 7.16-7.14 (m, 1H), 6.84 (s, 1H), 4.23-4.22 (m, 1H), 3.19-3.11 (m, 2H), 2.86-2.77 (m, 2H), 1.39 (s, 9H). LCMS: Rt 3.62 min. MS (ES) $C_{16}H_{19}NO_3$, requires 273, found 274 [M+H]$^+$.

Preparation of 6,7-dihydro-5H-indeno[5,6-b]furan-6-amine hydrochloride (Structure I)

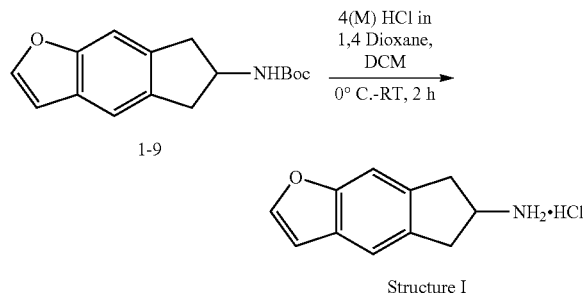

To a stirred solution of tert-butyl (6,7-dihydro-5H-indeno[5,6-b]furan-6-yl)carbamate (1-9) (250 mg, 0.91 mmol, 1 eq.) in dry DCM (10 mL) was added 4(M) HCl in 1,4 dioxane (10 mL) at 0° C. and the resulting reaction mixture was allowed to stir at room temperature for 2 h. Upon completion of reaction (monitored by TLC, 20% EA in Hexane), the solvent was evaporated and the crude was washed twice with diethyl ether (2×50 mL) then pentane (1×50 mL), and dried under vacuum to afford 6,7-dihydro-5H-indeno[5,6-b]furan-6-amine hydrochloride (Structure I) (180 mg, 93%) as an off-white solid. $^1$H-NMR (400 MHz, DMSO-$d_6$): δ 8.35 (s, 3H), 7.91 (d, J=2.04 Hz, 1H), 7.50 (d, J=5.40 Hz, 2H), 6.88 (d, J=1.64 Hz, 1H), 4.02-3.99 (m, 1H), 3.37-3.28 (m, 2H), 3.10-3.03 (m, 2H). LCMS: Rt 1.24 min. MS (ES)KANO, requires 173, found 174.1 [M+H]$^+$ HPLC: Rt 5.07 min. Purity (λ 220 nm): 99.24%.

The synthetic procedures used in the synthesis of Structure I can be modified in ways that would be obvious to a person of skill in the art to synthesize other Structures of the invention. For example, Structure I can be modified by alkylation or reductive amination to give Structure II or Structure III using the corresponding one- or two-carbon reactant. As an additional example, compound 1-3 can be prepared as a thiophenol rather than phenol by an analogous reaction with compound 1-2. The rest of the synthesis described here can then be repeated to give Structures IV-VI or other thiophene-containing aminoindane compounds.

Example 2

Separation of Enantiomers of Structure I by Chiral HPLC

Analytical Chiral HPLC

Figure 2:
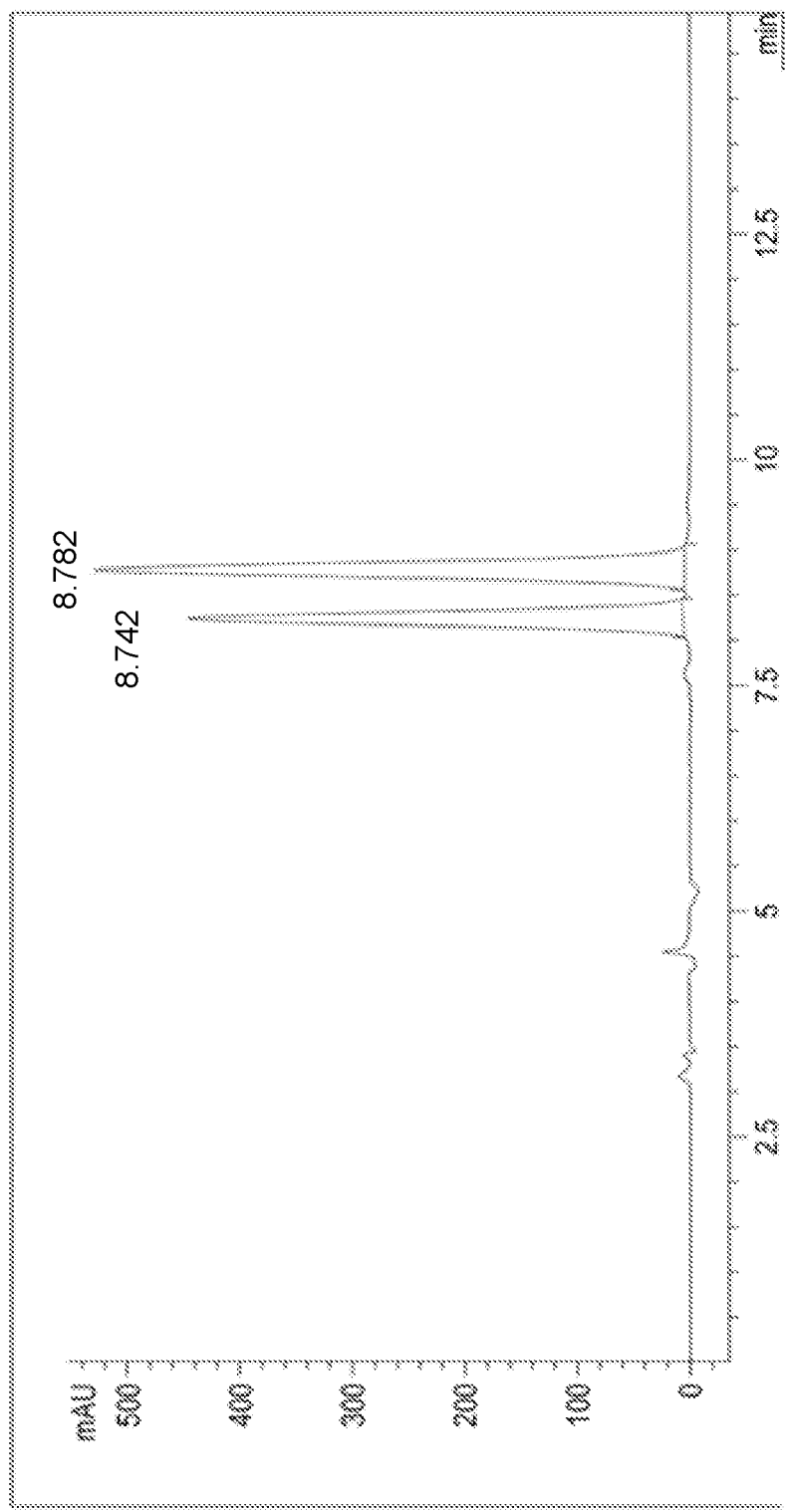
FIG. 2 is the HPLC chromatogram of the separation of the enantiomers of Structure I using chiral chromatography, with details provided in Example 2.

The enantiomers of Structure I were resolved by Analytical Chiral HPLC using the following method:
Column Name—Chiralpak IC (4.6×250 mm), 5 μm
Flow rate—1 ml/min
Mobile phase—hexane/DCM/EtOH/isopropylamine-80/10/10/0.1
Solubility—MeOH
Wavelength of detection—246 nm
Run time—15 min
Injection Volume—4.0
The resulting chromatogram showing the separation of the two enantiomers is shown in FIG. 2

Preparative Chiral HPLC
The enantiomers of Structure I were isolated by Preparative Chiral HPLC using the following method:
Column Name—Chiralpak IG (250×21 mm) 5 μm
Flow rate—21 ml/min
Mobile phase—hexane/DCM/EtOH/TEA-90/05/05/0.1
Solubility—MeOH
Wavelength of detection—246 nm
Run time—24 min
Stack time—12 min
Loading per injection—4.0 mg
120 mg of Structure I was submitted. After separation approx. 20 mg of Peak-1 and approx. 25 mg of Peak-2 was obtained.
Peak 1 obtained at 9.35 min.–chiral purity=99.44%
Peak 2 obtained at 10.21 min.–chiral purity=96.14%

Example 3

Serum Serotonin Concentrations to Index Drug Interactions with the Serotonin Transporter (SERT, SLC6A4)

Serum serotonin can be measured using High Performance Liquid Chromatography and Fluorescence Detection. Venipuncture collects at least 1 mL of sample, which is spun with serum frozen to below −20° C. within 2 hours of collection. For active compounds, assay results will show increases in serum serotonin, indicating that the compound is a releaser of serotonin.

Example 4

Human Serotonin Transporter (SERT, SLC6A4) Functional Antagonist Uptake Assay Human recombinant serotonin transporter expressed in HEK-293 cells are plated. Test compound and/or vehicle is preincubated with cells (1×10E5/ml) in modified Tris-HEPES buffer pH 7.1 for 20 minutes at 25° C. and 65 nM. [3H]Serotonin is then added for an additional 15 minute incubation period. Bound cells are filtered and counted to determine [3H]Serotonin uptake. Compounds are screened at concentrations from 10 to 0.001 µM. Reduction of [3H] Serotonin uptake relative to 1 µM fluoxetine indicates inhibitory activity.

Example 5

Serotonin Transporter (SERT, SLC6A4) Release Assay

An alternative, invasive method of measuring compound interactions with the serotonin transporter can be conducted according to the methods of Rothman and Baumann (Partilla et al. 2016. In: Bonisch S, Sitte HH (eds) Neurotransmitter Transporters Springer; N.Y., pp 41-52). In this assay, male Sprague-Dawley rats are euthanized by $CO_2$ narcosis and brains, excluding the striatum and cerebellum, are processed to yield synaptosomes.

Synaptosomes are preloaded (to steady state) with [3H] 5-HT in Krebs-phosphate buffer. Release assays are initiated by adding preloaded synaptosomes to test compound prepared in Krebs phosphate buffer containing BSA. Non-specific binding is determined in the presence of tyramine and total binding is determined in the presence of vehicle. Assays are terminated by rapid vacuum filtration/washing and retained radioactivity is quantified by a PerkinElmer TopCount or similar.

The selectivity of the SERT assay is optimized for SERT by including unlabeled blockers to prevent uptake of [3H] 5-HT by competing transporters (for example, nomifensine to block NET and GBR12935 to block DAT). Substrate activity for releasers is confirmed by detecting a significant reversal of the releasing effect of the test compound in the presence of reuptake inhibitors. Release assays are tested in the presence and absence of a known reuptake inhibitor, such as citalopram, which is a known blocker for the SERT substrate reversal assay.

For active compounds, assay results will show increases in extracellular serotonin.

Example 6

Marble Burying Measure of Decreased Anxiety and Neuroticism

The marble burying test is a model of neophobia, anxiety, and obsessive-compulsive behavior. Moreover, it has been proposed to have predictive validity for the screening of novel antidepressants and anxiolytics. It is well established to be sensitive to the effects of SSRIs as well as serotonin releasers such as fenfluramine and MDMA (De Brouwer et al., Cognitive, Affective, and Behavioral Neuroscience, 2019, 19(1), 1-39).

The test involves the placement of a standardized number of marbles gently onto the surface of a layer of bedding material within a testing arena. Mice are then introduced into the arena for a standardized amount of time and allowed to explore the environment. The outcome measure of the test is the number of marbles covered, as scored by automatic scoring software or blinded observers. General locomotor activity, often operationalized as total distance traveled, is often used as a control measure. A compound that attenuates anxiety, neuroticism, or obsessive-compulsive behavior decreases marble burying. A compound of the present invention is given to mice and decreases in marble burying, indicates an acute decrease in anxiety and neuroticism.

Example 7

Evaluation of Entactogenic Effect of Decreased Neuroticism

The entactogenic effect of decreased neuroticism can be measured as a decrease in social anxiety using the Brief Fear of Negative Evaluation—revised (BFNE) (Carleton et al., 2006, Depression and Anxiety, 23(5), 297-303; Leary, 1983, Personality and Social Psychology bulletin, 9(3), 371-375). This 12-item Likert scale questionnaire measures apprehension and distress due to concerns about being judged disparagingly or with hostility by others. Ratings use a five-point Likert scale with the lowest, middle, and highest values labeled with "much less than normal," "normal," and "much more than normal." The BFNE can be administered before and repeatedly during therapeutic drug effects. Participants are instructed to answer how they have been feeling for the past hour, or otherwise during the effect of the drug. Baseline-subtracted responses are typically used in statistical models.

Example 8

Evaluation of Entactogenic Effect of Authenticity

The entactogenic effect of authenticity can be measured using the Authenticity Inventory (Kernis & Goldman. 2006. Advances in experimental social psychology, 38, 283-357) as modified by Baggott et al (Journal of Psychopharmacology 2016, 30.4: 378-87). Administration and scoring of the instrument is almost identical to that of the BFNE. The Authenticity Inventory consists of the following items, which are each rated on a 1-5 scale, with select items reverse scored as specified by Kernis & Goldman:

I am confused about my feelings.
I feel that I would pretend to enjoy something when in actuality I really didn't.
For better or worse, I am aware of who I truly am.
I understand why I believe the things I do about myself
I want the people with whom I am close to understand my strengths.
I actively understand which of my self-aspects fit together to form my core or true self
I am very uncomfortable objectively considering my limitations and shortcomings.
I feel that I would use my silence or head-nodding to convey agreement with someone else's statement or position even though I really disagreed.

I have a very good understanding of why I do the things I do.
I am willing to change myself for others if the reward is desirable enough.
I would find it easy to pretend to be something other than my true self
I want people with whom I am close to understand my weaknesses.
I find it difficult to critically assess myself. (unchanged)
I am not in touch with my deepest thoughts and feelings.
I feel that I would make it a point to express to those I am close with how much I truly care for them.
I have difficulty accepting my personal faults, so I try to cast them in a more positive way.
I feel that I idealize the people close to me rather than objectively see them as they truly are.
If asked, people I am close to could accurately describe what kind of person I am.
I prefer to ignore my darkest thoughts and feelings.
I am aware of times when I am not being my true self
I am able to distinguish the self-aspects that are important to my core or true self from those that are unimportant.
People close to me would be shocked or surprised if they discovered what I am keeping inside me.
It is important for me to understand the needs and desires of those with whom I am close.
I want people close to me to understand the real me, rather than just my public persona or "image".
I could act in a manner that is consistent with my personally held values, even if others criticized me or rejected me for doing so.
If a close other and I were in disagreement, I would rather ignore the issue than constructively work it out.
I feel that I would do things that I don't want to do merely to avoid disappointing people.
My behavior expresses my values.
I actively attempt to understand myself as well as possible.
I feel that I'd rather feel good about myself than objectively assess my personal limitations and shortcomings.
My behavior expresses my personal needs and desires.
I have on a "false face" for others to see.
I feel that I would spend a lot of energy pursuing goals that are very important to other people even though they are unimportant to me.
I am not in touch with what is important to me.
I try to block out any unpleasant feelings I have about myself.
I question whether I really know what I want to accomplish in my lifetime.
I am overly critical about myself.
I am in touch with my motives and desires.
I feel that I would deny the validity of any compliments that I receive.
I place a good deal of importance on people close to me understanding who I truly am.
I find it difficult to embrace and feel good about the things I have accomplished.
If someone pointed out or focused on one of my shortcomings, I would quickly try to block it out of my mind and forget it.
The people close to me could count on me being who I am, regardless of what setting we were in.
My openness and honesty in close relationships are extremely important to me.
I am willing to endure negative consequences by expressing my true beliefs about things.

Example 9

Evaluation of Side Effects of Entactogens

Adverse effects of an entactogen include formation of tolerance to entactogens, headache, difficulty concentrating, lack of appetite, lack of energy, and decreased mood. To measure these adverse effects, patients can be asked to complete a self-report symptom questionnaire, such as the Subjective Drug Effects Questionnaire (SDEQ) or List of Complaints. The SDEQ is a 272-item self-report instrument measuring perceptual, mood, and somatic changes caused by drugs including hallucinogens like LSD (Katz et al. 1968. J Abnorm Psychology 73:1-14). It has also been used to measure the therapeutic and adverse effects of MDMA (Harris et al. 2002. Psychopharmacology, 162(4), 396-405). The List of Complaints is a 66-item questionnaire that measures physical and general discomfort and is sensitive to entactogen-related complaints (e.g., Vizeli & Liechti. 2017. Journal of Psychopharmacology, 31(5), 576-588).

In addition to these mild toxicities, MDMA is associated with a number of more severe toxicities, including but not limited to acute and chronic cardiovascular changes, hepatotoxicity, hyperthermic syndromes, hyponatremia, and neurotoxicity (see the MDMA Investigator's Brochure, 13th Edition: Mar. 22, 2021, and references therein, available from the sponsor of MDMA clinical trials at MAPS.org).

Alternatively, individual items can be taken from the SDEQ or List of Complaints in order to create more focused questionnaires and reduce the burden of filling out time-consuming paperwork on participants. To measure tolerance formation, a global measure of the intensity of therapeutic effects can be used, such as the question "on a scale from 0 to 100 where 0 is no 'good drug effect' and 100 is the most 'good drug effect' you have ever felt, how would you rate this drug experience?"

In some embodiments, the questionnaire will be administered approximately 7 hours after a patient takes MDMA or another entactogen (with instructions to answer for the time since taking the entactogen) and then daily (with instructions to answer for the last 24 hours) for up to 96 hours after the entactogen was taken. Decreases in adverse effects of a compound compared to MDMA can be shown by comparing the intensity (for the tolerance question) or prevalence (for other symptom questions) of effects that occur. Prevalence of adverse effects including formation of tolerance to entactogens, headache, difficulty concentrating, lack of appetite, lack of energy, and decreased mood may be decreased by approximately 10%, 20%, 30%, 40%, 50%, 60%, 70%, 80%, 90%, 99%, or 100%.

While the present invention is described in terms of particular embodiments and applications, it is not intended that these descriptions in any way limit its scope to any such embodiments and applications, and it will be understood that many modifications, substitutions, changes, and variations in the described embodiments, applications, and details of the invention illustrated herein can be made by those skilled in the art without departing from the spirit of the invention, or the scope of the invention as described in the appended claims.

I claim:

1. A compound of formula:

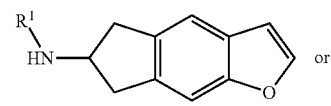 or

-continued

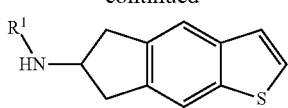

or a pharmaceutically acceptable salt or salt mixture thereof;

wherein:

R¹ is hydrogen, methyl, —CH₂F, —CF₃, ethyl, —CH₂CH₂F, —CH₂CF₂H, —CH₂CF₃, or —CF₂CF₃.

2. The compound of claim 1 wherein the compound is of formula:

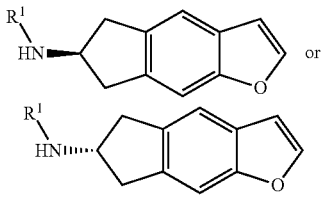

or a pharmaceutically acceptable salt or salt mixture thereof.

3. The compound of claim 1 wherein the compound is of formula:

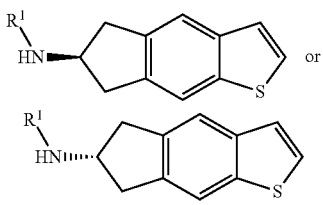

or a pharmaceutically acceptable salt or salt mixture thereof.

4. The compound of claim 1 wherein the compound is:

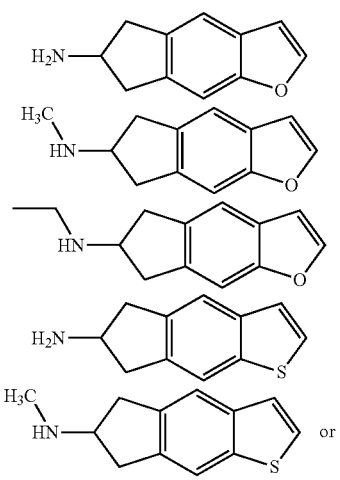

or a pharmaceutically acceptable salt or salt mixture thereof.

5. The compound of claim 4 wherein the compound is:

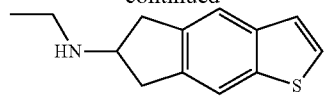

or a pharmaceutically acceptable salt or salt mixture thereof.

6. The compound of claim 4 wherein the compound is:

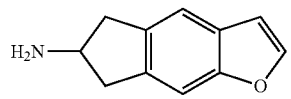 [SMILES: NC1Cc2cc3ccoc3cc2C1]

or a pharmaceutically acceptable salt or salt mixture thereof.

7. The compound of claim 4 wherein the compound is:

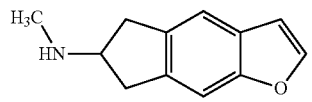

or a pharmaceutically acceptable salt or salt mixture thereof.

8. The compound of claim 5 wherein the compound is:

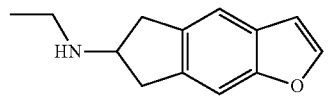

or a pharmaceutically acceptable salt or salt mixture thereof.

9. The compound of claim 6 wherein the compound is:

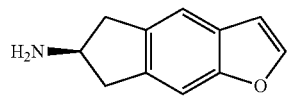 [SMILES: N[C@H]1Cc2cc3ccoc3cc2C1]

or a pharmaceutically acceptable salt or salt mixture thereof.

10. The compound of claim 7 wherein the compound is:

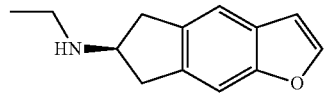

or a pharmaceutically acceptable salt or salt mixture thereof.

11. The compound of claim 5 wherein the compound is:

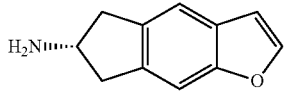

or a pharmaceutically acceptable salt or salt mixture thereof.

12. The compound of claim 6 wherein the compound is:

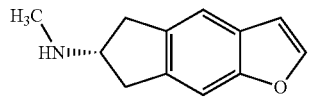

or a pharmaceutically acceptable salt or salt mixture thereof.

13. The compound of claim 7 wherein the compound is:

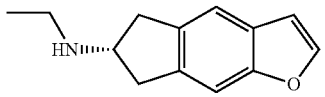

or a pharmaceutically acceptable salt or salt mixture thereof.

14. The compound of claim 4 wherein the compound is:

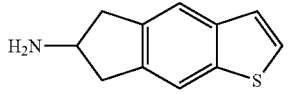

or a pharmaceutically acceptable salt or salt mixture thereof.

15. The compound of claim 4 wherein the compound is:

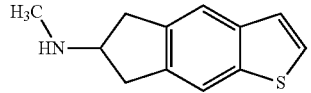

or a pharmaceutically acceptable salt or salt mixture thereof.

16. The compound of claim 4 wherein the compound is:

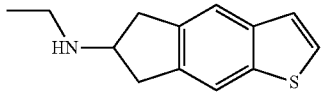

or a pharmaceutically acceptable salt or salt mixture thereof.

17. The compound of claim 14 wherein the compound is:

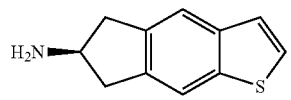 [SMILES: N[C@H]1Cc2cc3ccsc3cc2C1]

or a pharmaceutically acceptable salt or salt mixture thereof.

18. The compound of claim 15 wherein the compound is:

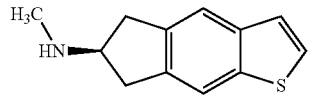

or a pharmaceutically acceptable salt or salt mixture thereof.

19. The compound of claim 16 wherein the compound is:

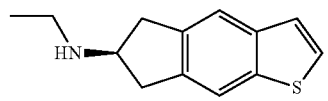

or a pharmaceutically acceptable salt or salt mixture thereof.

20. The compound of claim 14 wherein the compound is:

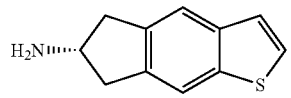

or a pharmaceutically acceptable salt or salt mixture thereof.

21. The compound of claim 15 wherein the compound is:

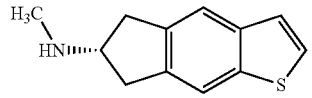

or a pharmaceutically acceptable salt or salt mixture thereof.

22. The compound of claim 16 wherein the compound is:

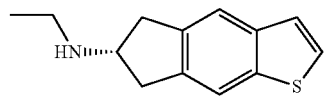

or a pharmaceutically acceptable salt or salt mixture thereof.

23. The compound of claim 1, wherein the pharmaceutically acceptable salt(s) is hydrochloric acid, sulfate, aspartate, saccharate, phosphate, oxalate, acetate, amino acid anion, gluconate, maleate, malate, citrate, mesylate, nitrate or tartrate, or a mixture thereof.

24. A pharmaceutical composition comprising a compound of claim 1 or a pharmaceutically acceptable salt or salt mixture thereof and a pharmaceutically acceptable carrier or excipient.

25. The pharmaceutical composition of claim 24, wherein the compound is:

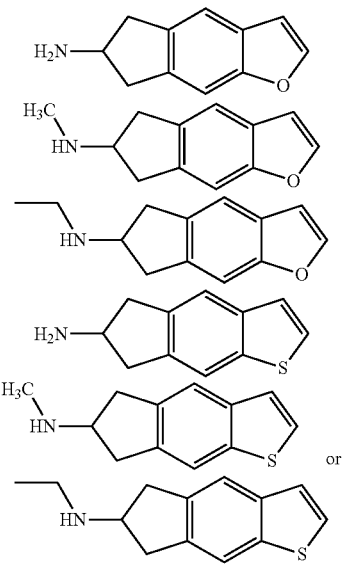

or a pharmaceutically acceptable salt or salt mixture thereof.

26. The pharmaceutical composition of claim 25, wherein the compound is:

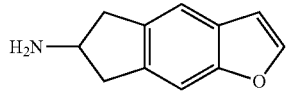 [SMILES: NC1Cc2cc3ccoc3cc2C1]

or a pharmaceutically acceptable salt or salt mixture thereof.

27. The pharmaceutical composition of claim 25, wherein the compound is:

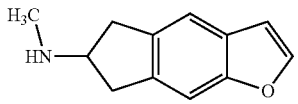

or a pharmaceutically acceptable salt or salt mixture thereof.

28. The pharmaceutical composition of claim 25, wherein the compound is:

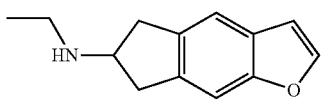

or a pharmaceutically acceptable salt or salt mixture thereof.

29. The pharmaceutical composition of claim 25, wherein the compound is:

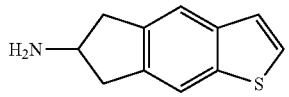

or a pharmaceutically acceptable salt or salt mixture thereof.

30. The pharmaceutical composition of claim 25, wherein the compound is:

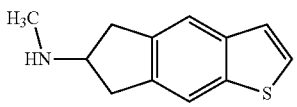

or a pharmaceutically acceptable salt or salt mixture thereof.

31. The pharmaceutical composition of claim 25, wherein the compound is:

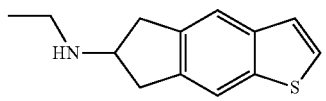

or a pharmaceutically acceptable salt or salt mixture thereof.

32. The pharmaceutical composition of claim 25, wherein the compound is:

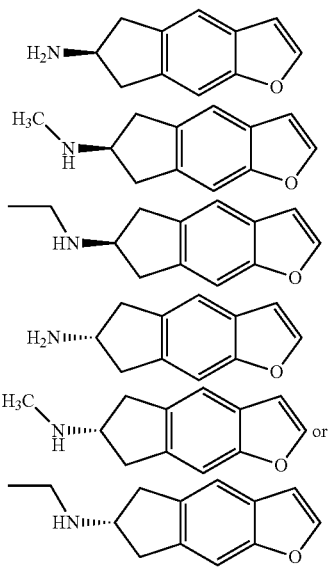

or a pharmaceutically acceptable salt or salt mixture thereof.

33. The pharmaceutical composition of claim 25, wherein the compound is:

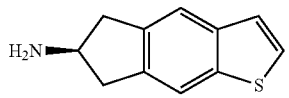

-continued
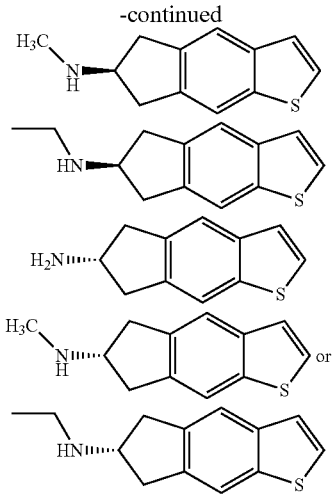
or a pharmaceutically acceptable salt or salt mixture thereof.
* * * * *